(12) United States Patent
Uchimura et al.

(10) Patent No.: US 12,163,287 B2
(45) Date of Patent: Dec. 10, 2024

(54) FINE CELLULOSE FIBERS AND PRODUCTION METHOD THEREFOR, NONWOVEN FABRIC, AND FIBER-REINFORCED RESIN AND PRODUCTION METHOD THEREFOR

(71) Applicant: Asahi Kasei Kabushiki Kaisha, Tokyo (JP)

(72) Inventors: Hirofumi Uchimura, Tokyo (JP); Hirofumi Ono, Tokyo (JP); Hirotaka Asai, Tokyo (JP); Yoko Fujimoto, Tokyo (JP); Naoaki Yamasaki, Tokyo (JP); Kazufumi Kawahara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/291,267

(22) PCT Filed: Jul. 27, 2022

(86) PCT No.: PCT/JP2022/029012
§ 371 (c)(1),
(2) Date: Jan. 23, 2024

(87) PCT Pub. No.: WO2023/008497
PCT Pub. Date: Feb. 2, 2023

(65) Prior Publication Data
US 2024/0263396 A1    Aug. 8, 2024

(30) Foreign Application Priority Data

Jul. 28, 2021 (JP) .................. 2021-123203
Jul. 28, 2021 (JP) .................. 2021-123276
Nov. 12, 2021 (JP) .................. 2021-184931

(51) Int. Cl.
*D21H 15/02*    (2006.01)
*C08J 5/06*    (2006.01)
(Continued)

(52) U.S. Cl.
CPC ................ *D21H 15/02* (2013.01); *C08J 5/06* (2013.01); *D01F 2/28* (2013.01); *D04H 1/425* (2013.01); *C08J 2300/12* (2013.01)

(58) Field of Classification Search
CPC ......... D21H 15/02; C08J 5/06; C08J 2300/12; D01F 2/28; D04H 1/425
See application file for complete search history.

(56) References Cited

U.S. PATENT DOCUMENTS

| 2004/0086626 A1 | 5/2004 | Lundberg et al. |
| 2005/0194477 A1 | 9/2005 | Suzuki |

(Continued)

FOREIGN PATENT DOCUMENTS

| CN | 101535567 A | 9/2009 |
| CN | 109563177 A | 4/2019 |

(Continued)

OTHER PUBLICATIONS

Iida et al., "Whiteness, Brightness and Yellowness of Pulp Sheet," (Nov. 22, 1965) (see English abstract).

(Continued)

*Primary Examiner* — Jacob T Minskey
*Assistant Examiner* — Stephen M Russell
(74) *Attorney, Agent, or Firm* — Morgan, Lewis & Bockius LLP

(57) ABSTRACT

An embodiment of the present disclosure provides fine cellulose fibers that satisfy, in measurement using an automatic fiber shape analyzer, all of (i) the length weighted average fiber length of fibers having a fiber length of at least 100 μm is 110-500 μm, (ii) the average fiber diameter is at (Continued)

most 42.5 μm, (iii) the fine fiber area ratio is at most 90%, (iv) the number frequency of fibers having a fiber length of 20-56 μm is at most 97% among fibers having a fiber length of less than 100 μm, (v) the number frequency of fibers having a fiber length of at least 411 μm is at most 54% among fibers having a fiber length of at least 100 μm, and (vi) the average fiber diameter is 20-150 nm in terms of specific surface area.

20 Claims, 2 Drawing Sheets

(51) Int. Cl.
  *D01F 2/28* (2006.01)
  *D04H 1/425* (2012.01)

(56) References Cited

U.S. PATENT DOCUMENTS

| | | | |
|---|---|---|---|
| 2009/0065164 A1* | 3/2009 | Goto | D21H 11/16 |
| | | | 162/100 |
| 2009/0264036 A1 | 10/2009 | Yano et al. | |
| 2012/0178856 A1 | 7/2012 | Gobl et al. | |
| 2012/0309898 A1 | 12/2012 | Hamada et al. | |
| 2014/0057105 A1 | 2/2014 | Pande et al. | |
| 2017/0073893 A1 | 3/2017 | Bilodeau et al. | |
| 2017/0114484 A1* | 4/2017 | Tsujino | D04H 1/736 |
| 2018/0010299 A1 | 1/2018 | Hu et al. | |
| 2018/0037737 A1 | 2/2018 | Semba et al. | |
| 2019/0225712 A1 | 7/2019 | Yamato et al. | |
| 2020/0087417 A1 | 3/2020 | Takaichi et al. | |
| 2020/0369787 A1* | 11/2020 | Inoue | D21H 11/18 |
| 2020/0407912 A1 | 12/2020 | Okawa | |
| 2021/0108370 A1* | 4/2021 | Vaulot | D21H 17/67 |
| 2021/0230312 A1 | 7/2021 | Matsusue | |

FOREIGN PATENT DOCUMENTS

| | | |
|---|---|---|
| JP | H03-130013 A | 6/1991 |
| JP | H06-257097 A | 9/1994 |
| JP | H07-232060 A | 9/1995 |
| JP | 2000-265352 A | 9/2000 |
| JP | 2010-031093 A | 2/2010 |
| JP | 2011-144273 A | 7/2011 |
| JP | 2012-036508 A | 2/2012 |
| JP | 2012-111849 A | 6/2012 |
| JP | 2012-144651 A | 8/2012 |
| JP | 2013-525618 A | 6/2013 |
| JP | 2013-540913 A | 11/2013 |
| JP | 2017-057273 A | 3/2017 |
| JP | 2017-099364 A | 6/2017 |
| JP | 2018-059224 A | 4/2018 |
| JP | 2018-135631 A | 8/2018 |
| JP | 2019-006875 A | 1/2019 |
| JP | 2019-147965 A | 9/2019 |
| JP | 2019-163569 A | 9/2019 |
| JP | 2020-508405 A | 3/2020 |
| JP | 2020-512488 A | 4/2020 |
| JP | 2020-165068 A | 10/2020 |
| JP | 2021-036054 A | 3/2021 |
| JP | 2021-066779 A | 4/2021 |
| JP | 7209914 B | 1/2023 |
| WO | 2004/009902 A1 | 1/2004 |
| WO | 2011/078142 A1 | 6/2011 |
| WO | 2011/128322 A2 | 10/2011 |
| WO | 2011/129241 A1 | 10/2011 |
| WO | 2012/011577 A1 | 1/2012 |
| WO | 2012/054968 A1 | 5/2012 |
| WO | 2013/015323 A1 | 1/2013 |
| WO | 2016/148233 A1 | 9/2016 |
| WO | 2018/116661 A1 | 6/2018 |
| WO | 2018/150099 A1 | 8/2018 |
| WO | 2018/172920 A1 | 9/2018 |
| WO | 2019/176465 | 9/2019 |
| WO | 2019/230573 A1 | 12/2019 |
| WO | 2020/145354 A1 | 7/2020 |
| WO | 2021/054274 A1 | 3/2021 |
| WO | 2021/112195 A1 | 6/2021 |

OTHER PUBLICATIONS

International Search Report issued in corresponding International Patent Application No. PCT/JP2022/029012 dated Oct. 11, 2022.
Decision to Grant issued in Japanese Patent Application No. 2022-567318 dated Dec. 16, 2022.
International Preliminary Report on Patentability and Written Opinion issued in corresponding International Patent Application No. PCT/JP2022/029012 dated Feb. 8, 2024.
Supplementary European Search Report issued in European Patent Application No. 22849558.6 dated Aug. 2, 2024.
Database WPI, Thomson Scientific, AN 2012-B26540, XP002811933 (Oct. 2012).
Office Action issued in European Patent Application No. 22849558.6 dated Aug. 14, 2024.

\* cited by examiner

FINE CELLULOSE FIBERS AND PRODUCTION METHOD THEREFOR, NONWOVEN FABRIC, AND FIBER-REINFORCED RESIN AND PRODUCTION METHOD THEREFOR

FIELD

The present invention relates to cellulose fine fibers and to a method for their production, to a nonwoven fabric, and to a fiber-reinforced resin using the same, and a method for its production.

BACKGROUND

With increasing awareness of environmental issues and in line with goals of exhibiting more variable and characteristic performance, cellulose fibers, and especially cellulose fine fibers, have been a subject of increasing focus in recent years as a plant resource that can be effectively utilized in a wide range of fields, and as a material source with a high elastic modulus and excellent thermal dimensional stability to be used as a starting material for composite fillers for automobiles or cores for fiber-reinforced plastics (FRP), for example. Resins blended with cellulose fine fibers, however, have high brittleness and fracture even with minimal changes, and therefore leave much to be desired from the standpoint of strength and impact resistance.

PTL 1 describes a technique for improving bending strength and flexural modulus while maintaining impact resistance, by compositing a resin having a specific relative viscosity and carboxy-terminal concentration, and acetylated microfibrillated cellulose fibers.

PTL 2 describes microfibrillated cellulose having a mean fiber length of 0.02 to 3.0 mm, a mean fiber size of 0.1 µm or larger and a fibrillation rate of 1.0% or greater, and a technique for increasing the flexural modulus of a fiber-reinforced composite resin by hydrophobically treating the aforementioned cellulose and then adding it to a resin.

PTL 3 discloses a composite material comprising three components: microfibrillated cellulose, an elastomer and a resin, and teaches that the impact resistance is improved by using a core-shell elastomer having a shell section that is reactive with the hydroxyl groups of the cellulose.

CITATION LIST

Patent Literature

[PTL 1] International Patent Publication No. WO2016/148233
[PTL 2] International Patent Publication No. WO2019/230573
[PTL 3] Japanese Unexamined Patent Publication No. 2010-31093

SUMMARY

Technical Problem

With the technique described in PTL 1, however, one issue of note has been heat resistance during melt kneading, since it uses pulp with a fixed amount of residual lignin, known as lignocellulose. In addition, since defibration is carried out under constrained shear in a kneading extrusion step, defibration fails to take place to a sufficient degree for exhibiting performance, and the strength and elastic modulus of the composite of the resin and cellulose are unsatisfactory despite the improved resin properties. Moreover, PTL 2 does not fully examine how to achieve high levels of strength, elastic modulus and fracture strain. Consequently, no fiber-reinforced resin has yet been obtained in the prior art which can simultaneously achieve high levels of strength, elastic modulus and fracture strain.

The problem to be solved by the invention is to provide cellulose fine fibers that can be used to produce a fiber-reinforced resin with superior strength, elastic modulus and fracture strain.

Solution to Problem

The disclosure encompasses the following aspects.

[1]
Cellulose fine fibers satisfying all of the following features in measurement with an automatic fiber shape analyzer:
  (i) the length-weighted mean fiber length of fibers with fiber lengths of 100 µm or greater is 110 µm to 500 µm,
  (ii) the mean fiber size is 42.5 µm or smaller,
  (iii) the fine fiber area ratio is 90% or lower,
  (iv) the number frequency of fibers with fiber lengths of 20 µm to 56 µm among the fibers with fiber lengths of less than 100 µm is 97% or lower,
  (v) the number frequency of fibers with fiber lengths of 411 µm or greater among the fibers with fiber lengths of 100 µm or greater is 54% or lower, and
  (vi) the mean fiber size is 20 to 150 nm in terms of specific surface area.

[2]
Cellulose fine fibers according to [1] above, wherein the mean fiber length is 110 µm to 500 µm.

[3]
Cellulose fine fibers according to [1] or [2] above, satisfying all of the following features in measurement with an automatic fiber shape analyzer:
  (i) the mean fiber length is 130 µm to 350 µm,
  (ii) the mean fiber size is 35 µm or smaller,
  (iii) the fine fiber area ratio is 75% or lower,
  (iv) the number frequency of fibers with fiber lengths of 20 µm to 56 µm among the fibers with fiber lengths of less than 100 µm is 75% or lower,
  (v) the number frequency of fibers with fiber lengths of 411 µm or greater among the fibers with fiber lengths of 100 µm or greater is 30% or lower, and
  (vi) the fibrillation rate is 5% or lower.

[4]
The cellulose fine fibers according to any one of [1] to [3] above, wherein the glucose content in constituent sugar analysis is 90 mass % or greater.

[5]
The cellulose fine fibers according to any one of [1] to [4], wherein in a scanning electron microscope (SEM) image of the surface of a sample obtained by casting and drying a DMSO dispersion of the cellulose fine fibers at 5 ppm by mass, the proportion of the total area occupied by ultrafine fibers with an occupied area of less than 15 µm$^2$ is 10% to 80% with respect to the total area occupied by the cellulose fine fibers.

[6]
The cellulose fine fibers according to any one of [1] to [5] above, which have a type I cellulose crystal structure.

[7]
The cellulose fine fibers according to any one of [1] to [6] above, wherein the degree of crystallinity is 60% or greater.

[8]
The cellulose fine fibers according to any one of [1] to [7] above, wherein the halogen content is 250 ppm by mass or lower.

[9]
The cellulose fine fibers according to any one of [1] to [8] above, wherein the whiteness is 50% or greater.

[10]
The cellulose fine fibers according to any one of [1] to [9] above, wherein the length-weighted mean fiber length of fibers with fiber lengths of 100 μm or greater is 130 μm to 350 μm.

[11]
The cellulose fine fibers according to any one of [1] to [10] above, wherein the number frequency of fibers with fiber lengths of 411 μm or greater among the fibers with fiber lengths of 100 μm or greater is 30% or lower.

[12]
The cellulose fine fibers according to any one of [1] to [11] above, wherein the fine fiber area ratio is 75% or lower.

[13]
The cellulose fine fibers according to any one of [1] to [12] above, wherein the number frequency of fibers with fiber lengths of 20 μm to 56 μm among the fibers with fiber lengths of less than 100 μm is 30% to 75%.

[14]
The cellulose fine fibers according to any one of [1] to [13] above, wherein the fibrillation rate is 5% or lower.

[15]
The cellulose fine fibers according to any one of [1] to [14] above, which are cellulose fine fibers that are chemically modified at least on the surfaces.

[16]
The cellulose fine fibers according to [15] above, wherein the chemical modification is acetylation, the acetylation degree being 0.5 to 1.3.

[17]
Cellulose fine fibers according to any one of [1] to [16] above, which further satisfy the following features in measurement with an automatic fiber shape analyzer:
  (iv) the number frequency of fibers with fiber lengths of 20 μm to 56 μm among the fibers with fiber lengths of less than 100 μm is 30% to 97%, and
  (vi) the fibrillation rate is 5% or lower.

[18]
A method for producing cellulose fine fibers according to any one of [1] to [17] above, wherein:
  the halogen content of the cellulose fine fibers is 250 ppm by mass or lower, and
  the method includes a step of defibrating a cellulose starting material having a halogen content of 300 ppm by mass or lower.

[19]
A fiber-reinforced resin that includes cellulose fine fibers according to any one of [1] to [17] above, and a resin.

[20]
The fiber-reinforced resin according to [19] above, wherein the resin has a melting point of 200° C. or higher.

[21]
The fiber-reinforced resin according to [19] or [20] above, which includes cellulose fine fibers at 1 mass % or greater.

[22]
A nonwoven fabric that includes cellulose fine fibers according to any one of [1] to [17] above.

[23]
The nonwoven fabric according to [22] above, which includes synthetic fibers with a melting point of 300° ° C. or lower at 50 mass % or greater.

[24]
The nonwoven fabric according to [22] or [23] above, which includes cellulose fine fibers at 1 mass % or greater.

[25]
A fiber-reinforced resin which includes a nonwoven fabric according to any one of [22] to [24] above and a resin impregnated in the nonwoven fabric.

[26]
A method for producing a fiber-reinforced resin which includes cellulose fine fibers and a resin, wherein:
  the method includes a step of hot pressing a nonwoven fabric according to any one of [22] to [24] above to obtain a fiber-reinforced resin, and
  the nonwoven fabric includes synthetic fibers and the hot pressing is carried out at or above the melting point of the synthetic fibers.

Advantageous Effects of Invention

The cellulose fine fibers according to one aspect of the invention are cellulose fine fibers that can be used to obtain a fiber-reinforced resin that is superior in terms of strength, elastic modulus and fracture strain.

DESCRIPTION OF EMBODIMENTS

Figure 1:
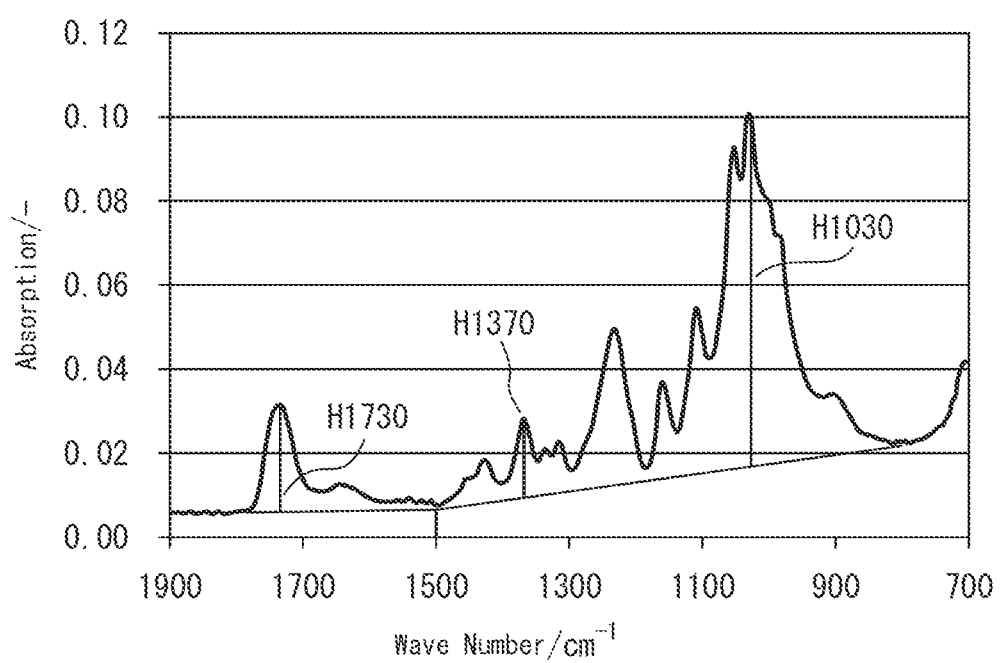
FIG. 1 is an illustration of a method for calculating the IR index 1730 and IR index 1030.

An exemplary mode of the present invention will now be described (hereunder referred to as "the embodiment"), with the understanding that the invention is not limited to this mode and may incorporate various modifications such as are within the gist thereof.

Cellulose Fine Fibers

<Shapes of Cellulose Fine Fibers>
Cellulose fine fibers according to one aspect satisfy all of the following features in measurement with an automatic fiber shape analyzer:
  (i) the length-weighted mean fiber length of fibers with fiber lengths of 100 μm or greater is 110 μm to 500 μm,
  (ii) the mean fiber size is 42.5 μm or lower,
  (iii) the fine fiber area ratio is 90% or lower,
  (iv) the number frequency of fibers with fiber lengths of 20 μm to 56 μm among the fibers with fiber lengths of less than 100 μm is 97% or lower, and
  (v) the number frequency of fibers with fiber lengths of 411 μm or greater among the fibers with fiber lengths of 100 μm or greater is 54% or lower.

According to one aspect, the mean fiber length of the cellulose fine fibers is 110 μm to 500 μm.

Cellulose fine fibers according to one aspect satisfy all of the following features in measurement with an automatic fiber shape analyzer:
  (i) the mean fiber length is 130 μm to 350 μm,
  (ii) the mean fiber size is 35 μm or smaller, (iii) the fine fiber area ratio is 75% or lower,
(iv) the number frequency of fibers with fiber lengths of 20 μm to 56 μm among the fibers with fiber lengths of less than 100 μm is 75% or lower,
(v) the number frequency of fibers with fiber lengths of 411 μm or greater among the fibers with fiber lengths of 100 μm or greater is 30% or lower, and
(vi) the fibrillation rate is 5% or lower.

Cellulose fine fibers according to another aspect have the cellulose starting material micronized using at least one type of physical means, and the term generally refers to cellulose nanofibers, CNF, CeNF and micronized cellulose fibers.

According to one aspect, the cellulose fine fibers are chemically modified cellulose fine fibers. The term "chemically modified cellulose fine fibers" as used herein means cellulose fine fibers of which at least some of the three hydroxyl groups in the glucopyranose unit of the backbone of the cellulose molecules of the cellulose fine fibers have been chemically modified. The term "some" in this case means that at least one of the hydroxyl groups of at least one glucopyranose unit in the cellulose structure having multiple polymerized glucopyranose units is chemically modified. According to a typical aspect, the cellulose as a whole is not chemically modified, and the chemically modified cellulose fine fibers retain the crystal structure of the cellulose before chemical modification. For example, a type I cellulose crystal structure can be confirmed during analysis by X-ray diffraction (XRD).

According to one aspect, the cellulose fine fibers are chemically modified on at least their surfaces. With cellulose fine fibers that are chemically modified on at least their surfaces, the length-weighted mean fiber length of fibers with fiber lengths of 100 μm or greater is 110 μm to 500 μm in measurement with an automatic fiber shape analyzer, and the number frequency of fibers with fiber lengths of 411 μm or greater among the fibers with fiber lengths of 100 μm or greater is 54% or lower.

The cellulose fine fibers that are chemically modified on at least their surfaces are cellulose fine fibers in which at least some of the hydroxyl groups in the cellulose backbone have been chemically modified. Chemically modified cellulose fine fibers are usually either chemically modified in the entire region from the surface to the interior, or they have their surfaces chemically modified but also have non-chemically modified regions. The cellulose fine fibers according to one aspect have chemically modified surfaces and also non-chemically modified regions. According to one aspect, even if the cellulose fine fibers have their surfaces chemically modified, the crystal structure before chemical modification is maintained without any change in the overall crystal structure of the cellulose fine fibers (for example, a type I cellulose crystal structure can be confirmed in XRD analysis of the cellulose fine fibers). Such cellulose fine fibers can be considered to have chemically modified surfaces and non-chemically modified regions. In other words, according to one aspect of the invention the cellulose fine fibers have a type I cellulose crystal structure.

Cellulose fine fibers according to one aspect preferably satisfy the following fiber shape parameters in measurement with an automatic fiber shape analyzer:
(1) the mean fiber size is 42.5 μm or smaller,
(2) the fine fiber area ratio is 90% or lower,
(3) the number frequency of fibers with fiber lengths of 20 μm to 56 μm among the fibers with fiber lengths of less than 100 μm is 30% to 97%, and
(4) the fibrillation rate is 5% or lower.

When the cellulose fine fibers are prepared as a 5 ppm by solid mass dispersion in dimethyl sulfoxide (DMSO) and cast and dried onto a smooth substrate to obtain a sample, preferably in a scanning electron microscope (SEM) image of the surface of the sample, the proportion of the total area occupied by ultrafine fibers with an occupied area of 15 μm$^2$ or less is 10% to 80% with respect to the total area occupied by the cellulose fine fibers.

(Fiber Shape Autoanalyzer)

The features of the cellulose fine fibers of the embodiment are determined using an automatic fiber shape analyzer (Morfi Neo by Techpap, according to one aspect). The measurement procedure is as follows. The fiber parameters for measurement are based on a threshold fiber length of 100 μm, with normal fibers being defined as fibers with fiber lengths of 100 μm or greater, and fine fibers being defined as fibers with fiber lengths of less than 100 μm.

1. The cellulose fine fibers are dispersed in purified water to prepare a 1 L aqueous dispersion. The final solid concentration of the cellulose fine fibers is 0.003 to 0.005 mass %. A dispersion of the cellulose fine fibers at less than 2 mass % before dilution can be simply mixed with a spatula, but for an aqueous dispersion, wet cake or powder at 2 mass % or greater, a high-shear homogenizer (trade name: "ULTRA-TURRAX T18" by IKA Co., according to one aspect) may be used for dispersion treatment with treatment conditions of 25,000 rpm×5 min. When the dispersion is in a medium other than water, a high-shear homogenizer is used for dispersion treatment in a sufficient amount of purified water with treatment conditions of 25,000 rpm×5 min, after which the medium is removed by suction filtration or other means, and the high-shear homogenizer is again used for dispersion treatment in purified water with treatment conditions of 25,000 rpm×5 min to a final solid concentration of 0.003 to 0.005 mass %, to exchange the medium with water.

2. The aqueous dispersion prepared in 1. is supplied to an autosampler for measurement.

3. The measurement results are outputted to a txt (or csv) file.

4. Each of the shape parameters is extracted or calculated based on the measurement results. The following values were used for each parameter, from among the measured values.

(1) Mean fiber length: Mean arithmetic length [μm]
(2) Length-weighted mean fiber length for normal fibers (fiber lengths of 100 μm or greater): Mean length-weighted length [μm]
(3) Number frequency of fibers with fiber lengths of 411 μm or greater, for normal fibers (fiber lengths of 100 μm or greater): Calculated from the length-weighted fiber length distribution of normal fibers (length-weighted fiber length, μm).
(4) Mean fiber size: Mean fiber width [μm]
(5) Fine fiber area ratio: Fine content, % in area
(6) Number frequency of fibers with fiber lengths of 20 μm to 56 μm, for fine fibers (fiber lengths of less than 100 μm): Calculated from the fiber length distribution of the fine fibers (fine length, μm: FL).
(7) Fibrillation rate: Macrofibrillation index [%]

Since any data range may be set for measurement of the fiber length distribution using the device, any setting may be used that allows confirmation of the distribution of fibers with the aforementioned fiber lengths.

Each of the shape parameters will be described in detail below.

(Mean Fiber Length)

The cellulose fine fibers according to one aspect have a mean fiber length of 110 μm to 500 μm or 130 μm to 350 μm, as measured by an automatic fiber shape analyzer. The mean fiber length is the mean arithmetic fiber length, and for bent fibers it is the length connecting the ends by a straight line. If the mean fiber length is within this range, the fibers will be evenly distributed when mixed with the resin, improving the stress transferability and increasing the strength and fracture strain. The mean fiber length of the cellulose fine fibers is preferably 150 μm to 250 μm and more preferably 160 μm to 200 μm.

(Length-Weighted Mean Fiber Length)

For the cellulose fine fibers according to one aspect, the length-weighted mean fiber length for normal fibers (fiber lengths of 100 μm or greater) is 110 μm to 500 μm, preferably 120 μm to 400 μm and more preferably 130 μm to 350 μm, as measured with an automatic fiber shape analyzer. The length-weighted mean fiber length is as defined by ISO/FDIS 16065-2:2006, and for bent fibers it is the average value for fiber lengths corresponding to the actual fiber lengths in consideration of their bent shapes. Among different types of cellulose fine fibers, it is particularly advantageous to control the fiber lengths of normal fibers to the specified range. That is, fiber lengths of normal fibers within this range will allow uniform dispersion when mixed with the resin, without formation of aggregates by entangling of excessively long fibers, and will improve the stress transferability, thereby increasing the strength and fracture strain.

(Fiber Length Distribution of Normal Fibers)

With the cellulose fine fibers according to one aspect, the number frequency of fibers with fiber lengths of 411 μm or greater among the normal fibers (fiber lengths of 100 μm or greater) is 54% or lower, in measurement with an automatic fiber shape analyzer. The number frequency can be calculated from the length-weighted fiber length distribution. For bent fibers, the length-weighted fiber length is the fiber length corresponding to the actual fiber length in consideration of the bent shape. Fiber lengths of normal fibers within this range will allow uniform dispersion when mixed with the resin, without formation of aggregates by entangling of excessively long fibers, and will improve the stress transferability, thereby increasing the strength and fracture strain. The number frequency of fibers with fiber lengths of 411 μm or greater among the normal fibers is preferably 40% or lower and more preferably 30% or lower. The lower limit is not particularly restricted and may be 0% or greater.

(Mean Fiber Size)

The cellulose fine fibers of the embodiment have a mean fiber size of preferably 42.5 μm or smaller, 41.5 μm or smaller, 40 μm or smaller, 38 μm or smaller, 35 μm or smaller, 30 μm or smaller or 25 μm or smaller, as measured with an automatic fiber shape analyzer. That the length-weighted mean fiber length and/or the mean fiber length are within the aforementioned ranges while the mean fiber size is also within this range, means that the L/D of the individual cellulose fine fibers is sufficiently large. A large L/D results in entanglement between the cellulose fine fibers in the resin, thus allowing the strength of the fiber-reinforced resin to be increased. A narrow fiber size is preferred for a large L/D, but it may be 1.5 μm or greater from the standpoint of the resolving power of the measuring apparatus. It is also preferably 15 μm or greater from the viewpoint of at least a minimum thickness that is advantageous for increasing the bending elasticity of the fiber-reinforced resin.

(Mean Fiber Size in Terms of Specific Surface Area)

For cellulose fine fibers, the specific surface area generally corresponds to the mean fiber size, with a smaller mean fiber size being associated with larger specific surface area. According to one aspect, from the viewpoint of increasing the strength of the fiber-reinforced resin, the specific surface area is preferably 20 $m^2/g$ or greater, 30 $m^2/g$ or greater or 40 $m^2/g$ or greater, while from the viewpoint of increasing the bending elasticity of the fiber-reinforced resin it is preferably 100 $m^2/g$ or lower, 80 $m^2/g$ or lower or 60 $m^2/g$ or lower.

The mean fiber size converted from specific surface area by the procedure described below under EXAMPLES (also referred to herein as "converted mean fiber diameter") may be 20 nm or greater or 30 nm or greater from the viewpoint of increasing the bending elasticity of the fiber-reinforced resin, while from the viewpoint of increasing the strength of the fiber-reinforced resin by producing entanglement between cellulose fine fibers in the resin, it is 150 nm or lower, 130 nm or lower or 100 nm or lower.

(Fine Fiber Area Ratio)

The cellulose fine fibers of the embodiment have a fine fiber area ratio of preferably 90% or lower, 85% or lower, 80% or lower, 75% or lower, 60% or lower or 50% or lower, as measured with an automatic fiber shape analyzer. The fine fiber area ratio is the proportion of the total summed area of fine fibers with fiber lengths of less than 100 μm in an observation image, among the total summed area of all the fibers in the observation image (normal fiber area+fine fiber area). If the fine fiber area ratio is within this range, the brittle interface between the cellulose in the resin and the resin will not be too large, and there will be fewer fracture origins, resulting in greater fracture strain. The fine fiber area ratio is preferably 5% or greater, 10% or greater, 20% or greater or 30% or greater from the viewpoint of helping to create orientation when mixed with the resin, and of obtaining a satisfactory effect of increasing the strength and elastic modulus of the fiber-reinforced resin.

(Fiber Length Distribution of Fine Fibers)

For the cellulose fine fibers of the embodiment, the number frequency of fibers having fiber lengths of 20 μm to 56 μm among the fine fibers (fibers with fiber lengths of less than 100 μm) is preferably 97% or lower, 90% or lower, 85% or lower, 80% or lower, 75% or lower, 70% or lower or 65% or lower, as measured with an automatic fiber shape analyzer. Such fine fibers have fiber lengths with overly short fiber lengths, and thus tend to have poor stress transferability and contribute little to improved strength. By controlling the number frequency of the fine fibers to within the prescribed range it is possible to obtain an especially effective reinforcing effect. Fine fibers with fiber lengths of 20 μm to 56 μm are produced in significant amounts by micronization treatment of the cellulose starting material, and their number frequency may be 5% or greater according to one aspect, or 30% or greater, 50% or greater, 55% or greater or 60% or greater, according to another aspect.

According to a preferred aspect, the number frequency of fibers with fiber lengths of 20 μm to 56 μm among the fine fibers (fiber lengths of less than 100 μm) is within the range specified above, while the number frequency of fibers with fiber lengths of 411 μm or greater among the normal fibers (fiber lengths of 100 μm or greater) is 30% or lower. Fibers with fiber lengths of 411 μm or greater are excessively long, and therefore readily tend to aggregate in the resin and contribute little to improving the elastic modulus. It is therefore effective for the number frequency of fibers with fiber lengths of 411 μm or greater to be controlled to preferably 10% or lower and more preferably 5% or lower.

While the lower limit is not particularly restricted, it may be 1% or greater according to one aspect, since it is difficult to completely eliminate fibers with fiber lengths of 411 μm or greater.
(Fibrillation Rate)

The cellulose fine fibers of the embodiment have a fibrillation rate of preferably 5% or lower, as measured with an automatic fiber shape analyzer. For fibers having at least a partially branched structure, where the main chain is the section with the largest diameter, the fibrillation rate is the proportion of the total length of n branched side chains L (Sub) with respect to the main chain length L (Main), as defined by the following formula.
[Formula 1]

$$\text{Fibrillation rate } [\%] = 100 \times \sum_{i=0}^{n} L \text{ (Sub) }_n / L \text{ (Main)}$$

If the fibrillation rate is within this range, the surface area of each of the cellulose fine fibers will be low, the brittle interface between the cellulose in the resin and the resin will not be too large, and there will be fewer fracture origins, resulting in a greater fracture strain. The fibrillation rate of the cellulose fine fibers is preferably 4% or lower, 3% or lower, 2.5% or lower or 2% or lower. The lower limit is not particularly restricted, but according to one aspect it is 0% or greater, 0.01% or greater or 0.1% or greater.
<Occupied Area Ratio of Ultrafine Fibers in SEM Photograph>

When the cellulose fine fibers are dispersed in dimethyl sulfoxide (DMSO) at a solid content of 5 ppm by mass, and cast and dried onto a smooth substrate to obtain a sample, and the surface of the sample is observed in a scanning electron microscope (SEM) image, preferably the proportion of the total area occupied by ultrafine fibers with an occupied area of 15 μm² or less with respect to the total area occupied by the cellulose fine fibers, i.e. the occupied area ratio of the ultrafine fibers, is 10% to 80%. The ultrafine fibers are fibers in a region that cannot be measured by the resolving power of the element in an automatic fiber shape analyzer, and if the occupied area ratio of the ultrafine fibers is too large, the excessive number of nanosize fibers will tend to lead to aggregation of the ultrafine fibers in the resin, often producing fracture origins. If the occupied area ratio of the ultrafine fibers is too small, on the other hand, it will not be possible to obtain a satisfactory nano network due to the lack of nanosize fibers, and the strength will therefore tend to be low. From the same viewpoint, the occupied area ratio of the ultrafine fibers is more preferably 15% to 75%, even more preferably 20% to 70% and most preferably 20% to 65%. Cellulose fine fibers in which the occupied area ratio of the ultrafine fibers is within this range may be micronized using one or more physical methods, and they are generally referred to as cellulose nanofibers, CNF, CeNF or micronized cellulose fine fibers. The occupied area ratio of the ultrafine fibers is measured by the following procedure.

1. An aqueous dispersion of cellulose fine fibers with a solid concentration of 0.2 to 2 mass % is diluted to a solid content of 5 ppm by mass using dimethyl sulfoxide (DMSO), and a homogenizer ("ULTRA-TURRAX T18", trade name of IKA, according to one aspect) is used for stirring at 3000 rpm for 30 seconds, to prepare a DMSO dispersion.

2. A smooth substrate (a silicon wafer or glass panel) is subjected to osmium plasma coating and heated on a hot plate at 130° C.

3. A 7 μL portion of the DMSO dispersion is dropped onto the center of the heated smooth substrate and allowed to dry while heating, to fix the cellulose fine fibers onto the substrate.

4. The obtained substrate with the fixed cellulose fine fibers is photographed using a scanning electron microscope (SEM), with an acceleration voltage of 1.5 kV and an observation magnification of 400×, taking 4 images at different arbitrary locations on the substrate at a resolution of at least 400 pixels per 100 μm.

5. The number of pixels corresponding to 15 μm² is counted as the threshold, from the number of pixels on the scale bar of the SEM photograph.

6. Image processing software (ImageJ) is used to create a binarized image from the obtained SEM photograph by the MaxEntropy method.

7. The binarized image is analyzed by particle analysis using "Analyze Particle" in ImageJ, and the area (pixels) of monofilaments in the cellulose fine fibers is calculated.

8. The particle analysis results for the 4 images are summed and, deleting two pixels or fewer as noise, areas of less than 15 μm² (as the threshold) are considered to be ultrafine fibers, and the proportion of ultrafine fiber area of less than 15 μm² occupying the total area of the cellulose fine fibers is calculated.
<Control of Cellulose Fine Fiber Shapes>

One or more of the following methods may be used as the method for obtaining the characteristic fiber shapes of the cellulose fine fibers of the embodiment which are, more specifically, the fiber shapes in which the length-weighted fiber lengths of normal fibers, the mean fiber length, the mean fiber size, the fine fiber area ratio, the fine fiber lengths, the fibrillation rate and/or the occupied area ratio of the ultrafine fibers are in the ranges of the embodiment (according to one aspect), or the fiber shapes in which the mean fiber lengths, the mean fiber sizes, the fine fiber area ratio (occupied area ratio of the ultrafine fibers), the number frequency of fibers with fiber lengths of 20 μm to 56 μm among the fibers with fiber lengths of less than 100 μm, the number frequency of fibers with fiber lengths of 411 μm or greater among the fibers with fiber lengths of 100 μm or greater, and/or the fibrillation rate, are in the ranges of the embodiment (according to another aspect). Using a disc refiner for micronization of the cellulose starting material, and especially adjusting the disc structure and/or conditions of use of the disc refiner, may be especially advantageous for obtaining the desired fiber shapes for the embodiment.
(Cellulose Starting Material)

The starting material for the cellulose fine fibers is not particularly restricted, and a wood-based cellulose starting material (such as conifer chips or broadleaf tree chips, or a nonwood cellulose starting material (such as cotton, hemp, bagasse, kenaf, bamboo, straw, sea weed, algae, sea squirt or bacterial cellulose-derived material), may be used. A type I high-crystalline cellulose starting material is preferably used, for example, wood pulp such as conifer pulp or hardwood pulp, or nonwood pulp such as cotton linter pulp, hemp pulp, bagasse pulp, kenaf pulp, bamboo pulp or straw pulp. According to a preferred aspect, the cellulose fine fibers are plant-derived.

According to another aspect, the cellulose starting material has a mean fiber length (length-weighted mean fiber length) of 3 mm or smaller and/or the number ratio of fibers with fiber lengths of 3 mm or larger is 20% or lower, based on measurement with an automatic fiber shape analyzer. If the cellulose starting material has such a specified fiber length distribution, energy transfer during micronization and beating will be satisfactory during the defibrating step (beating with a disc refiner or high-pressure homogenizer, for example), while clogging will be less likely to occur, resulting in stable defibration treatment even with a relatively high concentration of cellulose.

The mean fiber length is more preferably 2.5 mm or smaller, even more preferably 2.0 mm or smaller and most preferably 1.6 mm or smaller. Since a smaller mean fiber length increases the aforementioned effect the lower limit is not particularly restricted, but it is preferably 0.1 mm or greater and more preferably 0.5 mm or greater in consideration of mechanical properties when the beaten cellulose fine fibers are used as a resin filler.

The number ratio of fibers with fiber lengths of 3 mm or greater is more preferably 15% or lower and even more preferably 10% or lower. Since a smaller value increases the aforementioned effect the lower limit is not particularly restricted, but the range for realistic pretreatment is preferably 0.5% or greater and more preferably 1% or greater.

The fiber lengths of the cellulose starting material can be measured using an automatic fiber shape analyzer (Morfi Neo by Techpap). The measurement procedure is as follows.

The cellulose starting material is dispersed in purified water to prepare a 1 L aqueous dispersion. The final solid concentration of the cellulose starting material is 0.003 to 0.005 mass %. A dispersion of the cellulose starting material at less than 2 mass % before dilution can be simply mixed with a spatula, but for an aqueous dispersion, wet cake or powder at 2 mass % or greater, a high-shear homogenizer (trade name: "ULTRA-TURRAX T18" by IKA Co.-) may be used for dispersion treatment with treatment conditions of 25,000 rpm×5 min. When the dispersion is in a medium other than water, a high-shear homogenizer ("ULTRA-TURRAX T18", trade name of IKA) is used for dispersion treatment in a sufficient amount of purified water with treatment conditions of 25,000 rpm×5 min, after which the medium is removed by suction filtration or other means, and a high-shear homogenizer ("ULTRA-TURRAX T18", trade name of IKA) is again used for dispersion treatment in purified water with treatment conditions of 25,000 rpm×5 min to a final solid concentration of 0.003 to 0.005 mass %, to exchange the medium with water.

The prepared aqueous dispersion is supplied to an autosampler for measurement. The obtained measurement results are outputted to a txt (or csv) file, and the shape parameters are extracted or calculated based on the measurement results. The following values are used for each parameter, from among the measured values.

1) Length-weighted mean fiber length: Mean length-weighted length [μm]
2) Proportion of fibers with fiber lengths of 3 mm or greater: The proportion of the number of fibers with fiber lengths of 3 mm or greater occupying the total fibers is calculated by the following formula, based on a histogram of the fiber length distribution of 1).

Proportion of fibers with fiber lengths of 3 mm or greater (%)=number of fibers with fiber lengths of 3 mm or greater/ total number of measured fibers×100

3) Mean fiber size: Mean fiber width [μm]

(Pretreatment of Cellulose Starting Material)

In order to obtain a cellulose starting material of the embodiment having the fiber lengths controlled to a specific range, defibration (such as beating treatment) may be carried out after one or more pretreatments selected from among crushing, grinding and sorting. Pretreatment according to one aspect is treatment that produces a pretreated cellulose starting material wherein the mean fiber length is 3 mm or smaller and/or the number ratio of fibers with fiber lengths of 3 mm or larger is 20% or lower, from a cellulose starting material wherein the mean fiber length is larger than 3 mm and the number ratio of fibers with fiber lengths of 3 mm or larger is greater than 20%.

The crushing treatment of the embodiment is crushing treatment of the cellulose starting material in a dry system, the crusher used may be a coarse crusher, an intermediate crusher or a fine crusher.

A coarse crusher may be a jaw crusher (a crusher that seizes a starting material between a fixed plate and a movable plate and crushes it with powerful compressive force), a gyratory crusher (a crusher that seizes a starting material between a fixed cone cave and an eccentrically rotating mantle and crushes it with compressive force), or an impact crusher (a crusher that crushes a starting material under blows by an impact blade fitted on a high-speed rotating cylindrical rotor, and further crushes the starting material under blows on a repulsion board at high speed).

An intermediate crusher may be a roll crusher (a crusher having several cylindrical horizontal rolls disposed, which crushes by passing a starting material through their gaps under the pressure of two rolls with different rotational directions and rotational speeds), an edge runner (a crusher that tumbles two heavy rollers with large diameters on a horizontal disk for compaction and shearing, to cause crushing, mixing and kneading of the starting material), a disintegrator (a crusher that crushes by rotating two steel cage rotors in opposite directions around a concentric shaft to apply impact force to a starting material supplied into the rotor by centrifugal force and rotating action), a SAG (Semi-Autogenous Grinding mill) or an automatic grinding mill.

A SAG mill is a crusher that uses both large stones and metal balls for crushing. In a SAG mill it is common to use smaller balls of which 6 to 15% are charged. Rotation of a drum causes the interior large stones and iron balls to be thrown around, impacting with and crushing the material. The material can be further reduced in particle size by friction. A SAG mill has a characteristic diameter size and short cylinder length, with a plate oriented so as to mix the material inside the mill.

In an automatic grinding mill (also known as a ROM (Run of Mine)), a rotating drum causes large stones to be thrown around, the stones impacting each other to cause compaction of the particles. While the principle resembles that of a SAG mill, it differs in that no metal balls are used.

A fine crusher may be a screen type (screen mill), turntable type, axial flow type or ball mill-type, or a rod mill or jet mill.

In a ball mill-type crusher, usually sand or metal balls are packed into a cylinder that rotates horizontally or slightly inclined, with crushing being carried out by impact and friction with the balls. The material to be crushed is supplied through one end of the cylinder and the crushed product is discharged from the other end.

A rod mill has almost the same structure as a ball mill, except that the crushing medium used is not balls but rods (metal cylinders). A rotating drum (body) causes crushing by impact of the rods with the material to be crushed. Compared to a ball mill, this method is less likely to result in overcrushing and can therefore yield a crushed product with relatively homogeneous particle sizes.

In a jet mill, compressed air is utilized to generate a supersonic airflow for crushing of a material to be crushed. Jet mills include pancake types comprising jet nozzles aligned in a spiral fashion, and impact types in which a supersonic airflow is sprayed through jet nozzles onto an impact board.

Treatment of a cellulose starting material according to the embodiment is preferably with an intermediate crusher or fine crusher, and more preferably with a fine crusher. A screen-type fine crusher is preferred for excellent throughput capacity.

Grinding treatment for the embodiment is treatment in which a cellulose starting material is dispersed in an aqueous medium and subjected to crushing treatment in the aqueous dispersion, being distinguished from crushing treatment according to the embodiment in that it is carried out in a wet system. The aqueous medium may be water itself, or a mixed medium of water with one or more organic solvents selected from among monohydric alcohols such as ethanol, n-propanol, isopropanol and butanol, polyhydric alcohols such as ethylene glycol, diethylene glycol and glycerin, ketones such as acetone, nitrile-based solvents such as acetonitrile, and pyrrolidone-based solvents. The mixing ratio of the organic solvent in a mixture of water with the organic solvent is preferably less than 50 mass %, more preferably 30 mass % or lower and most preferably 20 mass % or lower. A higher water ratio corresponds to more excellent grindability, while a higher organic solvent ratio helps reduce aggregation of fine fibers during the drying step after grinding. The proportion of organic solvent is therefore preferably set in consideration of balance between grindability and reducing aggregation. The grinder used for the embodiment may be a rotating stone mill, a crusher, a planetary mixer, a single-screw extruder, a twin-screw extruder or a bead mill.

A bead mill is a medium-stirring crusher that carries out nanodispersion or fine grinding of powder using beads. The material to be treated and the beads (media) are placed in a crushing chamber (vessel), and energy is applied to the beads by centrifugal force produced by high-speed rotation using a stirring mechanism, whereby the grinding particles are crushed by sliding stress, shearing stress, friction force and impact force.

Of these crushers, a rotating stone mill, crusher or planetary mixer is preferred for better adjustment of the fiber length distribution. The cellulose concentration in the aqueous dispersion used for grinding is preferably 50 mass % or lower, more preferably 25 mass % or lower and most preferably 20 mass % or lower. In consideration of grinding efficiency, the lower limit is preferably 1 mass % or higher, more preferably 2 mass % or higher, even more preferably 5 mass % or higher and most preferably 10 mass % or higher.

Sorting treatment for the embodiment is a procedure for separation according to fiber length in order to group the fiber lengths of the cellulose starting material, and any method such as dry sorting or wet sorting may be used. Dry sorting may be gravitational field sorting, inertial field sorting or centrifugal field sorting (a natural vortex type or forced vortex type), and wet sorting may be gravitational field sorting, centrifugal field sorting (free vortex type) or centrifugal field sorting (forced vortex type). Sorting using mesh openings of a sieve, screen, wire (edge wire) or net, or sorting by centrifugal separation, may also be used. In consideration of production efficiency it is preferred to carry out sorting with mesh openings, it is more preferred to use a dry cyclone or screen or a wet screen or edge wire, it is even more preferred to use a wet screen or edge wire, and it is most preferred to use a wet edge wire.

In order to inhibit discoloration or loss of physical properties by heating when composited with the resin, the glucose content of the cellulose starting material and/or cellulose fine fibers of the embodiment as determined by constituent sugar analysis is preferably 80 mass % or greater, and the cellulose fiber starting material used for production of the cellulose fine fibers also preferably has a glucose content of 80 mass % or greater as determined by constituent sugar analysis. The glucose content is more preferably 85 mass % or greater, 90 mass % or greater, 91 mass % or greater or 93 mass % or greater. The glucose content is also preferably 99.5 mass % or lower or 99 mass % or lower, to limit impurities that may be included during the step of harvesting and purification of the cellulose starting material, or during the step of producing the cellulose fine fibers (for example, fat or oil components, or other contaminants that are not polysaccharides). Maintaining a high numerical value for the glucose content of the cellulose fine fibers generally corresponds to high cellulose purity, or in other words, a low amount of components such as lignin or hemicellulose that can lower the high elastic modulus or high heat-resistance of the cellulose fine fibers.

The method used for measuring the glucose content by constituent sugar analysis was the following. Constituent sugar analysis may be carried out with reference to the analysis protocol established by the National Renewable Energy Laboratory of the US Dept. of Energy (Sluiter, A., Hames, B., Ruiz, R., Scarlata, C., Sluiter, J., Templeton, D., Crocker, D.: Determination of structural carbohydrates and lignin in biomass. National Renewable Energy Laboratory (NREL), USA, 2008). A 3 ml portion of 72% sulfuric acid is added to 200 mg of sample and allowed to swell at 30° C. for 1 hour, after which it is poured into a 125 ml pressure bottle with 84 ml of purified water and subjected to hydrolysis for 120° C. for 1 hour. Suction filtration is then carried out while hot using a 1G-3 glass filter (having constant mass at 105° C.), and after solid-liquid separation, the filtrate is brought to a constant volume of 100 ml and the constituent sugars are quantified by high performance liquid chromatography (HPLC) (FL detection method).

A preferred example of a cellulose starting material is refined cellulose fibers. Refined cellulose fibers are a refined cellulose starting material such as refined pulp or refined cotton obtained from conifer chips, broadleaf tree chips or a nonwood cellulose starting material (derived from cotton, hemp, bagasse, kenaf, bamboo, straw, sea weed, algae, sea squirt or bacterial cellulose), through steps of digestion for delignification, and steps of purification and bleaching for hemicellulose removal. Cotton fibers or cotton linter, or bacterial-derived cellulose starting materials are especially preferred because of their high cellulose purity. Cut yarns of regenerated cellulose fiber may be used as starting material for cellulose fine fibers, and cut yarns of regenerated cellulose obtained by electrospinning methods may be used as refined cellulose fiber starting material for cellulose fine fibers. The suitable conditions for refining treatment (the digestion temperature, the alkali concentration during digestion, and the bleaching agent concentration and bleaching time) may be set depending on the type of cellulose starting material selected, for production of refined cellulose fibers retaining high cellulose purity and use as starting material.

In light of recent demands for realizing a more sustainable society, recycled materials such as recycled cotton or recycled wood may also be used as cellulose starting materials. Recycled cotton may be fibers produced by collecting and breaking up cut cotton waste and fallen cotton discarded at spinning factories and sewing factories, or fibers obtained by breaking up cotton that has already been used in fabrics and clothing. Recycled wood is obtained by converting sawmill remnants, construction wood, thinnings and forest residue into chips, and forming them into pulp by a common method. Of the recycled materials mentioned above, the cellulose starting material is preferably recycled cotton.

In order to obtain high purity refined cellulose fibers it may be effective in some cases to subject the cellulose fibers or the aforementioned refined cellulose fibers to further impregnation with water and heat treatment at a temperature of 100° C. or higher, or alkali treatment in which the cellulose fibers or the refined cellulose fibers are impregnated with a strong aqueous alkali solution such as sodium hydroxide (alkali concentration: 1 mass % to 10 mass %) and allowed to stand or stirred at 0° C. to 60° C. for a fixed time period, and then repeatedly washed, or enzymatic treatment in which the cellulose fibers or the refined cellulose fibers are further impregnated with water and reacted with a hemicellulose-degrading enzyme or cellulase such as xylase or mannanase at a temperature of 35° C. to 55° C., or to any combination of the aforementioned three types of treatment. Such treatment has the effect of not only reducing the load in the micronization treatment, but also of causing impurity components such as lignin and hemicellulose, which are present on the surfaces and in the gaps of the microfibrils forming the cellulose fibers, to be discharged into the aqueous phase, resulting in higher cellulose purity of the refined cellulose fibers, and the treatment is therefore highly effective. Particularly when bacterial cellulose is used as starting material, washing treatment with cold water at 2° C. to 10° C. is effective as a purification method to allow removal of the water-soluble polysaccharide components that are simultaneously produced with bacterial cellulose.

(Degree of Crystallinity)

According to one aspect, the cellulose starting material and/or cellulose fine fibers may have a type I cellulose crystal structure or a type II cellulose crystal structure. According to a preferred aspect, the cellulose fine fibers have a type I cellulose crystal structure. The degree of crystallinity of the cellulose starting material or cellulose fine fibers of the embodiment is preferably 55% or greater or 60% or greater. If the degree of crystallinity is within this range, the mechanical properties of the cellulose fine fibers themselves (especially the strength and dimensional stability) will increase, tending to result in higher strength and dimensional stability of the fiber-reinforced resin comprising the cellulose fine fibers dispersed in the resin. The degree of crystallinity of the cellulose starting material or cellulose fine fibers is preferably 65% or higher, more preferably 70% or higher and most preferably 80% or higher. Since a higher degree of crystallinity tends to be preferable, the upper limit is not particularly restricted, but from the viewpoint of productivity it is preferably an upper limit of 99%.

Alkali-soluble polysaccharides such as hemicellulose and acid-insoluble components such as lignin are present between plant-derived cellulose microfibrils and between microfibril bundles. Hemicellulose is a polysaccharide composed of sugars such as mannan and xylan, and it plays a role in hydrogen bonding with cellulose and binding together microfibrils. Lignin is a compound with an aromatic ring that is known to participate in covalent bonding with hemicellulose in plant cell walls. A large residue of impurities such as lignin in cellulose fine fibers may result in discoloration by heating during working, and therefore the degree of crystallinity of the cellulose fine fibers is preferably within the ranges specified above from the viewpoint of reducing discoloration of the fiber-reinforced resin during extrusion or during shaping.

When the cellulose is type 1 cellulose crystals (derived from natural cellulose), the degree of crystallinity referred to here is that determined by the following formula, from the diffraction pattern (2θ/deg.=10 to 30) obtained by measurement of the sample by wide-angle X-ray diffraction, based on the Segal method.

$$\text{Degree of crystallinity (\%)} = [I_{(200)} - I_{(amorphous)}]/I_{(200)} \times 100$$

$I_{(200)}$: Diffraction peak intensity at 200 plane (2θ=22.5°) for type I cellulose crystal $I_{(amorphous)}$: Amorphous halo peak intensity for type I cellulose crystal, peak intensity at angle of 4.5° lower than diffraction angle at 200 plane (2θ=18.0°).

When the cellulose is type II cellulose crystals (derived from regenerated cellulose), the degree of crystallinity is determined by the following formula, from the absolute peak intensity h0 at 2θ=12.6° attributed to the (110) plane peak of the type II cellulose crystal, and the peak intensity h1 from the baseline for the plane spacing, in wide-angle X-ray diffraction.

$$\text{Degree of crystallinity (\%)} = h1/h0 \times 100$$

The known crystalline forms of cellulose include type I, type II, type III and type IV, among which type I and type II are most commonly used, whereas type III and type IV are not commonly used on an industrial scale but have been obtained on a laboratory scale. The cellulose starting material or cellulose fine fibers of the disclosure preferably contain type I cellulose crystals and type II cellulose crystals, for relatively high mobility in terms of structure and to obtain a resin composition with a lower coefficient of linear expansion and more excellent strength and elongation when subjected to stretching or bending deformation, by dispersion of the cellulose fine fibers in the resin, and more preferably they contain type I cellulose crystals and have a degree of crystallinity of 55% or higher.

(Chemical Modification)

The cellulose fine fibers of the embodiment are cellulose fine fibers modified by chemical modification of the hydroxyl groups on the cellulose fine fiber surfaces, and they may be subjected to micronization treatment after chemical modification in the state before defibration (the pulp state, according to one aspect), or they may be chemically modified after being converted to cellulose fine fibers by micronization treatment. In order to obtain low halogen cellulose fine fibers, they are preferably chemically modified in the state before defibration, and then subjected to defibration treatment. In the case of pretreatment before defibration, the chemical modification may be carried out before pretreatment, but it is preferably carried out after pretreatment.

The method of chemical modification may be esterification, etherification or urethane formation, with esterification being preferred. Preferred is saturated monocarboxylic acid esterification such as acetic acid esterification (acetylation), propionic acid esterification, pentanoic acid (valeric acid) esterification or hexanoic acid (caproic acid) esterification, among which acetic acid esterification (acetylation) is more preferred for heat resistance of the modified (chemically modified) cellulose fine fibers, although esterification using a dicarboxylic acid, such as phthalic acid esterification, may also be used. Chemical modification may be carried out by common esterification reaction using a saturated carboxylic acid or its acid anhydride or acid chloride, or a saturated vinyl monocarboxylate such as vinyl acetate or vinyl propionate.

For chemical modification of the cellulose starting material (such as pulp) before micronization treatment, the chemical modification is preferably carried out in a solvent that satisfactorily swells the cellulose starting material, in order to cause chemical modification up to the fiber surfaces of the cellulose starting material. The solvent used to satisfactorily swell the cellulose starting material is an aprotic polar solvent according to one aspect, and it is preferably dimethyl sulfoxide (DMSO), N-methyl-2-pyrrolidone (NMP), N,N-dimethylformamide (DMF), N,N-dimethylacetamide (DMAc), or a mixture of these.

When chemical modification is to be carried out after micronization treatment, the cellulose fine fibers are concentrated by suction filtration, for example, forming a wetted cake which is then diluted and dispersed in a solvent to achieve the chemical modification. The method of chemical modification may be the same as for chemical modification of the cellulose starting material. Since excessive drying can cause aggregation of the cellulose fine fibers, the cellulose solid concentration is preferably 30 mass % or lower and more preferably 20 mass % or lower. When an esterifying agent is used, the esterifying agent preferably has a low introduced moisture content since it will also react with water, and therefore the lower limit for the cellulose solid concentration is preferably 5 mass % or greater or 10 mass % or greater. When chemical modification is difficult to achieve in the presence of water, the chemical modification may be carried out after repeated operation of suction filtration of a dispersed slurry prepared by diluting and dispersing in a solvent and then adding additional solvent, in order to reduce the moisture content of the system. Even if chemical modification is carried out after micronization treatment, the solvent used is preferably one that satisfactorily swells the pulp so that chemical modification can be carried out uniformly, but since the surfaces of the cellulose fine fibers are exposed, a solvent other than this type of solvent may also be used.

When the group introduced by chemical modification is an acyl group (such as an acetyl group), the degree of substitution (DS) of acyl groups (the acylation degree, such as the acetylation degree) is preferably 0.5 or greater, more preferably 0.6 or greater and even more preferably 0.7 or greater. The upper limit is preferably 1.3 or lower, more preferably 1.1 or lower and even more preferably 1.0 or lower, since an excessively high DS lowers the degree of crystallinity, tending to lower the mechanical properties of the resin composition obtained by compositing the cellulose fine fibers and resin.

The degree of acyl substitution (DS) can be calculated based on the peak intensity ratio between the acyl group-derived peak and the cellulose backbone-derived peak, in the reflective infrared absorption spectrum of the esterified cellulose nanofibers. The peak of the absorption band for C═O based on acyl groups appears at 1730 cm$^{-1}$, while the peak of the absorption band for C—O based on the cellulose backbone chain appears at 1030 cm$^{-1}$ (see FIG. 1). The DS of esterified cellulose nanofibers can be calculated using:

Degree of substitution DS=4.13×IR index (1030), from a calibration curve derived from a correlation graph drawn between DS obtained from solid NMR measurement of the esterified cellulose nanofibers described below, and the modification rate (IR index 1030), defined by the ratio of the peak intensity of the absorption band for C═O based on acetyl groups with respect to the peak intensity of the absorption band for C—O of the cellulose backbone chain.

The method of determining DS of the esterified cellulose nanofibers by solid NMR may be $^{13}$C solid NMR measurement of the freeze-shattered esterified cellulose nanofibers, and calculation of the value by the following formula using the area intensity (Inf) of the signal attributed to one carbon atom of the modifying group, with respect to the total area intensity (Inp) of the signals attributed to C1-C6 carbons of the pyranose rings of cellulose, appearing in the range of 50 ppm to 110 ppm.

DS=(Inf)×6/(Inp)

When the modifying group is acetyl, for example, the signal at 23 ppm attributed to —CH$_3$ may be used.

The conditions for the $^{13}$C solid NMR measurement may be as follows, as an example.

Apparatus: Bruker Biospin Avance 500WB
Frequency: 125.77 MHz
Measuring method: DD/MAS
Latency time: 75 sec
NMR sample tube: 4 mmφ
Number of scans: 640 (~14 hr)
MAS: 14,500 Hz
Chemical shift reference: glycine (external reference: 176.03 ppm)

(DS$_s$/DS of Cellulose Fibers)

According to one aspect, the cellulose fibers may be cellulose fine fibers with chemically modified surfaces. According to one aspect, the DS heterogeneity ratio (DSs/DS), defined as the ratio of the degree of substitution (DSs) on the fiber surfaces with respect to the degree of substitution (DS) throughout the entirety of the chemically modified cellulose fine fibers, is preferably 1.05 or greater.

When the chemically modified group is acyl, the DS heterogeneity ratio (DSs/DS) defined as the ratio of the degree of acyl substitution (DSs) on the fiber surfaces with respect to the degree of acyl substitution (DS) throughout the entirety of the fibers, is preferably 1.05 or greater. A larger value for the DS heterogeneity ratio corresponds to a more non-uniform structure similar to a sheath-core structure (that is, while the fiber surfaces are highly chemically modified, the center sections of the fibers maintain the original largely unmodified cellulose structure), which helps to provide the high tensile strength and dimensional stability of cellulose while improving the affinity with the resin during compositing with the resin, and improving the dimensional stability of the resin composition. The DS heterogeneity ratio is more preferably 1.1 or greater, 1.2 or greater, 1.3 or greater, 1.5 or greater or 2.0 or greater, while from the viewpoint of facilitating production of chemically modified cellulose fine fibers, it is preferably 30 or lower, 20 or lower, 10 or lower, 6 or lower, 4 or lower or 3 or lower.

The DSs value differs according to DS, and for example, it is preferably 0.1 or greater, 0.2 or greater, 0.3 or greater or 0.5 or greater, and preferably 3.0 or lower, 2.5 or lower, 2.0 or lower, 1.5 or lower, 1.2 or lower or 1.0 or lower.

DSs is determined by the following method. Specifically, powdered esterified cellulose fine fibers obtained by freeze-pulverizing is placed on a 2.5 mmφ dish-shaped sample stand and the surface is pressed flat and measured by X-ray photoelectron spectroscopy (XPS). The XPS spectrum reflects the structural elements and chemically bonded state of the sample surface layer alone (typically about several nanometers). The obtained C1s spectrum is analyzed by peak separation, and calculation is performed by the following formula using the area intensity (Ixf) of the peak attributed to one carbon atom of the chemically modified group, with respect to the area intensity (Ixp) of the peak attributed to the C2-C6 carbons of the pyranose rings of cellulose (289 eV, C—C bond).

$$DSs=(Ixf)\times 5/(Ixp)$$

When the chemically modified group is acetyl, the C1s spectrum is analyzed by peak separation at 285 eV, 286 eV, 288 eV and 289 eV, and the peak at 289 eV may be used for Ixp while the peak due to acetyl group O—C=O bonds (286 eV) may be used for Ixf.

The conditions for XPS measurement are the following, as an example.

Device: VersaProbe II by Ulvac-Phi, Inc.
Excitation source: mono. AlKα 15 kV×3.33 mA
Analysis size: ~200 μmφ
Photoelectron take-off angle: 45°
Capture range
Narrow scan: C 1s, O 1s
Pass Energy: 23.5 eV (Morphological Changes in Cellulose Starting Material or Cellulose Fine Fibers Before and After Chemical Modification)

The stirring conditions and temperature are adjusted as appropriate for chemical modification according to the embodiment, but the maintenance factor for the fiber lengths of the cellulose starting material or cellulose fine fibers before and after chemical modification (Fiber length maintenance factor (%)=mean fiber length after modification (nm)/mean fiber length before modification (nm)×100) is preferably 70% or greater, more preferably 80% or greater and most preferably 90% or greater. The mean fiber length referred to here is the length-weighted mean fiber length measured using an automatic fiber shape analyzer (Morfi Neo by Techpap). Maintaining long fiber lengths even after chemical modification is advantageous for increasing the strength and heat resistance of the resin composition obtained by compositing of the cellulose fine fibers with the resin, since long fiber lengths are maintained in the obtained cellulose fine fibers. Since a higher fiber length maintenance factor provides a greater effect there is no particular upper limit, but it is preferably 99.5% or lower in consideration of realistic modification treatment.

(Micronization of Cellulose)

The starting material may be micronized to obtain cellulose fine fibers. For micronization treatment, a starting pulp sheet is dispersed in water using a pulper, and micronized using a micronization apparatus such as a beater, disc refiner, high-pressure homogenizer, water jet, disk mill, ball mill, bead mill, mascolloider or homomixer. According to one aspect, the micronization may be beating treatment. The micronization treatment may be carried out in one stage (treatment with a single type of blade), or multiple stages (treatment with multiple types of blades), either using the same apparatus several times or a combination of different apparatuses in the case of a multistage process. A multistage process is preferred according to one aspect.

The starting material is preferably dispersed homogeneously in water using a pulper or homomixer before the micronization treatment. When micronization treatment is to be carried out after prior chemical modification of the pulp, preferably dispersion treatment is carried out with a mixer such as a homomixer at a peripheral speed of 10 m/s or higher, preferably 20 m/s or higher and more preferably 25 m/s or higher, and 90 m/s or lower, preferably 80 m/s or lower and more preferably 50 m/s or lower, for example, after the hydrophilicity of the pulp has been lowered. By reducing lumps via pretreatment it is possible to obtain homogeneously micronized cellulose fine fibers by homogeneous micronization treatment. It is effective for the water used during this process to be water with high purity such as distilled water or ion-exchanged water.

(Multistage Micronization)

When the cellulose is to be micronized in multiple stages, it is effective to combine two or more micronization devices with different micronization mechanisms or shear rates. The method for multistage micronization is preferably multistage micronization using disc refiners with different disc constructions, or micronization with a high-pressure homogenizer after micronization with a disc refiner. The disc refiner used may be either a single disc refiner, double disc refiner or conical refiner. According to one aspect, a single disc refiner with high clearance control between the fixed blade and rotary blade is preferred for high-level control of micronization.

(Micronization with Disc Refiner)

When micronization treatment is carried out using a disc refiner, the pulp or flocculent cellulose fibers (such as refined cellulose fibers) are dispersed in an aqueous medium to a solid concentration of 0.5 mass % to 6 mass %, preferably 0.8 mass % to 3.5 mass % and more preferably 1 mass % to 3 mass % and stored in a tank, and then micronized using the disc refiner. It is effective for the water used during this process to be water with high purity such as distilled water or ion-exchanged water.

During operation of the disc refiner, defibration treatment may be carried out by a circulating continuous treatment step in which the slurry residing in the tank is passed through the disc refiner and then returned to the original tank, but preferably defibration treatment is carried out by a continuous treatment step in which two tanks (tank A and tank B) are prepared, connected by tubing through a disc refiner, and the slurry is conveyed from the loaded tank A through the disc refiner to tank B and stored, and at this stage when the slurry in tank A has completed treatment, the process is switched to a mode in which it is conveyed continuously from tank B through the disc refiner to tank A where it accumulates, and the steps are alternately repeated thereafter, with such treatment being preferred because the slurry will pass through each disc refiner treatment more reliably allowing the total amount of slurry to be subjected to the same number of passes, as is desirable from the viewpoint of uniformity of defibration, i.e. quality stability of the cellulose fine fibers.

Figure 2:
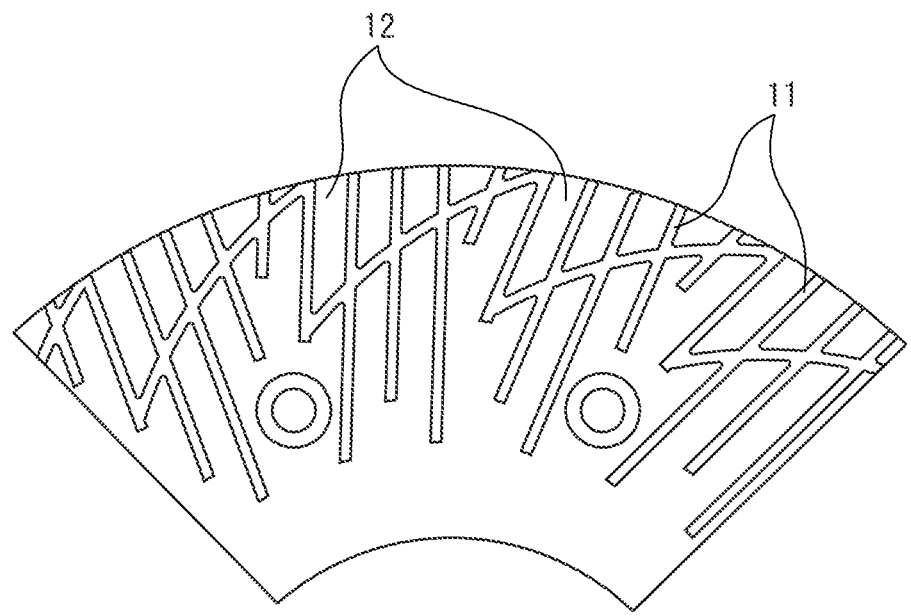
FIG. 2 is a diagram illustrating an example of an arrangement of blades and grooves in a disc refiner.
Figure 3:
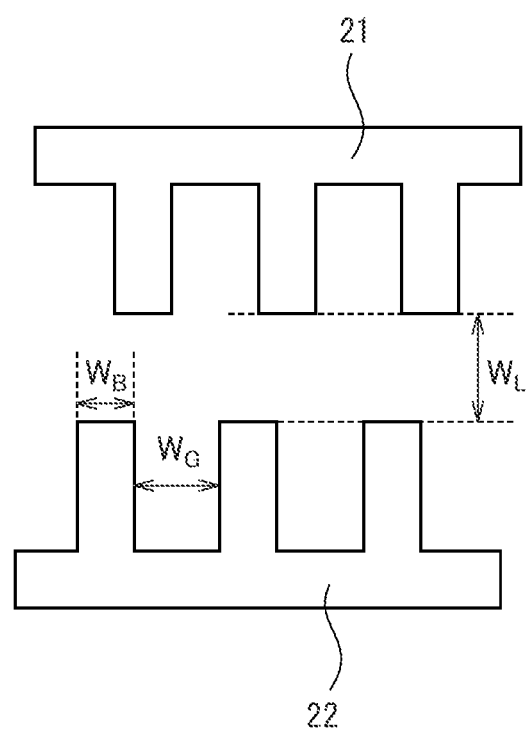
FIG. 3 is a diagram illustrating blade width, groove width and interblade distance in a disc refiner.

FIG. 2 is a diagram illustrating an example of an arrangement of blades and grooves in a disc refiner, and FIG. 3 is a diagram illustrating blade width, groove width and interblade distance in a disc refiner. For micronization in multiple stages using more than one disc refiner, the blades may be of one or more types, but it is preferred to use a refiner having at least two different types of blades. Referring to FIGS. 2 and 3, in a disc refiner having blades 11 and grooves 12 as shown in FIG. 2, as a typical blade construction, it is important for the blade width $W_B$, groove width $W_G$ and the value of the blade width $W_B$ divided by the groove width $W_G$ (hereunder referred to as "blade/groove ratio") shown in FIG. 3 to be adjusted to appropriate values. Most preferably, micronization treatment is carried out with a refiner fitted with a blades having a blade width of 1.5 mm to 5 mm and a blade/groove ratio of 0.1 to 1.0 ("first stage"), and then micronization treatment is carried out with a refiner having a blade width of 0.1 mm to 1.0 mm and a blade/groove ratio of 0.5 to 1.0 ("second stage"). Defibration with a disc refiner having such a construction can reduce fibers with long fiber lengths (fiber lengths of 411 μm or greater according to this aspect) that can cause aggregation in the resin, while also producing cellulose fine fibers with a low fibrillation rate (i.e. minimal fluff). According to one aspect, the formation of fibers with fiber lengths of 20 μm to 56 μm, which have a low reinforcing effect, is inhibited. An additional micronization step may also be added between the first and second stages.

When disc refiner treatment is carried out in one stage using a single type of blade, it is most preferred to carry out micronization treatment using a refiner having a blade with a blade width of 0.1 mm to 1.0 mm and a blade/groove ratio of 0.5 to 1.0. The fiber length of the starting material used is preferably 500 μm or greater, more preferably 700 μm or greater and even more preferably 900 μm or greater, and preferably 3000 μm or smaller, more preferably 2000 μm or smaller, even more preferably 1500 μm or smaller and yet more preferably 1300 μm or smaller, as the length-weighted mean fiber length measured with an automatic fiber shape analyzer (Morfi Neo by Techpap, according to one aspect). Using a starting material having fiber lengths within this range efficiently reduces fibers with fiber lengths of 411 μm or greater which can cause aggregation in the resin, in a single stage, thus allowing cellulose fine fibers with a low fibrillation rate to be obtained.

(Interblade Distance for Disc Refiner Treatment)

Referring to FIG. 3, for micronization with a disc refiner it is advantageous to control the interblade distance $W_L$ between the two blades (specifically, the rotary blade 21 and fixed blade 22 in FIG. 3) (i.e. the clearance, and hereunder referred to as "interblade distance"). Controlling the interblade distance allows the cellulose fine fiber lengths and the degree of beating to be controlled. In the case of treatment in multiple stages, the interblade distance is preferably 0.05 mm to 0.5 mm for treatment in the prior stages, and the interblade distance is preferably 0.05 mm to 0.3 mm for treatment in the latter stages. For treatment in a single stage, the interblade distance is preferably 0.05 mm to 0.3 mm. When adjusting the interblade distance, preferably the gap between blades is gradually narrowed from a wide interblade distance while limiting the current value of the apparatus to below a fixed value, as such control will help to prevent clogging or overload of the device, and to yield cellulose fine fibers with high homogeneity.

Strict control of the interblade distance between the fixed blade and rotary blade during micronization treatment of cellulose with a disc refiner in this manner is advantageous for producing homogeneous cellulose fine fibers having satisfactory mechanical properties as a filler. For example, adjustment of the interblade distance in a conventionally used single disc refiner is accomplished by the use of a screw jack, and therefore the runner section that anchors the rotary blade has leeway. The runner section moves about 0.3 mm if forcefully pulled in the direction of thrust. Consequently, a smaller amount of movement (leeway) corresponds to greater precision and is also preferred to obtain micronized cellulose with a high degree of reproducibility, while the amount of movement is preferably 0.1 mm or less, more preferably 0.08 mm or less and more preferably 0.05 mm or less. The precision of packing between the blades is preferably 5 μm or lower for finer packing between the blades, more preferably 3 μm or lower and most preferably 1 μm or lower. According to one aspect, the single disc refiner used may have an amount of movement of 0.03 mm in the direction of thrust, by using a ball screw jack as the adjusting mechanism for the interblade distance. In addition, for precise adjustment of the interblade distance, preferably a speed reducer is fitted on the ball screw jack, allowing fine adjustment of the interblade distance. By using such a single disc refiner it is possible to make fine adjustment to the interblade distance while carrying out beating with a fixed, non-shifting interblade distance during the beating treatment. The single disc refiner used in the Examples below has a ball screw jack as the interblade distance adjusting mechanism, with an amount of movement of 0.03 mm in the direction of thrust, and having a speed reducer fitted on the ball screw jack allowing fine adjustment of the interblade distance in 1 μm units, but any mechanism may be used, such as a combination of a ball screw jack and servomotor, so long as it provides the aforementioned amount of movement of the runner section and precision of packing between the blades.

By using such a single disc refiner it is possible to make fine adjustment to the interblade distance. It is also possible to carry out micronization while maintaining a fixed, non-shifting interblade distance during the micronization treatment, and to prevent the fiber lengths from becoming too short by preventing contact between the blades during interblade packing, and reducing the amount of coarse fibers. As a result, it is possible to produce cellulose fine fibers with high homogeneity of shape distribution, so as to provide excellent dynamic properties for a fiber-reinforced resin obtained by compositing cellulose fine fibers and a resin.

(Number of Passes in Disc Refiner Treatment)

The degree of micronization can also be controlled by the number of times the cellulose fine fibers pass between the rotary blades and fixed blades. i.e. the disc section (hereunder referred to as "number of passes"). By increasing the number of passes it is possible to obtain cellulose fine fibers having uniformity of fiber size and fiber length distribution. The number of passes is the number of times refiner treatment is carried out after limiting the interblade distance to the target interblade distance (i.e. passing between the rotating field and fixed field). The number of passes of the disc refiner is preferably 5 times or more, more preferably 20 times or more and even more preferably 40 times or more. A greater number of times is preferred since the distribution of fiber shapes will gradually converge to be constant, but from the standpoint of productivity, the upper limit for the number of passes is 300 times or less.

(Method of Determining Micronization Conditions with Disc Refiner)

The shapes of the cellulose fine fibers obtained by disc refiner treatment are controlled by a combination of the effects of the construction of the disc refiner (the types and number of blades), the interblade distance, the number of passes and the concentration. In order to obtain cellulose fine fibers with shapes preferred for use in a fiber-reinforced resin, a greater number of passes under relatively low strength treatment conditions is preferred. The treatment strength is determined by the blade construction and interblade distance of the disc refiner. In terms of the blade construction, the treatment strength is lower if the blade width and blade/groove ratio are larger, and the treatment strength is greater if they are smaller. Similarly for the interblade distance, the treatment strength is lower if it is larger, and the treatment strength is greater if it is smaller. Therefore for a construction in which the blade has high treatment strength, the interblade distance is preferably larger, while for a construction in which the blade has low treatment strength the interblade distance is preferably smaller. Increasing the interblade distance in a construction in which the blade has high treatment strength is more preferred, as it allows the mean fiber length and fiber length distribution to be controlled to within the desirable ranges with the aforementioned number of passes under such treatment conditions. According to one aspect, in order to obtain cellulose fine fibers that are preferred for use in a fiber-reinforced resin, a greater number of passes under wet beating conditions is preferred. Wet beating is a beating method that tends to cause micronization of fibers with generation of fluff, while a beating method that tends to produce cuts in the fiber length direction is known as "free beating". For the construction of the blades in the disc refiner, since a larger number of blades, longer blade lengths, a larger ratio of blade width to groove width (blade/groove ratio) and a larger contact angle increases the number of blade intersections between rotary blades and fixed blades, the force applied to the fibers at each intersection becomes diffused, increasing the number of impacts onto the fibers and tending to result in wet beating. When the conditions are reversed, the result tends to be free beating. The interblade distance of the disc refiner is preferably wider when using a blade that exhibits free beating while the interblade distance is preferably narrower when using a blade that exhibits wet beating, but an excessively narrow interblade distance can result in too many staple fibers and excessive micronization due to clogging and cutting in the fiber length directions, and therefore the interblade distance is preferably 0.05 mm or greater. If the interblade distance and number of passes are adjusted by the cellulose starting material (e.g. pulp) shapes (fiber lengths and fiber sizes), the treatment concentration and the blades used, then it will be possible to control the fiber shapes including the mean fiber size and fiber length distribution to desirable ranges.

(Method for Controlling Number of Passes in Disc Refiner Treatment)

The method used to control the number of passes may be a method in which one tank is used for each refiner, and the slurry is circulated alone, controlling the number of passes based on the flow rate, or a method in which two tanks are used for each refiner, and the slurry is reciprocated between tanks while carrying out refiner treatment. The former method allows the equipment to be simplified. In the latter case, the cellulose fine fibers reliably pass through the disc section during each treatment, allowing cellulose fine fibers with higher homogeneity to be obtained. The latter method is preferred from the viewpoint of stably obtaining cellulose fine fibers of the embodiment which have a satisfactory reinforcing effect in resins, which are cellulose fine fibers having uniform fiber shapes.

(Multistage Micronization Treatment by Combination of Disc Refiner and High-Pressure Homogenizer)

Another preferred aspect is further micronization treatment of the disc refiner-micronized cellulose fine fibers, using a high-pressure homogenizer. A high-pressure homogenizer has a greater effect of narrowing the fibers, compared to a disc refiner. Combining a disc refiner and a high-pressure homogenizer can yield narrow elongated cellulose fine fibers. The high-pressure homogenizer treatment is carried out at a pressure of preferably 30 MPa or higher, more preferably 50 MPa or higher and even more preferably 80 MPa or higher. The upper limit for the pressure is preferably 300 MPa or lower, more preferably 250 MPa or lower and even more preferably 150 MPa or lower, in terms of the properties of the apparatus.

High-pressure homogenizers include: a Model NS high-pressure homogenizer by Niro Soavi, a Ranier-type (R model) pressure homogenizer by SMT Corp. and a high pressure homogenizer by Sanwa Machinery Trading Co., Ltd., while ultrahigh-pressure homogenizers include: high-pressure impact micronizers such as a microfluidizer by Mizuho Industrial Co., Ltd., a nanomizer by Yoshida Kikai Co. Ltd. and an Ultimizer by Sugino Machine, Ltd., but any another apparatus may be used so long as it accomplishes micronization by a similar mechanism as these.

For high-pressure homogenizer treatment, similar to disc refiner treatment, defibration treatment may be carried out by a circulating continuous treatment step in which the slurry residing in the tank is passed through a high-pressure homogenizer and then returned to the original tank, but preferably defibration treatment is carried out by a continuous treatment step in which two tanks (tank A and tank B) are prepared in a manner connected by tubing through a high-pressure homogenizer, and the slurry is conveyed from the loaded tank A through the high-pressure homogenizer to tank B and stored, and then, at the stage when the slurry in tank A has completed treatment, the process is switched to a mode in which it is conveyed continuously from tank B through the high-pressure homogenizer to tank A where it accumulates, and the steps are alternatingly repeated thereafter, such treatment being preferred because the slurry will pass through each high-pressure homogenizer treatment more reliably allowing the total amount of slurry to be subjected to the same number of passes, as is desirable from the viewpoint of uniformity of defibration, i.e. quality stability of the cellulose fine fibers.

(Micronization Promoting Treatment for Cellulose Starting Material)

According to one aspect, the micronization treatment may also be preceded by a pretreatment step. The method of pretreatment may be autoclave treatment or enzymatic treatment while immersed in water at a temperature of 100 to 150° C., immersion in an aqueous solution of sodium hydroxide, or a combination of these. All such pretreatments act to break the hydrogen bonds between cellulose microfibrils while also having an effect of not only reducing the load in the micronization treatment, but also of causing impurity components such as lignin and hemicellulose, which are present on the surface and in the gaps of the microfibrils forming the cellulose fine fibers, to be discharged into the aqueous phase, increasing the α-cellulose purity of the micronized fibers as a result, and it is therefore effective for increasing the heat resistance of the cellulose fine fibers.

(Concentration and Drying of Cellulose Fine Fibers)

The cellulose fine fibers of the embodiment can be obtained as a wet compact (wet cake) by dewatering the slurry using a filter or paper machine. A papermaking method using a paper machine is advantageous in terms of reducing dry shrinkage between the cellulose fine fibers. According to one aspect, the slurry is dewatered by filtration on a porous substrate. Any paper machine may be used in the papermaking method that has wires of a mesh size that can dewater the slurry and retain the cellulose fine fibers. When the fiber-reinforced resin is to be obtained as a flat sheet, the paper machine used may be an inclined wire paper machine, Fourdrinier paper machine or circular mesh paper machine.

The cellulose fine fibers may also be used as dry filler. In this case a publicly known drying apparatus such as a hot air drier or spray drier may be used for drying. Since cellulose tends to aggregate during the drying step making later re-dispersion difficult, it is preferred to use a dispersing agent. Increasing the re-dispersibility can improve the mechanical properties of the resulting resin composition, as well as its stability. The dispersing agent is preferably added to the aqueous dispersion of cellulose fine fibers and the mixture is then dried while applying shear to obtain a cellulose powder.

The dispersing agent may be at least one type selected from the group consisting of surfactants, organic compounds with a boiling point of 100° C. or higher, and resins having a chemical structure capable of highly dispersing cellulose.

The surfactant may be one having a chemical structure in which a site with a hydrophilic substituent and a site with a hydrophobic substituent are covalently bonded. The surfactant used may be any one commonly used for various purposes in foods or industry, examples of which include one or more of the following.

The surfactant used may be any anionic surfactant, nonionic surfactant, zwitterionic surfactant or cationic surfactant, but from the viewpoint of affinity with cellulose, an anionic surfactant or nonionic surfactant is preferred, and a nonionic surfactant is more preferred.

Among the above, from the viewpoint of affinity with cellulose, surfactants having polyoxyethylene chains, carboxyl groups or hydroxyl groups as hydrophilic groups are preferred, polyoxyethylene-based surfactants with polyoxyethylene chains as hydrophilic groups (polyoxyethylene derivatives) are more preferred, and nonionic polyoxyethylene derivatives are even more preferred. The polyoxyethylene chain length of a polyoxyethylene derivative is preferably 3 or greater, more preferably 5 or greater, even more preferably 10 or greater and most preferably 15 or greater. A longer chain length will increase the affinity with cellulose, but for balance with the coating property, it is preferably no greater than 60, more preferably no greater than 50, even more preferably no greater than 40, especially preferably no greater than 30 and most preferably no greater than 20, as the upper limit.

Of the aforementioned surfactants, it is especially preferred to use those with alkyl ether-type, alkylphenyl ether-type, rosin ester-type, bisphenol A-type, β-naphthyl-type, styrenated phenyl-type or hydrogenated castor oil-type hydrophobic groups, because of their high affinity with resins. The alkyl chain length (the number of carbon atoms excluding the phenyl group in the case of alkylphenyl) is a carbon chain of preferably 5 or greater, more preferably 10 or greater, even more preferably 12 or greater and most preferably 16 or greater carbon atoms. A greater number of carbon atoms in the alkyl chain length generally corresponds to higher affinity with resins. For example, when the resin is a polyolefin, a larger number of carbon atoms in the surfactant will increase the affinity with resins. The upper limit for the number of carbon atoms is therefore not restricted, but it is preferably 30 or less or 25 or less.

Preferred among these hydrophobic groups are those having a cyclic structure and those having a bulky polyfunctional structure. Those with a cyclic structure include alkylphenyl ether-type, rosin ester-type, bisphenol A-type, β-naphthyl-type and styrenated phenyl-type groups, and those with a polyfunctional structure include hydrogenated castor oil-type groups. More particularly preferred among these are rosin ester types and hydrogenated castor oil types.

Organic compounds with boiling points of 100° C. or higher are effective as non-surfactant dispersing agents. Examples of such organic compounds include organic compounds with polyethylene glycol, polypropylene glycol and glycerin structures. When the resin is a polyolefin it is effective to use a high-boiling-point organic solvent such as liquid paraffin or decalin, although this will depend on the type of resin. When the resin is a polar resin such as nylon or polyacetate, it is effective to use the same solvent as the aprotic solvent that may be used for production of the cellulose fine fibers, such as dimethyl sulfoxide, for example.

<Rheological Properties of Cellulose Fine Fibers>

The rheological properties of the cellulose fine fibers of the embodiment are preferably such that for an aqueous dispersion with a cellulose concentration of 0.75 mass %, the reciprocal of the yield strain, $1/\gamma$, is preferably 200 or greater and more preferably 250 or greater, in strain dispersion measurement. If this parameter is within the aforementioned range, an effect of improved dynamic viscoelasticity at high temperature and increased storage modulus in the high-temperature range can be obtained when the cellulose fine fibers are added to the resin. When tangling takes places between the cellulose fine fibers, hydrogen bonds acting between the cellulose molecules form a pseudo-crosslinked structure in water, and this interaction between the cellulose fine fibers in the water is thought to partially reflect the interaction between cellulose fine fibers in a resin. In a crosslinked material such as a gel, a greater distance between crosslinking points and number of crosslinks is associated with a higher elastic modulus and higher strength of the crosslinked product, and it is thought that cellulose fine fibers having a yield strain in the aforementioned range interact more strongly with resins. The upper limit for $1/\gamma$ may be 1000 or lower, according to one aspect. The measuring conditions and measuring method will now be described.

[Measuring Conditions]
　Measuring instrument: Rheometer, HAAKE MERS (Thermo Fisher Scientific
　Measuring jig: Coaxial double cylinder (cup: CCB25 DIN, rotor: CC25 DIN Ti)
　Measuring mode: Oscillation
　Control method: Stress control
　Control range: 0.01-100 Pa
　Temperature: 25° C.

1. The cellulose fine fibers are dispersed in purified water. The final solid concentration of the cellulose fine fibers is 0.75 mass %. When the cellulose fine fibers before dilution are an aqueous dispersion with a solid concentration of 2 mass % or lower, the dispersion treatment is carried out by mixing in a sealed container with a fill factor of 75 vol % or lower. For an aqueous dispersion, or a wet cake or powder with a solid concentration of 2 mass % or greater, a high-shear homogenizer ("ULTRA-TURRAX T18", trade name of IKA Co., according to one aspect) is used for dispersion treatment with treatment conditions of 25,000 rpm×5 min. When the dispersion is in a medium other than water, a high-shear homogenizer is used for dispersion treatment in a sufficient amount of purified water with treatment conditions of 25,000 rpm×5 min, after which the medium is removed by suction filtration or other means, and the high-shear homogenizer is again used for dispersion treatment in purified water with treatment conditions of 25,000 rpm×5 min to a final solid concentration of 0.75 mass %, to exchange the medium with water.

2. The aqueous dispersion prepared in 1. is allowed to stand at 25° C. for 24 hours or longer.

3. The jig is attached to a rheometer and a pipette or dropper is used to introduce the aqueous dispersion of the cellulose fine fibers at 17.0±1.0 g.

4. Measurement is conducted according to the settings, and the reciprocal of the yield strain ($1/\gamma$) is calculated based on the results of analysis (LVE analysis).

<Surface Treatment of Cellulose Fine Fibers>

The cellulose fine fibers of the embodiment may be modified on the fiber surface layer if necessary. The method of modification may be esterification, etherification or urethane formation.

The method of modification is preferably esterification, with esterification using a saturated monocarboxylic acid being more preferred. The esterifying agent may be any type from a relatively short chain compound such as acetic acid, propionic acid, pentanoic acid (valeric acid) or hexanoic acid (caproic acid), to a long chain compound such as palmitic acid or stearic acid, but it is more preferred to use one with a short chain length such as acetic acid or propionic acid, from the viewpoint of heat resistance of the modified cellulose fine fibers.

<Surface Potential of Cellulose Fine Fibers>

The cellulose fine fibers of the embodiment preferably have a zeta potential of −50 mV to 50 mV. If the zeta potential is within this range it will be possible to maintain low reactivity, thus reducing the likelihood of decomposition by heat, and tending to avoid coloration and lowering of the reinforcing effect when the fibers are added to a resin. Cellulose fine fibers innately have a weakly negative zeta potential of about −20 mV to 30 mV, but it is preferred for the zeta-potential of the modified cellulose fine fibers to be within the range specified above even when the aforementioned surface treatment is carried out.

<Cellulose Fine Fibers with Halogen Content of 250 ppm by Mass or Lower>

The cellulose fine fibers according to one aspect may be cellulose fine fibers with a halogen content of 250 ppm by mass or lower (also referred to herein as "low halogen cellulose fine fibers"). When plant-derived cellulose fine fibers are composited with a resin, the presence of the cellulose fine fibers may lead to decomposition of the resin and corrosion inside the kneader or molding apparatus. Low halogen cellulose fine fibers having a halogen content below a specified value can reduce decomposition of the resin during composite formation between the cellulose fine fibers and resin, even if they are plant-derived, for example. A fiber-reinforced resin obtained using low halogen cellulose fine fibers has excellent stability during prolonged storage, and can also remain stable even after experiencing several thermal histories of melt kneading, as with material recycling. Low halogen cellulose fine fibers can also inhibit corrosion of the apparatus that is caused by cellulose fine fibers.

According to one aspect, the low halogen cellulose fine fibers may include both unmodified cellulose fine fibers and chemically modified cellulose fine fibers. For the purpose of the disclosure, the halogen content of the low halogen cellulose fine fibers is the halogen content remaining in the cellulose fine fibers after the cellulose fine fibers have been provided for the [Immersion and filtration treatment] described below. The halogen content is the value measured according to [Measurement of halogen content] below. If the halogen content of the cellulose fine fibers is within the aforementioned range it will be possible to inhibit decomposition of the resin when the cellulose fine fibers are composited with the resin, making it possible to obtain a resin composition which has excellent stability during prolonged storage and can also remain stable even after experiencing several thermal histories of melt kneading, as with material recycling. A halogen content in this range is also advantageous for inhibiting corrosion inside the kneader or molding apparatus.

When the cellulose fine fibers contain a halogen, the halogen will often be firmly attached to the cellulose by chemical or physical bonding. According to one aspect, when the cellulose fine fibers have been subjected to treatment of first immersion for 48 hours in purified water at 25° C. followed by filtration drying, as described below under [Immersion and filtration treatment], 80 mass % or greater of the halogens before treatment still remains in the cellulose fine fibers. Because of their strong attachment to cellulose, the halogens continue to remain even when the cellulose fine fibers are composited with the resin, leading to inconveniences such as decomposition of the resin and corrosion of the apparatus. Since the cellulose fine fibers of the embodiment are characterized by having a low content of halogens strongly attached to the cellulose, the content of halogens still remaining in the cellulose fine fibers after treatment according to [Immersion and filtration treatment] is used as the index.

[Immersion and Filtration Treatment]

The cellulose fine fibers are subjected to immersion treatment for 48 hours in purified water at 25° C. Specifically, the cellulose fine fibers are immersed in purified water to 2% solid mass in a glass beaker having a total volume of 200 mL, stirred for 1 hour using a 3-1 motor (Model BL-600 by Heidon Co., SUS propeller blade, 100 rpm), and then allowed to stand. A TEFLON™ membrane filter (1 μm mesh) is then used for vacuum filtration and a sheet with a basis weight of 10 g/m² is formed, filtration drying it in a ventilation oven at 70° C. to a moisture content of 10 mass % or lower, to obtain treated cellulose fine fibers. The moisture content is measured by the following method. A 2.00 g portion of a cellulose sample is introduced into a glass weighing bottle and dried for 15 hours at 60° C. and then for 2 hours at 105° C., and upon reaching a constant mass in a desiccator, the weight is measured and calculated by the following formula. Moisture content (mass %)=(Sample weight before drying−sample weight after drying)/(sample weight before drying)×100

[Measurement of Halogen Content]

The treated cellulose fine fibers are weighed out to 50 mg on a quartz sample boat. The sample boat is set in an electric furnace (Mitsubishi Chemical Analytics) and combusted at 1000° C. The gas generated by combustion is brought to ordinary temperature through a cooling unit and then passed through a fluorine resin tube and bubbled through an absorbing solution (comprising 10 mg/L tartrate ion, 600 mg/L hydrogen peroxide, 2.7 mmol/L sodium carbonate and 0.3 mmol/L sodium hydrogen carbonate dissolved in ion-exchanged water). The absorbing solution is passed through a fluorine resin tube and the halogens are quantified using an ion chromatography analyzer (Model INTEGRION CT by ThermoFisher). The quantification is carried out based on a calibration curve created from samples with different halogen contents. The moisture content obtained by the measurement is subtracted from the treated cellulose fine fibers. The value with respect to the dry mass of the treated cellulose fine fibers (the state containing no water) (ppm by mass) is used as the final halogen content of the cellulose fine fibers for the embodiment.

Halogens present in the cellulose fine fibers of the embodiment may also be in the form of compounds containing fluorine, chlorine, bromine, iodine and/or astatine (i.e. halogenated compounds). Halogenated compounds may be halides (halogen compounds of halogens with elements of low electronegativity) or halogen salts, and may be inorganic halogenated compounds or organic halogenated compounds. In consideration of bleaching or other steps during production of the cellulose starting material, the cellulose fine fibers will often include the halogens fluorine and/or chlorine, and especially chlorine. The advantage of lowering the halogen content for production of cellulose fine fibers becomes more notable when a cellulose starting material with a high halogen content is used.

According to one aspect, the low halogen cellulose fine fibers are chemically modified cellulose fine fibers.

The cellulose starting material used to obtain low halogen cellulose fine fibers is plant-derived according to one aspect, and according to another aspect it is conifer chips, broadleaf tree chips or a nonwood cellulose starting material (derived from cotton, hemp, bagasse, kenaf, bamboo or straw; for example). It is preferred to use a cellulose starting material with high type I crystallinity.

In order to inhibit discoloration or loss of physical properties by heating when the cellulose fine fibers are composited with a resin, the glucose content of the cellulose starting material used to obtain the low halogen cellulose fine fibers, as determined by constituent sugar analysis, is preferably 90 mass % or greater, more preferably 91 mass % or greater and even more preferably 93 mass % or greater. The upper limit for the glucose content is not particularly restricted, but it is preferably 99.5 mass % or lower in consideration of limiting impurities that may be included during the step of harvesting and purification of the cellulose starting material, or during the step of producing the cellulose fine fibers (for example, fat or oil components, or other contaminants that are not polysaccharides).

The glucose content as determined by constituent sugar analysis is preferably high in the cellulose fine fibers as well as in the cellulose starting material. The glucose content of the cellulose fine fibers is preferably 85 mass % or greater and more preferably 90 mass % or greater, with no particular upper limit, which may be 99.5 mass % or lower according to one aspect.

Among the aforementioned refined cellulose fibers, the cellulose starting material used to obtain low halogen cellulose fine fibers may be plant-derived according to one aspect, or in other words, it may be obtained from conifer chips, broadleaf tree chips or a nonwood cellulose starting material (derived from cotton, hemp, bagasse, kenaf, bamboo or straw, for example), through the processing steps described above. From the viewpoint of high cellulose purity, industrial availability and quality stability, it is preferably a cellulose starting material derived from cotton (cotton lint or cotton linter), and most preferably cotton linter pulp. According to one aspect, the cellulose starting material used to obtain low halogen cellulose fine fibers is a recycled material mentioned above, and preferably recycled cotton.

In order to lower the halogen content in the cellulose starting material, it is effective to further treat the cellulose starting material or the aforementioned refined cellulose starting material (such as refined pulp) by immersion in water and heat treatment at a temperature of 100° C. or higher, or to treat the cellulose starting material or the refined cellulose starting material by repeating alkali treatment in which it is immersed in a strong aqueous alkali solution such as aqueous sodium hydroxide (alkali concentration: 1 mass % to 10 mass %), allowed to stand or stirred for a fixed period in a range of 0° C. to 60° C. and then washed with water. In order to obtain a high-purity refined cellulose starting material it is effective to further treat the cellulose starting material or refined cellulose starting material by enzymatic treatment in which it is immersed in water and reacted with a hemicellulose catabolic enzyme or cellulase such as xylase or mannanase in a range of 35° C. to 55° C. Carrying out purification with a combination of multiple treatments from among the aforementioned heat treatment, alkali treatment and enzymatic treatment can be effective for obtaining a higher-purity refined cellulose starting material. Such treatment has the effect of not only reducing the load in the micronization treatment, but also of causing impurity components such as lignin and hemicellulose, which are present on the surfaces and in the gaps of the microfibrils forming the cellulose starting material, to be discharged into the aqueous phase, resulting in higher cellulose purity of the refined cellulose starting material, and it may therefore be significantly effective.

(Halogen Content of Cellulose Starting Material)

From the viewpoint of obtaining the aforementioned halogen content in the cellulose fibers and the degree of whiteness described below, the halogen content of the cellulose starting material provided for defibration (the chlorine content, according to one aspect) is preferably 300 ppm by mass or lower, more preferably 250 ppm by mass or lower, even more preferably 200 ppm by mass or lower, yet more preferably 150 ppm by mass or lower and especially preferably 100 ppm by mass or lower. The halogen content of the cellulose starting material (the chlorine content, according to one aspect) is preferably as low as possible, but from the viewpoint of production efficiency for the cellulose fine fibers it may be 10 ppm by mass or greater or 25 ppm by mass or greater. The halogen content is the amount per dry mass of the cellulose starting material, as measured by the same method described above for the cellulose fine fibers.

<Whiteness>

The cellulose fine fibers, and especially low halogen cellulose fine fibers, preferably have a whiteness of 50% or greater. The whiteness referred to here is the value measured using a whiteness spectrophotometer/color difference meter (Model PF700 by Nippon Denshoku Industries Co., Ltd.), according to "Paper, board and pulps—Measurement of diffuse blue reflectance factor (ISO whiteness)" (JIS P8148, ISO 2470). When the cellulose starting material or cellulose fine fibers are obtained in sheet form, the sheet may be provided directly for measurement. When in a wetted state, the cellulose starting material or cellulose fine fibers may be processed by papermaking using a suction filtration apparatus comprising a polytetrafluoroethylene (PTFE) membrane filter, to a basis weight of 50 g/m$^2$ or greater, and dried to equilibrium moisture at 80° C. to prepare a cellulose sheet, using the sheet for measurement of the whiteness with the device mentioned above. Since higher whiteness corresponds to more excellent heat resistance of the cellulose fine fibers, this is preferred to improve the strength, elastic modulus and dimensional stability when the resin composition obtained by compositing with a resin by melt kneading is processed by mechanical recycling. The whiteness of the cellulose fine fibers is preferably 60% or higher, more preferably 70% or higher, even more preferably 80% or higher, especially preferably 90% or higher and most preferably 95% or higher. Since a larger value increases the effect of the embodiment, the upper limit is not restricted, but 99% or lower is preferred as a feasible range.

In order to obtain cellulose fine fibers with the whiteness specified above, the cellulose starting material is preferably subjected to bleaching treatment before defibration treatment. Since the whiteness is not significantly lowered in the defibrating step of the embodiment, the whiteness of the cellulose starting material supplied to defibration will be equivalent to the whiteness of the cellulose fine fibers. The whiteness of the cellulose starting material is preferably 50% or greater, more preferably 60% or greater, even more preferably 70% or greater, yet more preferably 80% or greater, especially preferably 90% or greater and most preferably 95% or greater. Since a larger value increases the effect of the embodiment, the upper limit is not restricted, but 99% or lower is preferred as a realistic range.

<Control of Halogen Content>
(Bleaching Method for Cellulose Starting Material)

According to one aspect, the method of bleaching the cellulose starting material may be one or more methods selected from the group consisting of chlorine treatment, alkaline extraction treatment, hypochlorite treatment, chlorine dioxide treatment, oxygen bleaching treatment, hydrogen peroxide bleaching treatment and ozone bleaching treatment.

Chlorine treatment (hereunder also referred to as "C" treatment) is a bleaching method using chlorine gas, being treatment in which the lignin in a plant-derived cellulose starting material (typically unbleached pulp) is chlorinated to solubilize the lignin.

Alkaline extraction treatment (hereunder also referred to as "E" treatment) is treatment in which alkali-soluble chlorinated lignin is dissolved and extracted using an alkali (such as caustic soda).

Hypochlorite treatment (hereunder also referred to as "H" treatment) is treatment in which carbohydrates such as cellulose and hemicellulose are bleached using sodium hypochlorite.

Chlorine dioxide treatment (hereunder also referred to as "D" treatment) is treatment in which chlorine dioxide is used to selectively decompose and remove the lignin without disintegrating the carbohydrates.

Oxygen bleaching treatment (hereunder also referred to as "O" treatment) is treatment in which oxidative decomposition and extraction of lignin is carried out using oxygen.

Hydrogen peroxide bleaching treatment (hereunder also referred to as "P" treatment) is treatment in which oxidative decomposition and extraction of lignin is carried out using hydrogen peroxide.

Ozone bleaching treatment (hereunder also referred to as "Z" treatment) is treatment in which oxidative decomposition and extraction of lignin is carried out using ozone.

Effective combinations of bleaching methods include CEH treatment, CEHH treatment, CEHD treatment, CEHED treatment, CEHDED treatment and CEDED treatment. These alphabetic sequences indicate the sequence of treatment and may be reordered depending on the purpose. Other combinations include C/D treatment (where the "/" represents simultaneously carrying out both treatments) in which some of the chlorine used in chlorine treatment is replaced with chlorine dioxide, treatment where C in the aforementioned sequences is replaced with C/D, E/O treatment or E/P treatment in which a small amount of oxygen or hydrogen peroxide is added to reinforce the alkali during E treatment, treatment where E in the aforementioned sequences is replaced with E/O or E/P treatment, treatment in which oxygen is further added to E/O or E/P treatment, and treatment where E in the aforementioned sequences is replaced with E/OH treatment, with appropriate combinations being possible depending on the intended use and purpose.

Equivalent ECF (Elemental Chlorine Free, or D-E/O-D-D, E/O-E-D-P) treatment or TCF (Total Chlorine Free, or E/OP-Z-P) treatment may also be used as alternatives to the above-mentioned treatments.

In order to reduce the halogen concentration in a cellulose starting material it is preferred to carry out treatment without using chlorine, and from this viewpoint alkaline extraction treatment, oxygen treatment, ozone treatment, chlorine dioxide treatment, hypochlorite treatment or combinations of these treatments, or ECF or TCF treatment, are preferred. In order to obtain high whiteness while maintaining a high polymerization degree, i.e. strength, for the cellulose starting material, it is more preferred to use alkaline extraction treatment, ozone treatment, ECF treatment or TCF treatment, and more preferably ECF or TCF treatment.

Defibration of the cellulose starting material for obtaining low halogen cellulose fine fibers may be carried out on the cellulose starting material either with or without the pretreatment of the embodiment, but it is preferably carried out on the pretreated cellulose starting material. According to one aspect, the cellulose starting material adjusted to specific fiber lengths such that the mean fiber length is 3 mm or smaller and/or the number ratio of fibers with fiber lengths of 3 mm or greater is 20% or lower, is dispersed in an aqueous medium during the pretreatment step, and the following treatment is applied to the obtained dispersion, as beating treatment. The aqueous medium may be water itself, or a mixed medium of water with one or more organic solvents selected from among monohydric alcohols such as ethanol, n-propanol, isopropanol and butanol, polyhydric alcohols such as ethylene glycol, diethylene glycol and glycerin, ketones such as acetone, nitrile-based solvents such as acetonitrile, and pyrrolidone-based solvents. The mixing ratio of the organic solvent in a mixture of water with the organic solvent is preferably less than 50 mass %, more preferably 30 mass % or lower and most preferably 20 mass % or lower. A higher water ratio corresponds to more excellent defibration, while a higher organic solvent ratio helps reduce aggregation of fine fibers during the drying step after defibration. The proportion of organic solvent is therefore preferably set in consideration of balance between defibration and reducing aggregation. Beating is distinguished from crushing pretreatment of the embodiment in that it is carried out in a wet system, and from grinding pretreatment in that the fiber lengths of the cellulose supplied to the treatment differ.

For beating treatment, a cellulose starting material (such as a pulp sheet) is dispersed in an aqueous medium using a pulper or homomixer, as necessary, and then micronized using a beating apparatus such as a beater, disc refiner, high-pressure homogenizer, water jet, disk mill, ball mill, bead mill, mascolloider or homomixer. The beating treatment may be carried out in one stage, or multiple stages, either using the same apparatus several times or a combination of different apparatuses in the case of a multistage process.

Prior to beating treatment, the pulper or homomixer is preferably used to evenly disperse the cellulose starting material in the aqueous medium. Particularly when beating treatment is carried out after chemical modification of the cellulose starting material, whereby the hydrophilicity of the cellulose starting material is reduced, it is preferred to carry out the dispersion treatment with a mixer, such as a homomixer, having a peripheral speed of 10 m/s or greater, preferably 20 m/s or greater and more preferably 25 m/s or greater, according to one aspect, and 90 m/s or less, preferably 80 m/s or less and more preferably 50 m/s or less, according to another aspect. By reducing lumps in the dispersion treatment it is possible to obtain homogeneous cellulose fine fibers by homogeneous beating treatment. It may be effective for the water in the aqueous medium to be water with high purity such as distilled water or ion-exchanged water.

<Use of Cellulose Fine Fibers>

The cellulose fine fibers of the embodiment have a suitable degree of fineness that is not too coarse and not too fine, while also having satisfactory homogeneity, and they can therefore be used as reinforcing filler for a fiber-reinforced resin. When molded into a sheet and impregnated with a resin to produce a prepreg material, it can also be used in a construction material, such as concrete.

<Fiber-Reinforced Resin>

One aspect of the invention provides a fiber-reinforced resin comprising the cellulose fine fibers of the disclosure and a resin. According to one aspect, the resin is impregnated into the cellulose fine fibers. The method of obtaining the fiber-reinforced resin is not particularly restricted, and may be a method of mixing the cellulose fine fibers with a resin dissolved in a solvent and drying off the solvent, a method of mixing the cellulose fine fibers with a dispersing agent and then drying the mixture, and adding a melt kneaded resin by means of a twin-screw extruder, a method of wet paper forming of the cellulose fine fibers into a sheet and impregnating the sheet with a resin to form a composite, or a method of mixing the cellulose fine fibers with synthetic fibers and forming a nonwoven fabric by wet paper forming, for example, the fabric then being hot pressed at or above the melting point of the synthetic fibers. According to one aspect, the method for producing the fiber-reinforced resin may be a method in which the cellulose fine fibers are mixed with synthetic fibers (synthetic staple fibers, according to one aspect), and used in a wet papermaking process to form a nonwoven fabric, after which the nonwoven fabric is shaped by hot pressing (this will hereunder be referred to as "nonwoven fabric method"), or a method in which a slurry of the cellulose fine fibers is prepared and supplied to a publicly known dryer such as a spray drier or vacuum dryer to form a dry powder, after which the dry powder is added during melt kneading of a resin using a twin-screw extrusion kneader.

<Resin>

The resin (matrix resin) to be used for the embodiment may be a thermosetting resin, photocuring resin or thermoplastic resin. A thermoplastic resin is preferred because of the excellent heat resistance of the cellulose fine fibers of the embodiment. The cellulose fine fibers can form a suitable composite with a resin having a melting point of 200° C. or higher and a melt kneading temperature of 250° C. or higher, for example. Examples of thermoplastic resins include styrene-based resins, acrylic-based resins, aliphatic or aromatic polycarbonate-based resins, aliphatic or aromatic polyester-based resins (such as polyethylene terephthalate and polylactic acid), straight-chain polyolefin-based resins, cyclic olefin-based resins, aliphatic or aromatic polyamide-based resins, polyphenylene ether-based resins, polyvinyl alcohol-based resins, polyoxyalkylene-based resins and polyphenylene sulfide-based resins, thermoplastic polyimide-based resins, polyacetal-based resins and polysulfone-based resins, amorphous fluorine-based resins, and epoxy-based resins. These thermoplastic resins may be used alone or in combinations of two or more.

More preferred examples of thermoplastic resins include one or more selected from the group consisting of polyolefins (such as polyethylene and polypropylene), polyesters (such as polyethylene terephthalate and polylactic acid), polyamides (such as PA6, PA66, PA4, PA12 and aromatic polyamides), and polyacrylonitrile, polymethyl methacrylate, polystyrene, polyvinyl alcohol, polyphenylene ether, polyoxymethylene and polyphenylene sulfide.

The melting point of the thermoplastic resin is 80° C. or higher, 90° C. or higher, 100° C. or higher, 120° C. or higher, 140° C. or higher, 160° C. or higher, 180° C. or higher or 200° C. or higher, according to one aspect, and 300° C. or lower, 250° C. or lower or 230° C. or lower, according to another aspect. The melting point, for the purpose of the disclosure, is the peak top temperature of the endothermic peak appearing upon temperature increase at a temperature-elevating rate of 10° C./min (or when two or more endothermic peaks are present, the peak furthest at the high-temperature end), using a differential scanning calorimeter (DSC).

When the nonwoven fabric method is used, the synthetic fibers must have a melting point since the synthetic fibers will be melted during hot pressing. Specific resins with melting points include known resins such as polyethylene, polystyrene, polypropylene. ABS resins, polycarbonate, polyamide 6, polyamide 12, polyamide 66, polyvinyl chloride, methacryl resin, polyvinyl alcohol, polyvinylidene chloride, polyvinylidene fluoride, polyetherimide, polyoxymethylene, polysulfone, polyethylene terephthalate and polyphenylene sulfide, but other resins may also be used so long as they have melting points. The melting point of the resin is preferably 250° C. or lower. This is because cellulose fine fibers composed mainly of type I crystals begin to undergo thermal decomposition or marked weight decrease under oxidation between 260° C. and 300° C., thus causing coloration of the composite and tending to lower the strength provided by the cellulose. From the standpoint of molding of the fiber-reinforced resin by hot melting (such as hot pressing in a nonwoven fabric method) while inhibiting decomposition of the cellulose, the melting point of the resin is preferably low, such as 250° C. or lower, and more preferably 230° C. or lower. The melting point of the resin may also be 80° C. or higher according to one aspect, in consideration of heat resistance during use.

<Cellulose Fine Fiber and Resin Contents in Fiber-Reinforced Resin>

The content of the cellulose fine fibers in the fiber-reinforced resin is preferably 1 mass % or greater, more preferably 5 mass % or greater, even more preferably 10 mass % or greater and yet more preferably 20 mass % or greater, for a satisfactory effect as reinforcing fibers. If the cellulose fine fiber content is too high, the continuous layer of the resin in the fiber-reinforced resin will tend to fracture resulting in lower performance of the fiber-reinforced resin, and since according to one aspect the flow property is low during casting of the fiber-reinforced resin, which can tend to cause molding defects, the upper limit is preferably 60 mass % or lower, more preferably 50 mass % or lower and even more preferably 40 mass % or lower.

The content of the resin in the fiber-reinforced resin is preferably 50 mass % or greater or 60 mass % or greater, from the standpoint of more easily providing high strength in the fiber-reinforced resin due to formation of a continuous layer of the matrix resin, while from the viewpoint of avoiding excessive lowering of the cellulose fine fiber content so that the reinforcing effect of the cellulose fine fibers is satisfactorily obtained, it is preferably 99 mass % or lower, 95 mass % or lower or 90 mass % or lower.

<Compositing by Nonwoven Fabric Method>

The method for obtaining the fiber-reinforced resin comprising the cellulose fine fibers and resin may be a nonwoven fabric method, for example. The nonwoven fabric includes cellulose fine fibers of the disclosure, according to one aspect, or it includes cellulose fine fibers of the disclosure and synthetic fibers, according to another aspect. Based on the principle of compositing for fiber-reinforced resins, the strength of a fiber-reinforced resin depends primarily on the orientation of fibers in the resin and the continuity of the fibers, and therefore controlling the orientation and continuity of the fibers is advantageous for controlling the fiber-reinforced resin strength. By using a nonwoven fabric method, the cellulose fine fibers form continuous layers in the resin by hydrogen bonding, the continuous layers resulting in a highly oriented structure in the two-dimensional planar direction, thus producing a material with excellent strength.

Preferred ranges for the cellulose fine fiber content in the nonwoven fabric are the same as for the cellulose fine fiber content in the fiber-reinforced resin, from the same viewpoint.

The content of synthetic fibers in the nonwoven fabric is preferably 50 mass % or greater or 60 mass % or greater, from the standpoint of more easily providing high strength in the fiber-reinforced resin by allowing the synthetic fibers to melt to form a continuous layer during production of the fiber-reinforced resin, and of reducing the load of dewatering during papermaking for production of the nonwoven fabric, while from the viewpoint of avoiding excessive lowering of the cellulose fine fiber content so that the reinforcing effect of the cellulose fine fibers is satisfactorily obtained, it is preferably 99 mass % or lower, 95 mass % or lower or 90 mass % or lower. The synthetic fiber content may be set as desired for adjustment of the strength, elastic modulus and fracture strain, but it is preferably 60 mass % to 90 mass %.

A method for producing the fiber-reinforced resin by a nonwoven fabric method will now be described. According to one aspect, the nonwoven fabric method includes a slurry preparation step in which the cellulose fine fibers and synthetic fibers are stirred and mixed in a water-containing medium to obtain a slurry, a papermaking step in which a wet compact (wet nonwoven fabric) is obtained from the slurry by a wet papermaking method, a drying step in which the wet compact is dried to obtain a nonwoven fabric, and a hot pressing step in which the nonwoven fabric is hot pressed at a temperature at or above the melting point of the synthetic fibers in the nonwoven fabric, to obtain a fiber-reinforced resin.

(Synthetic Fibers)

According to one aspect, the synthetic fibers used in the nonwoven fabric method are synthetic staple fibers. Synthetic staple fibers are synthetic polymer fibers that have been cut to arbitrary fiber lengths, and they are also referred to as cut fibers or simply staple fibers. According to one aspect, the synthetic staple fibers may have a mean fiber length of 20 mm or smaller, and according to another aspect they may be fibers of 10 mm or smaller. The synthetic staple fibers may be fibrillated fibers obtained by fibrillating spun and cut fibers by beating treatment or the like, or fibrillated fibers obtained by cutting fibers with a multi-branched structure that have been produced by spinning such as flash-spinning or electrospinning. Preferred examples of synthetic fiber materials are as mentioned above for the resin.

The mean fiber size of the synthetic fibers is preferably 0.1 µm or greater, 0.3 µm or greater or 1.0 µm or greater, from the viewpoint of availability of the synthetic fibers, and preferably 50 µm or smaller, 40 µm or smaller or 25 µm or smaller, from the viewpoint of uniform blending with the cellulose fine fibers and easier formation of a homogeneous nonwoven fabric using them. When the synthetic fibers have a relatively small mean fiber size (such as 10 µm or smaller), the small difference in fiber size between the cellulose fine fibers and synthetic fibers will produce a lower coefficient of variation for the air permeability resistance, resulting in more satisfactory homogeneity of the internal structure of the nonwoven fabric. If the synthetic fibers have a relatively large mean fiber size (such as greater than 40 µm), the large difference in fiber size between the cellulose fine fibers and synthetic fibers will tend to result in greater variation in the internal structure of the nonwoven fabric, although a satisfactory (low) coefficient of variation in the air permeability resistance can be exhibited if the nonwoven fabric has a high basis weight (such as 200 g/m$^2$ or higher).

From the viewpoint of obtaining a nonwoven fabric and fiber-reinforced resin with satisfactory mechanical properties, the mean fiber length of the synthetic fibers is preferably 0.5 mm or greater, 1.0 mm or greater or 1.5 mm or greater, while from the viewpoint of facilitating uniform dispersion of the cellulose fine fibers among the synthetic fibers, it is preferably 20 mm or smaller, 15 mm or smaller or 10 mm or smaller.

The mean fiber size and mean fiber length of the synthetic fibers are measured by the following method. Each synthetic fiber sample is dispersed in water to 0.01 to 0.1 mass % and subjected to ultrasonic treatment (for several minutes) if necessary, after which it is dropped onto a glass slide and sandwiched by cover glass without allowing air to enter, and the perimeter of the cover glass is sealed with manicure (the aqueous dispersion concentration being adjusted so that the fibers do not entangle with each other during photography with a microscope). An image is then taken with a microscope (VHX-7000 by Keyence Corp., with magnification adjusted to fit the long side of the fiber in the image), and the long diameters and short diameters of 100 filaments in each sample are measured, taking their average as the mean fiber length and mean fiber size.

The melting point of the synthetic fibers is preferably 300° C. or lower and more preferably 250° C. or lower, from the viewpoint of preventing heat degradation of the cellulose fine fibers during hot pressing. Since the practical utility of the fiber-reinforced resin will be reduced if the melting point is too low, the melting point is preferably 90° C. or higher and more preferably 160° C. or higher.

The polymer composing the synthetic fibers may be any of those mentioned above for the resin. Preferred polymers are polyamides, polyesters (such as polyethylene terephthalate, polylactic acid), polyoxymethylene and polyacrylonitrile, from the viewpoint of high affinity with the cellulose fine fibers to facilitate more uniform blending. Polyphenylene sulfide, polyphenylene ether, polyesters and aromatic polyamides are suitable for purposes that require heat resistance.

A specific procedure for a nonwoven fabric method will now be described as an example. The nonwoven fabric method includes a slurry preparation step in which the cellulose fine fibers and synthetic fibers are stirred and mixed in a water-containing medium to obtain a slurry, a papermaking step in which a wet compact is obtained from the slurry by a wet papermaking method, a drying step in which the wet compact is dried to obtain a nonwoven fabric, and a hot pressing step in which the nonwoven fabric is hot pressed at a temperature at or above the melting point of the synthetic fibers in the nonwoven fabric, to obtain a fiber-reinforced resin.

(Slurry Preparation Step)

In this step, the cellulose fine fibers and synthetic fibers are stirred in a water-containing medium, with the bundled synthetic fibers becoming monodispersed and highly distributed throughout the cellulose fine fibers. The stirring device used may be a publicly known mixer such as a homomixer or blender mixer. From the viewpoint of increasing the elastic modulus of the final obtained fiber-reinforced resin by achieving high dispersion of the cellulose fine fibers and synthetic fibers, and the viewpoint of increasing the two-dimensional orientation of the cellulose fine fibers to increase the strength and fracture strain, the total solid concentration of the cellulose fine fibers and synthetic fibers is preferably 3.0 mass % or lower, 1.0 mass % or lower or 0.8 mass % or lower, while from the viewpoint of shortening the filtration time to improve productivity, it is preferably 0.05 mass % or higher, 0.1 mass % or higher or 0.25 mass % or higher. A dispersing agent such as a surfactant or thickener may also be used during this step to improve dispersibility of the synthetic fibers or to improve miscibility of the synthetic fibers and cellulose fine fibers.

(Papermaking Step)

In this step, the slurry is dewatered in a wet papermaking method as a wet compact to obtain a wet nonwoven fabric. According to one aspect, the slurry is dewatered by suction filtration on a porous substrate. Any filter medium may be used in the papermaking method that has a pore size that can dewater the slurry and retain the cellulose fine fibers and synthetic fibers. Specific filter media include filter paper, filter cloths and metal meshes. The suction filtration may also be combined with a pressing step in which the wet compact is contacted and pressed from above by rollers, in order to obtain a higher dewatering effect.

If the papermaking apparatus used is an inclined wire paper machine. Fourdrinier paper machine or circular mesh paper machine it will be possible to obtain a suitable flat sheet-like wetted compact with few defects. A wetted compact of a desired shape can be obtained using a metal die for pulp molding.

The papermaking may be in a continuous system or batch process depending on the purpose, but in order to obtain a flat sheet, it is preferred from the standpoint of industrial cost to produce a long sheet by continuous papermaking using a paper machine and prepare it as a product roll. When a paper machine is used for continuous ordinary papermaking (using beaten pulp fibers and synthetic fibers, for example), generation of shear stress due to loading of the aqueous dispersion of the fibers onto the paper-making wire and running of the wire belt causes the fibers in the aqueous dispersion to become oriented in the traveling direction of the wire belt, and this results in anisotropy of the physical properties (such as strength and elastic modulus) due to the difference in fiber orientations in the machine direction (MD) and the transverse direction (TD) of the obtained flat sheet, whereas in the continuous papermaking step of the embodiment, an advantage is provided in that differences in physical properties in the MD and TD are less likely to appear. It is thought that this is the case because when a flat sheet is produced as a nonwoven fabric using a paper machine, the cellulose fine fibers in the aqueous dispersion containing cellulose fine fibers and synthetic fibers that have been loaded into the paper machine form isotropic soft aggregates by association between the fibers, with the synthetic fibers being taken up (integrated) into the soft aggregates to form composite soft aggregates, such that the synthetic fibers are incorporated into the composited soft aggregates in a non-oriented manner (they are disordered and lack anisotropy), even if they have anisotropic shapes.

The composite soft aggregates have sufficient strength to avoid disintegrating under the shearing stress applied to the aqueous dispersion in ordinary papermaking as the belt travels. The composite soft aggregates therefore accumulate and are dewatered on the belt with the synthetic fibers fixed in a non-oriented manner, making it possible to form a non-anisotropic sheet by subsequent drying treatment. In ordinary continuous papermaking, the ratio of physical properties such as tensile strength, tensile modulus, flexural strength, flexural modulus and coefficient of linear thermal expansion for MD/TD increases with greater running speed during papermaking (usually a speed of 5 m/min or higher) (see Comparative Example I-8), but according to one aspect, when a flat sheet of the embodiment is fabricated by a continuous papermaking method, the ratio of physical properties for MD/TD may be 1.6 or lower, preferably 1.4 or lower and even more preferably 1.2 or lower (see Example I-27). The method of the embodiment provides the advantage of reducing anisotropy not only in sections with high flatness but also in sections with high curvature, even in three-dimensional molding such as a pulp molding method.

(Drying Step)

In this step, the wet compact is at least dried, to obtain a nonwoven fabric. The drying method is not particularly restricted, but for a method using a drum dryer or pin tenter, it is preferred to use a fixed-length dry-type dryer of a type that allows drying of a liquid medium with the wet compact width kept at a fixed length. Using such a dryer reduces changes in the internal structure of the nonwoven fabric during drying and facilitates control of the orientation of the cellulose fine fibers in the nonwoven fabric. The air permeability resistance of the nonwoven fabric can be controlled by the compositional ratio of the cellulose fine fibers and synthetic fibers in the slurry, the overall basis weight, the method of dispersing the stock solution, the conditions for adding various additives, and the mean fiber size of the cellulose fine fibers.

From the viewpoint of drying efficiency (especially increasing the evaporation rate of the liquid medium to obtain satisfactory productivity), the drying temperature is preferably 45° C. or higher, 60° C. or higher, 80° C. or higher, 85° C. or higher or 90° C. or higher, while it is preferably 180° C. or lower, 150° C. or lower, 120° C. or lower, 115° C. or lower or 110° C. or lower from the viewpoint of preventing thermal degradation of the hydrophilic polymer forming the nonwoven fabric (specifically, the cellulose fine fibers and other components), preventing loss of energy efficiency which can affect cost and, if a reactive crosslinking agent is used, preventing reaction of the reactive crosslinking agent. For example, multistage drying with low-temperature drying at a temperature of 100° C. or below followed by drying at a temperature of above 100° C. is also effective for obtaining a highly uniform nonwoven fabric. These conditions are suitable when using a blocked polyisocyanate as a reactive crosslinking agent, for example.

(Hot Pressing Step)

In this step, the nonwoven fabric obtained in the drying step is pressed using a heated die to cause melting and flow of the synthetic fibers in the nonwoven fabric so that they fill in the gaps, producing a fiber-reinforced resin which is a composite of the cellulose fine fibers and the resin. Since the cellulose fine fibers do not melt under the heating, it is possible to maintain the high degree of two-dimensional orientation inside the nonwoven fabric. The heating temperature may be at or above the melting point of the synthetic fibers, but if it is near the melting point the high viscosity of the resin may result in voids remaining inside the composite. The heating temperature is therefore preferably at least 10° C. higher than the melting point of the synthetic fibers. The thickness of the compact can be adjusted by supplying several layers of the nonwoven fabric to a hot pressing step.

<Melt Kneading>

According to one aspect, in a manner similar to the nonwoven fabric method described above, a slurry of the cellulose fine fibers may be prepared and supplied to a publicly known dryer such as a spray drier or vacuum dryer to form a dry powder, after which the dry powder may be added during melt kneading of a resin using a twin-screw extrusion kneader, to produce a fiber-reinforced resin.

<Use of Fiber-Reinforced Resin>

The fiber-reinforced resin as a composite of cellulose fine fibers and a resin obtained by the embodiment has excellent mechanical properties including elastic modulus, strength and fracture strain, and can therefore be suitably used for a wide range of purposes such as automobile parts, construction materials and household appliances.

The present disclosure encompasses the following groups of aspects of the invention.

<Aspect Group I>

[1] Cellulose fine fibers that are chemically modified on at least their surfaces,
wherein in measurement with a fiber shape analyzer, the length-weighted mean fiber length of fibers with fiber lengths of 100 μm or greater is 110 μm to 500 μm, and
the number frequency of fibers with a length-weighted fiber length of 411 μm or greater among the fibers with fiber lengths of 100 μm or greater is 54% or lower.

[2] The cellulose fine fibers according to [1] above, which satisfy all of the following in measurement with an automatic fiber shape analyzer:
(1) the mean fiber size is 42.5 μm or smaller,
(2) the fine fiber area ratio is 90% or lower,
(3) the number frequency of fibers with fiber lengths of 20 μm to 56 μm among the fibers with fiber lengths of less than 100 μm is 30% to 97%, and
(4) the fibrillation rate is 5% or lower.

[3] The cellulose fine fibers according to [1] or [2] above, wherein the chemical modification is acetylation, the acetylation degree being 0.5 to 1.3.

[4] The cellulose fine fibers according to any one of [1] to [3] above, wherein the glucose content in constituent sugar analysis is 90 mass % or greater.

[5] The cellulose fine fibers according to any one of [1] to [4] above, wherein in a scanning electron microscope (SEM) image of the surface of a sample obtained by casting and drying a DMSO dispersion of the cellulose fine fibers at 5 ppm by mass, the proportion of the total area occupied by ultrafine fibers with an occupied area of less than 15 μm² is 10% to 80% with respect to the total area occupied by the cellulose fine fibers.

[6] The cellulose fine fibers according to any one of [1] to [5] above, which have a type I cellulose crystal structure.

[7] The cellulose fine fibers according to any one of [1] to [6] above, wherein the degree of crystallinity is 60% or greater.

[8] A fiber-reinforced resin that includes cellulose fine fibers according to any one of [1] to [7] above, and a resin with a melting point of 200° C. or higher.

[9] A nonwoven fabric that includes cellulose fine fibers according to any one of [1] to [7] above.

[10] The nonwoven fabric according to [9] above, which includes synthetic fibers with a melting point of 300° C. or lower at 50 mass % or greater.

[11] A fiber-reinforced resin which includes a nonwoven fabric according to [9] above and a resin impregnated in the nonwoven fabric.

[12] A method for producing a fiber-reinforced resin which includes cellulose fine fibers and a resin, wherein:
the method includes a step of hot pressing a nonwoven fabric according to [10] above to obtain a fiber-reinforced resin, and
the hot pressing is carried out at or above the melting point of the synthetic fibers.

<Aspect Group II>

[1] Cellulose fine fibers satisfying all of the following features in measurement with an automatic fiber shape analyzer:
(i) the mean fiber length is 130 μm to 350 μm,
(ii) the mean fiber size is 35 μm or smaller,
(iii) the fine fiber area ratio is 75% or lower,
(iv) the number frequency of fibers with fiber lengths of 20 μm to 56 μm among the fibers with fiber lengths of less than 100 μm is 75% or lower,
(v) the number frequency of fibers with fiber lengths of 411 μm or greater among the fibers with fiber lengths of 100 μm or greater is 30% or lower, and
(vi) the fibrillation rate is 5.0% or lower.

[2] The cellulose fine fibers according to [1] above, wherein for a water-dispersed slurry with a concentration of 0.75 mass %, the reciprocal of the yield strain (γ) determined by strain dispersion measurement (1/γ) is 200 or greater.

[3] Cellulose fine fibers according to [1] or [2] above, wherein the zeta potential is −50 mV to 50 mV.

[4] A fiber-reinforced resin that includes cellulose fine fibers according to any one of [1] to [3] above at 1.0 mass % or greater, and a resin.

[5] A nonwoven fabric that includes cellulose fine fibers according to any one of [1] to [3] above at 1.0 mass % or greater.

[6] The nonwoven fabric according to [5] above, which includes synthetic fibers with a melting point of 250° C. or lower at 50 mass % or greater.

[7] A method for producing a fiber-reinforced resin which includes cellulose fine fibers and a synthetic resin, wherein:
the method includes a step of hot pressing a nonwoven fabric that includes cellulose fine fibers and synthetic fibers to obtain a fiber-reinforced resin,
the nonwoven fabric is a nonwoven fabric according to [5] or [6] above, and
hot pressing is carried out at or above the melting point of the synthetic fibers.

<Aspect Group III>

[1] Cellulose fine fibers that are plant-derived and have a halogen content (more specifically, a content of halogens bonded to cellulose) of 250 ppm by mass or lower.

[2] The cellulose fine fibers according to [1] above, wherein the whiteness is 50% or greater.

[3] A method for producing cellulose fine fibers according to [1] or [2] above,
which includes a step of defibrating a cellulose starting material having a halogen content (more specifically a content of halogens bonded to cellulose) of 300 ppm by mass or lower.

[4] The method for producing cellulose fine fibers according to [3] above, wherein the cellulose starting material is a chemically modified substance.

[5] The method for producing cellulose fine fibers according to [4] above, wherein the chemically modified substance is an acetylated substance.

[6] The method for producing cellulose fine fibers according to any one of [3] to [5] above, wherein the cellulose starting material is derived from cotton.

[7] The method for producing cellulose fine fibers according to any one of [3] to [6] above, wherein the defibration is beating treatment using a disc refiner.

[8] A resin composition which includes cellulose fine fibers according to [1] or [2] above, and a resin.

[9] A method for producing a resin composition, which includes:
 a step of obtaining cellulose fine fibers by the method according to any one of [3] to [7] above, and
 a step of mixing the cellulose fine fibers with a resin to obtain a resin composition.

EXAMPLES

The present invention will now be explained in greater detail using Examples and Comparative Examples, with the understanding that the invention is not limited to the Examples.

Example I

<Measuring Methods>
[Measurement with Fiber Shape Autoanalyzer]
The properties of the cellulose fine fibers were evaluated by the following procedure using an automatic fiber shape analyzer (Morfi Neo by TechPap).

1. The cellulose fine fibers were dispersed in purified water to prepare a 1 L aqueous dispersion. The final solid concentration of the cellulose fine fibers was 0.003 to 0.005 mass %. Aqueous dispersions with less than 2 mass % of cellulose fine fibers before dilution (Production Examples 6, 7 and 11) were simply mixed with a spatula, while for aqueous dispersions, wet cakes or powders with 2 mass % or greater (Production Examples 1 to 5, 8 to 10 and 12, and Comparative Examples 1 to 7), a high-shear homogenizer ("ULTRA-TURRAX T18", trade name of IKA Co.) was used for dispersion treatment with treatment conditions of 25,000 rpm×5 minutes. Since dispersion was in a non-water medium in all of the Production Examples, a high-shear homogenizer was used for dispersion treatment in a sufficient amount of purified water with treatment conditions of 25,000 rpm×5 min, after which the medium was removed by suction filtration or other means, and the high-shear homogenizer was again used for dispersion treatment in purified water with treatment conditions of 25,000 rpm×5 min to a final solid concentration of 0.003 to 0.005 mass %, to exchange the medium with water.

2. The aqueous dispersion prepared in 1. was supplied to an autosampler for measurement.

3. The measurement results were outputted to a txt (or csv) file.

4. Each of the shape parameters was extracted or calculated based on the measurement results.

The following values were used for each parameter, from among the measured values.

Length-weighted average fiber length for normal fibers (fiber lengths of 100 μm or greater): Mean length-weighted length [μm]

Mean fiber length for normal fibers (fiber lengths of 100 μm or greater): Mean arithmetic length [μm]

Number frequency of fibers with fiber lengths of 411 μm or greater, for normal fibers: Calculated from the length-weighted fiber length distribution of normal fibers (length-weighted fiber length, μm).

Mean fiber size: Mean fiber width [μm]

Fine fiber area ratio: Fine content, % in Area Number frequency of fibers with fiber lengths of 20 μm to 56 μm, for fine fibers (fiber lengths of less than 100 μm): Calculated from the fiber length distribution of the fine fibers Fine length, μm: FL).

Fibrillation rate: Macrofibrillation index [%]

[Specific Surface Area, and Mean Fiber Size Converted from Specific Surface Area]

This was determined as the BET specific surface area ($m^2/g$), calculated using the program of a specific surface area/pore distribution measuring apparatus (Nova-4200e, by Quantachrome Instruments), after drying approximately 0.2 g of the cellulose fine fibers for 5 hours in a vacuum at 120° C. and then measuring the nitrogen gas adsorption at the boiling point of liquid nitrogen at five points (multipoint method) in a relative vapor pressure ($P/P_0$) range of 0.05 to 0.2.

The mean fiber size was calculated from the specific surface area in the following manner.

Since the density of cellulose is 1.5 ($g/cm^3$), the volume per 1 g of cellulose is $6.7\times10^{-7}$ ($m^3/g$).

If the converted mean fiber diameter of the cellulose fine fibers is represented as r(m), then the average circumference length of the cellulose fine fibers=$\pi r$ and the average cross-sectional area of the cellulose fine fibers=$0.25\pi r^2$, so that the total fiber length=$6.7\times10^{-7}$ ($m^3$)/average cross-sectional area (=$0.25\pi r^2$), per 1 g of cellulose fine fibers.

Thus, the total surface area=specific surface area ($m^2$)= $6.7\times10^{-7}$ ($m^3$)/average cross-sectional area (=$0.25\pi r^2$)×average circumference length (=$\pi r$)=$6.7\times10^{-7}$ ($m^3$)/0.25 r. Therefore, the mean fiber size r of CNF with a specific surface area of 40 $m^2$ is calculated to be 67 nm.

[Area Occupied by Ultrafine Fibers]

The occupied area ratio was measured using a field emission scanning electron microscope (FE-SEM Regulus 8220/5060FQ by Hitachi, Ltd.), by the following procedure.

1. An aqueous dispersion of cellulose fine fibers with a solid concentration of 0.2 to 2 mass % was diluted to a solid content of 5 ppm by mass using dimethyl sulfoxide (DMSO), and a homogenizer ("ULTRA-TURRAX T18", trade name of IKA) was used for stirring at 3000 rpm for 30 seconds, to prepare a DMSO dispersion.

2. A smooth substrate (silicon wafer) was subjected to osmium plasma coating and heated on a hot plate at 130° C.

3. A 7 μL portion of the DMSO dispersion was dropped onto the center of the heated smooth substrate and allowed to dry while heating, to fix the cellulose fine fibers onto the substrate.

4. The obtained substrate with the fixed cellulose fine fibers was photographed using a scanning electron microscope (SEM), with an acceleration voltage of 1.5 kV and an observation magnification of 400×, taking 4 images at different arbitrary locations on the substrate at a resolution of at least 400 pixels per 100 μm.

5. The number of pixels corresponding to 15 $\mu m^2$ was counted as the threshold, from the number of pixels on the scale bar of the SEM photograph.

6. Image processing software (ImageJ) was used to create a binarized image from the obtained SEM photograph by the MaxEntropy method.

7. The binarized image was analyzed by particle analysis using "Analyze Particle" in ImageJ, and the area (pixels) of monofilaments in the cellulose fine fibers was calculated.

8. The particle analysis results for the 4 images were summed and, deleting two pixels or fewer as noise, areas of less than 15 $\mu m^2$ (as the threshold) were considered to be ultrafine fibers, and the proportion of ultrafine fiber area of less than 15 μm² occupying the total area of the cellulose fine fibers was calculated.

[Glucose Content]

The glucose content of the cellulose fine fibers based on constituent sugar analysis was measured by the following procedure, with reference to the analysis protocol established by the National Renewable Energy Laboratory of the US Dept. of Energy (Sluiter, A., Hames, B., Ruiz, R., Scarlata, C., Sluiter, J., Templeton, D., Crocker, D.: Determination of structural carbohydrates and lignin in biomass. National Renewable Energy Laboratory (NREL), USA, 2008).

A 3 ml portion of 72% sulfuric acid was added to 200 mg of sample (anhydrous base) and allowed to swell at 30° C. for 1 hour, after which it was poured into a 125 ml pressure bottle with 84 ml of purified water and subjected to hydrolysis for 120° C. for 1 hour. It was then subjected to suction filtration and solid-liquid separation with a 1G-3 glass filter (constant mass at 105° C.) while hot, after which the filtrate was brought to a constant volume of 100 ml and the constituent sugars (glucose, mannose and xylose) were quantified by high performance liquid chromatography (HPLC) (1260 Infinity II by Agilent Technology).

[DS]

The acetyl degree of substitution (DS) of the cellulose fine fibers was evaluated by the following procedure using an infrared spectrometer (FT/IR-6200 by JASCO Corp.) and a nuclear magnetic resonance (NMR) apparatus (AVANCE III 500 MHz by Bruker).

The acetyl degree of substitution (DS) was calculated based on the peak intensity ratio between the acetyl group-derived peak and the cellulose backbone-derived peak, in the reflective infrared absorption spectrum of the cellulose fine fibers. The peak of the absorption band for C=O based on acetyl groups appears at 1730 cm$^{-1}$, while the peak of the absorption band for C—O based on the cellulose backbone chain appears at 1030 cm$^{-1}$. The DS of cellulose fine fibers was calculated using:

Degree of substitution DS=4.13×IR index (1030), from a calibration curve derived from a correlation graph drawn between DS obtained from solid NMR measurement of the cellulose fine fibers described below, and the modification rate (IR index 1030), defined by the ratio of the peak intensity of the absorption band for C=O based on acetyl groups with respect to the peak intensity of the absorption band for C—O of the cellulose backbone chain.

The method of determining DS of the cellulose fine fibers by solid NMR was $^{13}$C solid NMR measurement of the freeze-shattered cellulose fine fibers, and calculation of the value by the following formula using the area intensity (Inf) of the signal attributed to one carbon atom of the modifying group, with respect to the total area intensity (Inp) of the signals attributed to C1-C6 carbons of the pyranose rings of cellulose, appearing in the range of 50 ppm to 110 ppm.

DS=(Inf)×6/(Inp)

Since the modifying group is acetyl, the signal at 23 ppm attributed to —CH$_3$ was used.

The conditions used in the $^{13}$C solid NMR measurement were as follows.

Apparatus: Bruker Biospin Avance 500WB
Frequency: 125.77 MHz
Measuring method: DD/MAS
Latency time: 75 sec
NMR sample tube: 4 mmφ
Number of scans: 640 (~14 hr)
MAS: 14,500 Hz
Chemical shift reference: glycine (external reference: 176.03 ppm)

[Degree of Crystallinity]

The degree of crystallinity of the cellulose fine fibers was evaluated by the following method using an X-ray diffractometer (MiniFlex II by Rigaku Corp.).

The sample was measured by wide-angle X-ray diffraction, and calculation was by the following formula from the measured diffraction pattern (2θ/deg., 10-30), based on the Segal method.

Degree of crystallinity (%)=[$I_{(200)}$−$I_{(amorphous)}$]/$I_{(200)}$×100

$I_{(200)}$: Diffraction peak intensity at 200 plane (2θ=22.5°) for type I cellulose crystal $I_{(amorphous)}$: Amorphous halo peak intensity for type I cellulose crystal, peak intensity at angle of 4.5° lower than diffraction angle at 200 plane (2θ=18.0°).

[Whiteness Measurement]

This was measured using a whiteness spectrophotometer/color difference meter (Model PF700 by Nippon Denshoku Industries Co., Ltd.), according to "Paper, board and pulps—Measurement of diffuse blue reflectance factor (ISO whiteness)" (JIS P8148 ISO 2470). The slurry of the cellulose starting material or cellulose fine fibers was processed by papermaking using a suction filtration apparatus comprising a polytetrafluoroethylene (PTFE) membrane filter to a basis weight of 50 g/m² or greater and dried to equilibrium moisture at 80° C. to prepare a cellulose sheet, which was provided for measurement.

[Measurement of Halogen Content in Cellulose Starting Material or Cellulose Fine Fibers]

(Immersion and Filtration Treatment)

The cellulose starting material or cellulose fine fibers were immersed in purified water at 25° C. for 48 hours. Specifically, the cellulose starting material or cellulose fine fibers were immersed in purified water to 2% solid mass in a glass beaker having a total volume of 200 mL, stirred for 1 hour using a 3-1 motor (Model BL-600 by Heidon Co., SUS propeller blade, 100 rpm), and then allowed to stand. A TEFLON™ membrane filter (1 μm mesh) was then used for vacuum filtration, and a sheet with a basis weight of 10 g/m² was formed, filtration drying it in a ventilation oven at 70° C. to a moisture content of 10 mass % or lower to obtain a treated cellulose starting material or treated cellulose fine fibers.

(Measurement of Halogen Content)

The treated cellulose starting material or treated cellulose fine fibers were weighed out to 50 mg on a quartz sample boat. The sample boat was set in an electric furnace (Mitsubishi Chemical Analytics) and combusted at 1000° C. The gas generated by combustion was brought to ordinary temperature through a cooling unit and then passed through a fluorine resin tube and bubbled through an absorbing solution (comprising 10 mg/L tartrate ion, 600 mg/L hydrogen peroxide, 2.7 mmol/L sodium carbonate and 0.3 mmol/L sodium hydrogen carbonate dissolved in ion-exchanged water). The absorbing solution was passed through a fluorine resin tube and the halogens were quantified using an ion chromatography analyzer (Model INTEGRION CT by ThermoFisher). The quantification was carried out based on a calibration curve created from samples with different halogen contents. The moisture content of the treated cellulose starting material or treated cellulose fine fibers was subtracted by the drying loss method (wherein a 2.00 g portion of a cellulose sample is introduced into a glass weighing bottle and dried for 15 hours at 60° C. and then for 2 hours at 105° C., and upon reaching a constant mass in a desiccator, the weight is measured and calculated by the formula: moisture content (mass %)=(sample weight before drying–sample weight after drying)/(sample weight before drying)× 100). The value with respect to the dry mass of the treated cellulose starting material or the treated cellulose fine fibers (the state containing no water) (ppm by mass) was used as the final halogen content remaining in the cellulose fibers.

[Heat Resistance Evaluation: Outer Appearance of Fiber-Reinforced Resin]

The outer appearance of a fiber-reinforced resin sample obtained by kneading the cellulose fine fibers and resin was evaluated as "Poor" if burnt sections were clearly present, "Fair" if slightly burnt sections were present, and "Good" if no discoloration was found.

[Tensile Test]

An injection molding machine with a maximum mold clamping pressure of 75 tons was used for molding of a multipurpose test piece (fiber-reinforced resin) from the kneaded blend according to ISO-37, and a tensile test was conducted under conditions conforming to JIS K6920-2, measuring the tensile strength, tensile modulus and fracture strain. Since polyamide resins undergo changes due to moisture absorption, these were stored in an aluminum moisture-proof bag immediately after casting to minimize moisture absorption.

[Bending Test]

In the bending test, the bending strength, flexural modulus and bending strain were measured under conditions conforming to JIS K7171:2008, using a strip cut out to a width of 10 mm, a length of 80 mm and a thickness of 4 mm, for fiber-reinforced resins fabricated by injection molding, and using a strip cut out to a width of 2.5 mm and a length of 50 mm, for laminar fiber-reinforced resins fabricated by a nonwoven fabric method. Since polyamide resins undergo changes due to moisture absorption, these were stored in an aluminum moisture-proof bag immediately after casting to minimize moisture absorption.

[Resin Thermal Stability]

A multipurpose test piece similar to the one used for the tensile test was placed in a sealable polyethylene bag and stored for 1 month at 100° C., after which it was returned to ordinary temperature and allowed to stand for 1 day, and visually observed. The evaluation was "Good" if no visible coloration was found, and "Poor" if visible coloration was found.

[Recycling Properties of Resin]

A strip similar to the one for the bending test was cut out to ≤φ5 mm using a cutter, and processed by two passes through an ultracentrifugal grinder (Model ZM200 by Retsch, screen mesh: φ2 mm, rotational speed: 10,000 rpm). In each of the Examples and Comparative Examples, melt kneading and injection molding were repeated 5 times by the respective described methods, and then the flexural strength was measured. In comparison to before storage, a flexural strength retention of 90% or greater was considered "Good", while <90% was considered "Poor".

<Materials>

[Pulp]

(Linter Pulp A)

Linter pulp A (hereunder, "pulp A"), as natural cellulose acquired from Japan Pulp and Paper Co. had a length-weighted average fiber length of 1660 μm as measured with the automatic fiber shape analyzer described above.

(Linter Pulp B)

Linter pulp B (hereunder, "pulp B"), as natural cellulose acquired from Japan Pulp and Paper Co. had a length-weighted average fiber length of 1006 μm as measured with the automatic fiber shape analyzer described above.

(Wood Pulp C)

Wood pulp (NBLP) C (hereunder, "pulp C"), as natural cellulose acquired from Japan Pulp and Paper Co. had a length-weighted average fiber length of 1315 μm as measured with the automatic fiber shape analyzer described above.

(Acetylated Linter Pulp D)

Pulp A was immersed in dimethyl sulfoxide to a pulp concentration of 5 mass %, 0.1 mass % of potassium carbonate was added as a catalyst, and the pulp was thoroughly dispersed and swelled using a stirring blade. After warming to 60° C., vinyl acetate was added for acetylation to obtain acetylated linter pulp D (hereunder, "acetylated pulp D").

(Acetylated Linter Pulp E)

Pulp B was immersed in dimethyl sulfoxide to a pulp concentration of 5 mass %, 0.1 mass % of potassium carbonate was added as a catalyst, and the pulp was thoroughly dispersed and swelled using a stirring blade. After warming to 60° C., vinyl acetate was added for acetylation to obtain acetylated linter pulp E (hereunder, "acetylated pulp E").

[Cellulose Fine Fibers]

Production Example 1

A slurry obtained by immersing pulp A in water to a solid content of 1.5 mass % and dispersing it using a Labo Pulper (Aikawa Iron Works Co.) was introduced into a defibrating apparatus equipped with a single disc refiner (Model SDR14 Lab Refiner by Aikawa Iron Works Co., pressurized disk type) and tanks A and B connected by wiring via the disc refiner, for defibration of the pulp. Defibration was carried out while controlling the number of passes through the disc refiner, by a method in which the slurry was conveyed from tank A where it was loaded into tank B through a disc refiner, and was stored there, and at this stage when treatment of the slurry of tank A was completed, it was conveyed continuously from tank B through the disc refiner to tank A where it was accumulated. The interblade adjusting mechanism of the disc refiner was a ball screw jack and speed reducer. The vibration width for the interblade distance during beating treatment after reaching the target interblade distance was 0.005 mm or less, as measured with a displacement sensor. The disc refiner blade had a blade width of 4.0 mm and a blade/groove ratio of 0.89 (disc blade A) which was used for 30 passes at an interblade distance of 0.25 mm, after which a blade with a blade width of 0.8 mm and a blade/groove ratio of 0.53 (disc blade B) was used for 30 passes at an interblade distance of 0.25 mm.

The obtained slurry was treated for 3 passes at 80 MPa with a high-pressure homogenizer (NS3015H by Niro Soavi). For high-pressure homogenizer treatment as well, two tanks were provided in a manner similar to disc refiner treatment, and defibration was carried out while controlling the number of passes in the high-pressure homogenizer treatment.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 2

In the same manner as Production Example 1, pulp A was immersed in water to a solid content of 1.5 mass % and dispersed with a Labo Pulper, after which a disc refiner blade with a blade width of 2.5 mm and a blade/groove ratio of 0.36 was used for 50 passes at an interblade distance of 0.20 mm, and then a blade with a blade width of 0.6 mm and a blade/groove ratio of 0.60 was used for 100 passes at an interblade distance of 0.10 mm. High-pressure homogenizer treatment was not carried out.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 3

In the same manner as Production Example 1, pulp B was immersed in water to a solid content of 1.5 mass % and dispersed with a Labo Pulper, after which a disc refiner blade with a blade width of 2.5 mm and a blade/groove ratio of 0.36 was used for 50 passes at an interblade distance of 0.20 mm, and then a blade with a blade width of 0.8 mm and a blade/groove ratio of 0.53 was used for 50 passes at an interblade distance of 0.20 mm.

The obtained slurry was treated for 5 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 4

In the same manner as Production Example 1, pulp A was immersed in water to a solid content of 3.0 mass % and dispersed with a Labo Pulper, after which a disc refiner blade with a blade width of 2.5 mm and a blade/groove ratio of 0.36 was used for 30 passes at an interblade distance of 0.20 mm, and then a blade with a blade width of 0.6 mm and a blade/groove ratio of 0.60 was used for 30 passes at an interblade distance of 0.20 mm.

The obtained slurry was treated for 5 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 5

In the same manner as Production Example 1, pulp A was immersed in water to a solid content of 1.5 mass % and dispersed with a Labo Pulper, after which a disc refiner blade with a blade width of 2.5 mm and a blade/groove ratio of 0.36 was used for 100 passes at an interblade distance of 0.15 mm, and then a blade with a blade width of 0.8 mm and a blade/groove ratio of 0.53 was used for 50 passes at an interblade distance of 0.15 mm.

The obtained slurry was treated for 10 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 6

In the same manner as Production Example 1, acetylated pulp D was immersed in water to a solid content of 1.5 mass % and dispersed with a Labo Pulper, after which a disc refiner blade with a blade width of 2.5 mm and a blade/groove ratio of 0.36 was used for 75 passes at an interblade distance of 0.05 mm, and then a blade with a blade width of 0.8 mm and a blade/groove ratio of 0.53 was used for 40 passes at an interblade distance of 0.05 mm.

The obtained slurry was treated for 10 passes with a high-pressure homogenizer.

Production Example 7

In the same manner as Production Example 1, acetylated pulp E was immersed in water to a solid content of 1.5 mass % and dispersed with a Labo Pulper, after which a disc refiner blade with a blade width of 0.8 mm and a blade/groove ratio of 0.53 was used for 50 passes at an interblade distance of 0.15 mm. The disc refiner treatment was carried out in a single stage, and the obtained slurry was treated for 10 passes with a high-pressure homogenizer.

Production Example 8

In the same manner as Production Example 1, pulp A was immersed in water to a solid content of 1.5 mass % and dispersed with a Labo Pulper, after which a disc refiner blade with a blade width of 2.5 mm and a blade/groove ratio of 0.36 was used for 100 passes at an interblade distance of 0.15 mm, and then a blade with a blade width of 0.8 mm and a blade/groove ratio of 0.53 was used for 50 passes at an interblade distance of 0.15 mm.

The obtained slurry was treated for 3 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 9

In the same manner as Production Example 1, pulp A was immersed in water to a solid content of 1.5 mass % and dispersed with a Labo Pulper, after which a disc refiner blade with a blade width of 2.5 mm and a blade/groove ratio of 0.36 was used for 100 passes at an interblade distance of 0.15 mm, and then a blade with a blade width of 0.8 mm and a blade/groove ratio of 0.53 was used for 50 passes at an interblade distance of 0.15 mm.

The obtained slurry was treated for 5 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 10

In the same manner as Production Example 1, pulp A was immersed in water to a solid content of 1.5 mass % and dispersed with a Labo Pulper, after which a disc refiner blade with a blade width of 2.5 mm and a blade/groove ratio of 0.36 was used for 10 passes at an interblade distance of 0.05 mm, and then a blade with a blade width of 0.8 mm and a blade/groove ratio of 0.53 was used for 10 passes at an interblade distance of 0.05 mm.

The obtained slurry was treated for 10 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Example 11

In the same manner as Production Example 1, acetylated pulp E was immersed in water to a solid content of 1.5 mass % and dispersed with a Labo Pulper, after which a disc refiner blade with a blade width of 0.8 mm and a blade/groove ratio of 0.53 was used for 40 passes at an interblade distance of 0.10 mm. The disc refiner treatment was carried out in a single stage, and the obtained slurry was treated for 10 passes with a high-pressure homogenizer.

Production Example 12

In the same manner as Production Example 1, pulp B was immersed in water to a solid content of 1.5 mass % and dispersed with a Labo Pulper, after which a disc refiner blade with a blade width of 2.5 mm and a blade/groove ratio of 0.36 was used for 70 passes at an interblade distance of 0.15 mm, and then a blade with a blade width of 0.6 mm and a blade/groove ratio of 0.60 was used for 40 passes at an interblade distance of 0.15 mm.

The obtained slurry was treated for 10 passes with a high-pressure homogenizer.

The moisture in the obtained unmodified cellulose fine fiber slurry was removed by twice repeating a procedure of adding DMSO to the wet cake with a solid content of 18 mass % obtained by vacuum filtration, stirring the mixture, and carrying out suction filtration. The DMSO-replaced cellulose fine fibers were placed in a DMSO solution of maleic anhydride and reacted to a predetermined degree of substitution while heating. After the reaction was complete, purified water washing, acetone washing and purified water washing were repeated to remove the solvent, unreacted reagent and by-products, to obtain a wet cake of maleic acid-modified cellulose fine fibers.

Production Comparative Example 1

Using the disc refiner and high-pressure homogenizer described in Production Example 1, pulp A was immersed in water to a solid content of 1.5 mass % and dispersed with a Labo Pulper, after which a disc refiner blade with a blade width of 2.5 mm and a blade/groove ratio of 0.36 was used for 20 passes at an interblade distance of 0.30 mm, and then a blade with a blade width of 0.8 mm and a blade/groove ratio of 0.53 was used for 50 passes at an interblade distance of 0.35 mm.

The obtained slurry was treated for 1 pass with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Comparative Example 2

In the same manner as Production Example 1, pulp B was immersed in water to a solid content of 1.5 mass % and dispersed with a Labo Pulper, after which a disc refiner blade with a blade width of 2.5 mm and a blade/groove ratio of 0.36 was used for 120 passes at an interblade distance of 0.50 mm, and then a blade with a blade width of 0.6 mm and a blade/groove ratio of 0.60 was used for 100 passes at an interblade distance of 0.03 mm. High-pressure homogenizer treatment was not carried out.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Comparative Example 3

In the same manner as Production Example 1, pulp C was immersed in water to a solid content of 1.5 mass % and dispersed with a Labo Pulper, after which a disc refiner blade with a blade width of 2.5 mm and a blade/groove ratio of 0.36 was used for 40 passes at an interblade distance of 0.35 mm. The disc refiner treatment was carried out in a single stage, and the obtained slurry was treated for 2 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Comparative Example 4

In the same manner as Production Example 1, pulp A was immersed in water to a solid content of 1.5 mass % and dispersed with a Labo Pulper, after which a disc refiner blade with a blade width of 4.0 mm and a blade/groove ratio of 0.89 was used for 5 passes at an interblade distance of 0.40 mm. The disc refiner treatment was carried out in a single stage, and high-pressure homogenizer treatment was not carried out.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Comparative Example 5

In the same manner as Production Example 1, pulp C was immersed in water to a solid content of 1.5 mass % and dispersed with a Labo Pulper, after which a disc refiner blade with a blade width of 2.5 mm and a blade/groove ratio of 0.36 was used for 50 passes at an interblade distance of 0.05 mm, and then a blade with a blade width of 0.8 mm and a blade/groove ratio of 0.53 was used for 50 passes at an interblade distance of 0.03 mm.

The obtained slurry was treated for 20 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Comparative Example 6

In the same manner as Production Example 1, pulp A was immersed in water to a solid content of 1.5 mass % and dispersed with a Labo Pulper, after which a disc refiner blade with a blade width of 2.5 mm and a blade/groove ratio of 0.36 was used for 120 passes at an interblade distance of 0.03 mm, and then a blade with a blade width of 0.8 mm and a blade/groove ratio of 0.53 was used for 60 passes at an interblade distance of 0.03 mm.

The obtained slurry was treated for 15 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

Production Comparative Example 7

For Production Comparative Example 7, the single disc refiner used had an amount of movement of 0.3 mm when pulled in the direction of thrust of the runner section.

Pulp A was immersed in water to a solid content of 1.5 mass % and dispersed with a Labo Pulper, after which a disc refiner blade with a blade width of 2.5 mm and a blade/groove ratio of 0.36 was used for 80 passes at an interblade distance of 0.20 mm, and then a blade with a blade width of 0.8 mm and a blade/groove ratio of 0.53 was used for 100 passes at an interblade distance of 0.10 mm.

The obtained slurry was treated for 5 passes with a high-pressure homogenizer.

The obtained unmodified cellulose fine fiber slurry was subjected to vacuum filtration and the resulting wet cake with a solid content of 18 mass % was placed in a reactor, dimethyl sulfoxide (DMSO) was added to a solid content of 2 mass %, potassium carbonate corresponding to 0.1 mass % was added, and the mixture was warmed to 60° C. while stirring to uniformity. Vinyl acetate was then added, and acetylation was carried out to the predetermined degree of substitution. Following the reaction, quench water was added to 10 mass % and a 50-fold amount of purified water by mass with respect to the solid cellulose content was used for repeated stirring and filtration in a pressure filter to sufficiently wash the solvent, obtaining a wet cake of acetylated cellulose fine fibers.

The evaluation results for the obtained chemically modified cellulose fine fibers are shown in Tables 1 and 2.

<Production of Fiber-Reinforced Resins>
(Compositing by Injection Molding: Examples I-1 to I-12 and Comparative Examples I-1 to I-7)

Each of the obtained chemically modified cellulose fine fibers was used to prepare a fiber-reinforced resin as a composite by injection molding, according to the following procedure.

1. The wet cakes of the chemically modified cellulose fine fibers prepared in Production Examples 1 to 12 and Production Comparative Examples 1 to 7 were each subjected to dispersion treatment in hexafluoroisopropanol (HFIP) using a homogenizer (ULTRA-TURRAX T18 by IKA) at 12,000 rpm for 3 minutes, to a solid concentration of 1 vol %.

2. A solution of polyamide 6 (1013B by Ube Industries, Ltd.) dissolved in HFIP to a solid content of 1 mass % was prepared.

3. The products of 1. and 2. were placed in a container with the chemically modified cellulose fine fibers and polyamide 6 at a solid mass ratio of 1:9, and were mixed using a rotary intersect mixer (Awatori Rentaro ARE-310 by Thinky, Inc.) at 2,000 rpm for 5 minutes.

4. The liquid mixture obtained in 3. was cast onto a release film (X88B by Mitsui Chemicals Tohcello, Inc.) and dried for 1 hour in an oven at 80° C.

5. The cast mixture of 4. was crushed with a tabletop crusher (Mini Speed Mill MS-05 by LaboNext).

6. The powder of 5. was dried for 24 hours or longer in a vacuum dryer.

7. The dried powder of 6. was kneaded for 2 minutes with a mini kneader (Xplore MC 15HT by DSM) at a temperature of 250° C. and a rotational speed of 200 rpm.

8. After kneading was complete, the resin was poured into an injection molding machine (Xplore IM12) to fabricate both a test strip for a bending test, having a width of 10 mm, a length of 80 mm and a thickness of 4 mm, and a multipurpose test piece (as a fiber-reinforced resin) for tensile testing, conforming to ISO-37.

The evaluation results for the bending and tensile tests using the obtained test pieces are shown in Table 3.

Resin Compositing-1 by Nonwoven Fabric Method: Examples I-13 to I-24 and Comparative Examples I-8 to I-14

Polypropylene staple fibers (cut length: 2.0 mm, fineness: 0.2 T) and the chemically modified cellulose fine fibers produced as described above were added to purified water in a solid mass ratio of 80:20, to obtain a slurry with a solid concentration of 0.5 mass %. The slurry was stirred for 4 minutes with a household mixer to prepare a papermaking slurry. The prepared papermaking slurry was loaded into a batch paper machine (automatic square sheet machine by Kumagai Riki Kogyo Co., Ltd., 25 cm×25 cm, 80 mesh) in which a filter cloth (TT35 by Shikishima Canvas Co., Ltd.) was set, to a basis weight of 300 g/m$^2$, after which papermaking (dewatering) was carried out with pressure reduction of 50 kPa relative to atmospheric pressure.

The wet web comprising the wet concentrated composition set on the obtained filter cloth was detached from the wire and pressed for 1 minute at a pressure of 1 kg/cm$^2$. It was then dried for about 120 seconds in a drum dryer set to a surface temperature of 130° C., to obtain a nonwoven fabric. Four 10 cm-square nonwoven fabrics were cut out from the obtained nonwoven fabric, layered together and sandwiched by PET films with a thickness of 0.1 μm. A hot press machine was then used for hot molding for 5 minutes at a temperature of 200° C. and a molding pressure of 10 kg/cm$^2$. The thickness of the molded article was controlled by providing a 1.5 mm stainless steel spacer between the PET films. After heating with the hot press machine was complete, the entire pressing machine was cooled with a blower for about 30 minutes while maintaining pressure. When the temperature of the pressing machine fellow below 90° C., the pressure was released to obtain a fiber-reinforced resin molded into a laminar form. Table 4 shows the results of evaluating the obtained fiber-reinforced resins by the bending test described above.

Resin Compositing-2 by Nonwoven Fabric Method: Examples I-25 to I-36 and Comparative Examples I-15 to I-21

Polyamide 66 staple fibers (cut length: 2.0 mm, fineness: 0.6 T) and the chemically modified cellulose fine fibers produced as described above were added to purified water in a solid mass ratio of 80:20, to obtain a slurry with a solid concentration of 0.5 mass %. The slurry was stirred for 4 minutes with a household mixer to prepare a papermaking slurry. The prepared papermaking slurry was loaded into a batch paper machine (automatic square sheet machine by Kumagai Riki Kogyo Co., Ltd., 25 cm×25 cm, 80 mesh) in which a filter cloth (TT35 by Shikishima Canvas Co., Ltd.) was set, to a basis weight of 300 g/m², after which papermaking (dewatering) was carried out with pressure reduction of 50 kPa relative to atmospheric pressure.

The wet web comprising the wet concentrated composition set on the obtained filter cloth was detached from the wire and pressed for 1 minute at a pressure of 1 kg/cm². It was then dried for about 120 seconds in a drum dryer set to a surface temperature of 130° C., to obtain a nonwoven fabric. Four 10 cm-square nonwoven fabrics were cut out from the obtained nonwoven fabric, layered together and sandwiched by TEFLON™ sheets with a thickness of 0.1 μm. A hot press machine was then used for hot molding for 5 minutes at a temperature of 300° C. and a molding pressure of 10 kg/cm². The thickness of the molded article was controlled by providing a 1.5 mm stainless steel spacer between the PET films. After heating with the hot press machine was complete, the entire pressing machine was cooled with a blower for about 30 minutes while maintaining pressure. When the temperature of the pressing machine fellow below 90° C., the pressure was released to obtain a fiber-reinforced resin molded into a laminar form. Table 5 shows the results of evaluating the obtained fiber-reinforced resins by the bending test described above.

[Table 1]

TABLE 1

Example I-Production conditions and evaluation results for cellulose fine fibers

| | Production Example | — | Prod. Ex. 1 | Prod. Ex. 2 | Prod. Ex. 3 | Prod. Ex. 4 | Prod. Ex. 5 | Prod. Ex. 6 |
|---|---|---|---|---|---|---|---|---|
| Production conditions | Pulp used | — | A | A | B | A | A | D |
| Disc blade A | Disc blade width | mm | 4.0 | 2.5 | 2.5 | 2.5 | 2.5 | 2.5 |
| | Disc blade/groove ratio | — | 0.89 | 0.36 | 0.36 | 0.36 | 0.36 | 0.36 |
| | Final interblade distance | mm | 0.25 | 0.20 | 0.20 | 0.20 | 0.15 | 0.05 |
| | Number of passes | times | 30 | 50 | 50 | 30 | 100 | 75 |
| Disc blade B | Disc blade width | mm | 0.8 | 0.6 | 0.8 | 0.6 | 0.8 | 0.8 |
| | Disc blade/groove ratio | — | 0.53 | 0.60 | 0.53 | 0.60 | 0.53 | 0.53 |
| | Final interblade distance | mm | 0.25 | 0.10 | 0.20 | 0.20 | 0.15 | 0.05 |
| | Number of passes | times | 30 | 100 | 50 | 30 | 50 | 40 |
| High-pressure homogenizer | Number of passes | times | 3 | — | 5 | 10 | 10 | 10 |
| Evaluation results | Glucose concentration in constituent sugar analysis of cellulose fine fibers | % | 92 | 94 | 91 | 94 | 93 | 91 |
| | Degree of crystallinity of cellulose fine fibers | % | 82 | 83 | 83 | 84 | 84 | 88 |
| Chemical modification | Substituent | — | Acetyl | Acetyl | Acetyl | Acetyl | Acetyl | Acetyl |
| | DS | — | 1.10 | 0.98 | 1.05 | 0.80 | 0.84 | 0.55 |
| Evaluation results for cellulose fine fibers | Number frequency of fibers with fiber lengths of 411 μm or greater for normal fibers | % | 52% | 39% | 31% | 2.6% | 5.4% | 1.8% |
| | Length-weighted average fiber length for normal fibers | μm | 497 | 396 | 347 | 186 | 218 | 181 |
| | Mean fiber length for normal fibers | μm | 379 | 244 | 226 | 152 | 176 | 147 |
| | Mean fiber size | μm | 42.3 | 41.3 | 38.8 | 23.4 | 36.6 | 19.2 |
| | Mean fiber size in terms of specific surface area | nm | 80 | 45 | 57 | 57 | 47 | 58 |
| | Fine fiber area ratio | % | 10.4% | 12% | 14.2% | 45% | 15.6% | 58% |
| | Number frequency of fibers of 20 to 56 μm among fine fibers | % | 96.8% | 94.7% | 92.0% | 70.8% | 72.8% | 75.9% |
| | Fibrillation rate | % | 0.8% | 1.1% | 1.8% | 2.0% | 1.6% | 1.3% |
| | Occupied area ratio of ultrafine fibers in SEM photograph | % | 15% | 23% | 38% | 54% | 67% | 65% |
| | Halogen content of cellulose starting material | ppm | 247 | 235 | 45 | 243 | 240 | 236 |
| | Whiteness of cellulose starting material | % | 81 | 82 | 96 | 81 | 83 | 83 |
| | Halogen content of cellulose fine fibers | ppm | 42 | 46 | 10 | 48 | 43 | 38 |

| | Example I-Production conditions and evaluation results for cellulose fine fibers | | | | | | | |
|---|---|---|---|---|---|---|---|---|
| | Production Example | — | Prod. Ex. 7 | Prod. Ex. 8 | Prod. Ex. 9 | Prod. Ex. 10 | Prod. Ex. 11 | Prod. Ex. 12 |
| Production conditions | Pulp used | — | E | A | A | A | E | B |
| Disc blade A | Disc blade width | mm | 0.8 | 2.5 | 2.5 | 2.5 | 0.8 | 2.5 |
| | Disc blade/groove ratio | — | 0.53 | 0.36 | 0.36 | 0.36 | 0.53 | 0.36 |
| | Final interblade distance | mm | 0.15 | 0.15 | 0.15 | 0.05 | 0.10 | 0.15 |
| | Number of passes | times | 50 | 100 | 100 | 10 | 40 | 70 |
| Disc blade B | Disc blade width | mm | — | 0.8 | 0.8 | 0.8 | — | 0.6 |
| | Disc blade/groove ratio | — | — | 0.53 | 0.53 | 0.53 | — | 0.60 |
| | Final interblade distance | mm | — | 0.15 | 0.15 | 0.05 | — | 0.15 |
| | Number of passes | times | — | 50 | 50 | 10 | — | 40 |

TABLE 1-continued

|  |  |  | | | | | | | |
|---|---|---|---|---|---|---|---|---|---|
|  | High-pressure homogenizer | Number of passes | times | 10 | 3 | 5 | 10 | 10 | 10 |
| Evaluation results | | Glucose concentration in constituent sugar analysis of cellulose fine fibers | % | 92 | 91 | 93 | 93 | 90 | 92 |
|  |  | Degree of crystallinity of cellulose fine fibers | % | 86 | 87 | 85 | 85 | 88 | 86 |
|  | Chemical modification | Substituent | — | Acetyl | Acetyl | Acetyl | Acetyl | Acetyl | Phthalic acid |
|  |  | DS | — | 0.73 | 0.73 | 0.82 | 0.84 | 0.61 | 0.89 |
|  | Evaluation results for cellulose fine fibers | Number frequency of fibers with fiber lengths of 411 μm or greater for normal fibers | % | 5.1% | 16.8% | 3.5% | 1.7% | 0.5% | 5.9% |
|  |  | Length-weighted average fiber length for normal fibers | μm | 207 | 272 | 197 | 166 | 164 | 253 |
|  |  | Mean fiber length for normal fibers | μm | 170 | 191 | 153 | 139 | 143 | 188 |
|  |  | Mean fiber size | μm | 21.4 | 21.7 | 27.2 | 40.7 | 23.8 | 35.2 |
|  |  | Mean fiber size in terms of specific surface area | nm | 49 | 57 | 50 | 47 | 59 | 47 |
|  |  | Fine fiber area ratio | % | 57% | 26% | 47% | 66% | 54.6% | 13.9% |
|  |  | Number frequency of fibers of 20 to 56 μm among fine fibers | % | 79.6% | 75.0% | 76.9% | 82.8% | 78.7% | 74.8% |
|  |  | Fibrillation rate | % | 1.5% | 1.7% | 1.6% | 3.0% | 2.4% | 1.2% |
|  |  | Occupied area ratio of ultrafine fibers in SEM photograph | % | 51% | 38% | 45% | 68% | 63% | 59% |
|  |  | Halogen content of cellulose starting material | ppm | 48 | 241 | 238 | 244 | 46 | 41 |
|  |  | Whiteness of cellulose starting material | % | 95 | 82 | 85 | 83 | 94 | 94 |
|  |  | Halogen content of cellulose fine fibers | ppm | 12 | 41 | 37 | 42 | 12 | 8 |

[Table 2]

TABLE 2

Example I-Production conditions and evaluation results for cellulose fine fibers

|  |  | Production Example | — | Prod. Comp. Ex. 1 | Prod. Comp. Ex. 2 | Prod. Comp. Ex. 3 | Prod. Comp. Ex. 4 | Prod. Comp. Ex. 5 | Prod. Comp. Ex. 6 | Prod. Comp. Ex. 7 |
|---|---|---|---|---|---|---|---|---|---|---|
| Production conditions |  | Pulp used | — | A | B | C | A | C | A | A |
|  | Disc blade A | Disc blade width | mm | 2.5 | 2.5 | 2.5 | 4.0 | 2.5 | 2.5 | 2.5 |
|  |  | Disc blade/groove ratio | — | 0.36 | 0.36 | 0.36 | 0.89 | 0.36 | 0.36 | 0.36 |
|  |  | Final interblade distance | mm | 0.30 | 0.05 | 0.35 | 0.40 | 0.05 | 0.03 | 0.20 |
|  |  | Number of passes | times | 20 | 120 | 40 | 5 | 50 | 120 | 50 |
|  | Disc blade B | Disc blade width | mm | 0.8 | 0.6 | — | — | 0.8 | 0.8 | 0.8 |
|  |  | Disc blade/groove ratio | — | 0.53 | 0.60 | — | — | 0.53 | 0.53 | 0.53 |
|  |  | Final interblade distance | mm | 0.35 | 0.03 | — | — | 0.03 | 0.03 | 0.10 |
|  |  | Number of passes | times | 50 | 100 | — | — | 50 | 60 | 100 |
|  | High-pressure homogenizer | Number of passes | times | 1 | — | 2 | — | 20 | 15 | 5 |
| Evaluation results |  | Glucose concentration in constituent sugar analysis of cellulose fine fibers | % | 93 | 91 | 77 | 92 | 81 | 92 | 93 |
|  |  | Degree of crystallinity of cellulose fine fibers | % | 77 | 88 | 65 | 83 | 68 | 84 | 84 |
|  | Chemical modification | Substituent | — | Acetyl | Acetyl | Acetyl | Acetyl | Acetyl | Acetyl | Acetyl |
|  |  | DS | — | 1.50 | 0.45 | 0.75 | 0.90 | 0.87 | 0.95 | 0.82 |
|  | Evaluation results for cellulose fine fibers | Number frequency of fibers with fiber lengths of 411 μm or greater among normal fibers | % | 42% | 0.2% | 55% | 73% | 1.5% | 0.7% | 56% |
|  |  | Length-weighted average fiber length for normal fibers | μm | 525 | 108 | 488 | 1,580 | 105 | 104 | 184 |
|  |  | Mean fiber length for normal fibers | μm | 291 | 101 | 269 | 643 | 105 | 104 | 154 |
|  |  | Mean fiber size | μm | 43.4 | 48.2 | 30.2 | 19.5 | 18.9 | 47.0 | 42.9 |
|  |  | Mean fiber size in terms of specific surface area | nm | 168 | 29 | 536 | 1,165 | 19 | 18 | 19 |
|  |  | Fine fiber area ratio | % | 9.4% | 98.1% | 5% | 2% | 71% | 58% | 40.0% |
|  |  | Number frequency of fibers of 20 to 56 μm among fine fibers | % | 34.0% | 98.5% | 77.0% | 45.0% | 49.0% | 97.1% | 28.0% |
|  |  | Fibrillation rate | % | 5.5% | 0.6% | 2.7% | 3.1% | 10.1% | 2.9% | 3.2% |
|  |  | Occupied area ratio of ultrafine fibers in SEM photograph | % | 8% | 84% | 15% | 5% | 71% | 87% | 48% |
|  |  | Halogen content of cellulose starting material | ppm | 269 | 49 | 312 | 280 | 351 | 260 | 259 |
|  |  | Whiteness of cellulose starting material | % | 80 | 94 | 85 | 82 | 88 | 78 | 76 |
|  |  | Halogen content of cellulose fine fibers | ppm | 262 | 13 | 304 | 250 | 332 | 252 | 253 |

[Table 3]

TABLE 3

| Example I-Evaluation results for injection molding composite | | Example I-1 | Example I-2 | Example I-3 | Example I-4 | Example I-5 | Example I-6 | Example I-7 | Example I-8 | Example I-9 | Example I-10 |
|---|---|---|---|---|---|---|---|---|---|---|---|
| Composite outer appearance | — | Good | Good | Good | Good | Good | Good | Good | Good | Good | Good |
| Flexural strength | MPa | 118 | 122 | 123 | 135 | 127 | 117 | 127 | 121 | 127 | 123 |
| Flexural modulus | GPa | 5.1 | 5.6 | 6.3 | 6.4 | 6.6 | 5.2 | 6.1 | 5.9 | 6.3 | 5.3 |
| Tensile strength | MPa | 127 | 128 | 121 | 135 | 112 | 119 | 127 | 121 | 114 | 123 |
| Tensile modulus | GPa | 4.1 | 4.4 | 5.1 | 6.1 | 6.0 | 4.9 | 4.7 | 4.7 | 5.6 | 4.0 |
| Fracture strain | % | 7.1% | 7.1% | 4.8% | 5.9% | 5.4% | 6.4% | 5.6% | 5.6% | 5.9% | 5.7% |
| Resin recycling property | — | Good | Good | Good | Good | Good | Good | Good | Good | Good | Good |

| Example I-Evaluation results for injection molding composite | | Example I-11 | Example I-12 | Comp. Ex. I-1 | Comp. Ex. I-2 | Comp. Ex. I-3 | Comp. Ex. I-4 | Comp. Ex. I-5 | Comp. Ex. I-6 | Comp. Ex. I-7 |
|---|---|---|---|---|---|---|---|---|---|---|
| Composite outer appearance | — | Good | Good | Good | Fair | Poor | Good | Poor | Good | Good |
| Flexural strength | MPa | 124 | 115 | 104 | 117 | 116 | 98 | 123 | 112 | 115 |
| Flexural modulus | GPa | 5.2 | 6.1 | 4.8 | 4.1 | 4.9 | 4.2 | 4.2 | 4.9 | 5.0 |
| Tensile strength | MPa | 116 | 116 | 110 | 108 | 106 | 98 | 97 | 102 | 101 |
| Tensile modulus | GPa | 4.1 | 5.8 | 3.8 | 4.3 | 5.1 | 4.5 | 4.3 | 4.1 | 3.9 |
| Fracture strain | % | 7.2% | 5.1% | 5.7% | 10.2% | 3.4% | 4.3% | 3.1% | 5.3% | 3.80% |
| Resin recycling property | — | Good | Good | Poor | Good | Poor | Poor | Poor | Poor | Poor |

[Table 4]

TABLE 4

| Example I-Evaluation results of composite by nonwoven fabric method-1 | | Example I-13 | Example I-14 | Example I-15 | Example I-16 | Example I-17 | Example I-18 | Example I-19 | Example I-20 | Example I-21 | Example I-22 |
|---|---|---|---|---|---|---|---|---|---|---|---|
| Synthetic fiber type | — | PP | PP | PP | PP | PP | PP | PP | PP | PP | PP |
| Chemically modified cellulose fine fibers used | — | Prod. Ex. 1 | Prod. Ex. 2 | Prod. Ex. 3 | Prod. Ex. 4 | Prod. Ex. 5 | Prod. Ex. 6 | Prod. Ex. 7 | Prod. Ex. 8 | Prod. Ex. 9 | Prod. Ex. 10 |
| Flexural strength | MPa | 65 | 64 | 63 | 65 | 65 | 63 | 65 | 71 | 65 | 55 |
| Flexural modulus | GPa | 3.5 | 3.6 | 3.7 | 4.2 | 4.2 | 4.1 | 4.0 | 4.4 | 4.1 | 3.5 |
| Bending strain | % | 5.7 | 5.4 | 5.1 | 4.2 | 4.2 | 4.0 | 4.7 | 5.2 | 4.7 | 3.5 |
| Resin thermal stability | — | Good | Good | Good | Good | Good | Good | Good | Good | Good | Good |

| Example I-Evaluation results of composite by nonwoven fabric method-1 | | Example I-23 | Example I-24 | Comp. Ex. I-8 | Comp. Ex. I-9 | Comp. Ex. I-10 | Comp. Ex. I-11 | Comp. Ex. I-12 | Comp. Ex. I-13 | Comp. Ex. I-14 |
|---|---|---|---|---|---|---|---|---|---|---|
| Synthetic fiber type | — | PP | PP | PP | PP | PP | PP | PP | PP | PP |
| Chemically modified cellulose fine fibers used | — | Prod. Ex. 11 | Prod. Ex. 12 | Prod. Comp. Ex. 1 | Prod. Comp. Ex. 2 | Prod. Comp. Ex. 3 | Prod. Comp. Ex. 4 | Prod. Comp. Ex. 5 | Prod. Comp. Ex. 6 | Prod. Comp. Ex. 7 |
| Flexural strength | MPa | 65 | 64 | 51 | 49 | 52 | 53 | 41 | 47 | 40 |
| Flexural modulus | GPa | 4.2 | 4.1 | 3.4 | 3.5 | 3.2 | 3.5 | 3.2 | 3.5 | 2.8 |
| Bending strain | % | 4.1 | 4.1 | 4.1 | 3.8 | 4.7 | 4.6 | 2.2 | 3.4 | 3.0 |

TABLE 4-continued

| | | | | | | | | | |
|---|---|---|---|---|---|---|---|---|---|
| Resin thermal stability | — | Good | Good | Good | Fair | Poor | Good | Poor | Good | Good |

[Table 5]

TABLE 5

Example I-Evaluation results of composite by nonwoven fabric method-2

| | | Example I-25 | Example I-26 | Example I-27 | Example I-28 | Example I-29 | Example I-30 | Example I-31 | Example I-32 | Example I-33 | Example I-34 |
|---|---|---|---|---|---|---|---|---|---|---|---|
| Synthetic fiber type | — | PA66 | PA66 | PA66 | PA66 | PA66 | PA66 | PA66 | PA66 | PA66 | PA66 |
| Chemically modified cellulose fine fibers used | — | Prod. Ex. 1 | Prod. Ex. 2 | Prod. Ex. 3 | Prod. Ex. 4 | Prod. Ex. 5 | Prod. Ex. 6 | Prod. Ex. 7 | Prod. Ex. 8 | Prod. Ex. 9 | Prod. Ex. 10 |
| Flexural strength | MPa | 176 | 186 | 186 | 203 | 189 | 178 | 191 | 181 | 189 | 186 |
| Flexural modulus | GPa | 7.7 | 8.3 | 9.1 | 9.5 | 9.8 | 7.6 | 8.9 | 8.8 | 9.3 | 7.9 |
| Bending strain | % | 7.8% | 7.1% | 5.0% | 6.5% | 5.4% | 6.7% | 6.2% | 5.6% | 6.2% | 6.2% |
| Resin thermal stability | — | Good | Good | Good | Good | Good | Good | Good | Fair | Good | Good |

Example I-Evaluation results of composite by nonwoven fabric method-2

| | | Example I-35 | Example I-36 | Comp. Ex. I-15 | Comp. Ex. I-16 | Comp. Ex. I-17 | Comp. Ex. I-18 | Comp. Ex. I-19 | Comp. Ex. I-20 | Comp. Ex. I-21 |
|---|---|---|---|---|---|---|---|---|---|---|
| Synthetic fiber type | — | PA66 | PA66 | PA66 | PA66 | PA66 | PA66 | PA66 | PA66 | PA66 |
| Chemically modified cellulose fine fibers used | — | Prod. Ex. 11 | Prod. Ex. 12 | Prod. Comp. Ex. 1 | Prod. Comp. Ex. 2 | Prod. Comp. Ex. 3 | Prod. Comp. Ex. 4 | Prod. Comp. Ex. 5 | Prod. Comp. Ex. 6 | Prod. Comp. Ex. 7 |
| Flexural strength | MPa | 187 | 173 | 154 | 177 | 93 | 147 | 97 | 170 | 174 |
| Flexural modulus | GPa | 7.5 | 9.1 | 7.1 | 6.1 | 3.4 | 6.3 | 3.0 | 7.3 | 7.3 |
| Bending strain | % | 7.2% | 5.4% | 6.3% | 10.2% | 1.5% | 4.7% | 1.1% | 5.5% | 3.8% |
| Resin thermal stability | — | Fair | Good | Poor | Fair | Poor | Poor | Poor | Poor | Poor |

Example II

<Measuring Methods>
[Measurement with Fiber Shape Autoanalyzer]

The properties of the cellulose fine fibers were evaluated by the following procedure using an automatic fiber shape analyzer (Morfi Neo by Technidyne).

1. The cellulose fine fibers were dispersed in purified water to prepare a 1 L aqueous dispersion. The final solid concentration was adjusted to about 0.004 mass %. All of the cellulose fine fibers were in aqueous dispersion with a solid concentration of 2 mass % or lower, and the dispersion treatment was carried out by mixing in a sealed container with a fill factor of 75 vol % or lower.
2. The aqueous dispersion prepared in 1. was supplied to an autosampler for measurement.
3. The measurement results were outputted to a txt (or csv) file.
4. The same shape parameters as in Example I were extracted or calculated based on the measurement results.

[Specific Surface Area, and Mean Fiber Size Converted from Specific Surface Area]

Measurement was conducted in the same manner as Example I.

[Measurement of Rheological Properties of Cellulose Fine Fibers]

The rheological properties of the cellulose fine fiber aqueous dispersions were measured by the following procedure, and the reciprocal of the yield strain ($1/\gamma$) was calculated. The measuring instrument and measuring conditions used were set as follows.

(Measuring Conditions)
Measuring instrument: Rheometer, HAAKE MERS (Thermo Fisher Scientific
Measuring jig: Coaxial double cylinder (cup: CCB25 DIN, rotor: CC25 DIN Ti)
Measuring mode: Oscillation
Control method: Stress control
Control range: 0.01-100 Pa
Temperature: 25° C.

1. The cellulose fine fibers were dispersed in purified water. The final solid concentration of the cellulose fine fibers was 0.75 mass %. All of the cellulose fine fibers were in aqueous dispersion with a solid concentration of 2 mass % or lower, and the dispersion treatment was carried out by mixing in a sealed container with a fill factor of 75 vol % or lower.

2. The aqueous dispersion prepared in 1. was allowed to stand at 25° C. for 24 hours or longer.

3. The jig was attached to a rheometer and a dropper was used to introduce the aqueous dispersion of the cellulose fine fibers at 17.0±1.0 g.

4. Measurement was conducted, and LVE analysis was used to calculate the yield strain ($\gamma$), from which the reciprocal ($1/\gamma$) was calculated.

[Whiteness Measurement]

Measurement was conducted in the same manner as Example I.

[Measurement of Halogen Content in Cellulose Starting Material or Cellulose Fine Fibers]

Measurement was conducted in the same manner as Example I.

[Tensile Test]

A multipurpose test piece conforming to ISO-37 was fabricated by the following method, and subjected to a tensile test under conditions conforming to JIS K6920-2, for measurement of the tensile strength, tensile modulus and fracture strain.

[Dynamic Viscoelasticity Measurement]

A multipurpose test piece conforming to ISO-37 was fabricated by the following method and used in DMA measurement under the following conditions, to determine the storage modulus at 150° C.

Apparatus: EPLEXOR 500N by Gabo Co.
   Measuring mode: tension
   Measuring temperature range: −130 to 200° C.
   Temperature-elevating rate: 3° C./min
   Static load strain: 0.5%
   Dynamic load strain: 0.3%
   Oscillation frequency: 10 Hz
   Contact load: 1 N

[Bending Test]

A strip with a width of 25 mm and a length of 50 mm was cut out from a laminar composite obtained by a nonwoven fabric method and its bending strength, flexural modulus and bending fracture strain were measured under conditions conforming to JIS K7171.

[Resin Thermal Stability]

Measurement was conducted in the same manner as Example I.

<Preparation of Cellulose Fine Fibers>

(Cellulose Fine Fibers A)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (first stage) equipped with a disc having a 2.5 mm blade width, a 7.0 mm groove width and a blade/groove ratio of 0.36, connected to the tank. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 10 times. The slurry was then micronized while circulating with a single disc refiner (second stage) equipped with a disc having a 0.6 mm blade width, a 1.0 mm groove width and a blade/groove ratio of 0.6. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 10 times. The obtained cellulose fine fibers were used as cellulose fine fibers A (MFC-A). Table 6 shows the analysis results for the fiber shape parameters and rheological properties.

(Cellulose Fine Fibers B)

Cellulose fine fibers B (MFC-B) were obtained by the same method as cellulose fine fibers A, except that the number of passes with the single disc refiner (second stage) was 30. Table 6 shows the analysis results for the fiber shape parameters and rheological properties.

(Cellulose Fine Fibers C)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (first stage) equipped with a disc having a 2.5 mm blade width, a 7.0 mm groove width and a blade/groove ratio of 0.36, connected to the tank. Operation was initiated with an interblade distance of 1.0 mm, gradually narrowing the interblade distance to a final interblade distance of 0.3 mm. After the interblade distance reached 0.3 mm, operation was continued while confirming the flow rate, and operation was stopped when the total amount of slurry had passed through the disc section 90 times. The slurry was then micronized while circulating with a single disc refiner (second stage) equipped with a disc having a 0.8 mm blade width, a 1.5 mm groove width and a blade/groove ratio of 0.53. Operation was initiated with an interblade distance of 1.0 mm, gradually narrowing the interblade distance to a final interblade distance of 0.15 mm. After the interblade distance reached 0.15 mm, operation was continued while confirming the flow rate, and operation was stopped when the total amount of slurry had passed through the disc section 40 times. The obtained cellulose fine fibers were used as cellulose fine fibers C (MFC-C). Table 6 shows the analysis results for the fiber shape parameters and rheological properties.

(Cellulose Fine Fibers D)

Cellulose fine fibers C were processed by 10 passes of micronization treatment at an operating pressure of 100 MPa using a high-pressure homogenizer (NS015H by Niro Soavi), and the obtained cellulose fine fibers were used as cellulose fine fibers D (MFC-D). Table 6 shows the analysis results for the fiber shape parameters and rheological properties.

(Cellulose Fine Fibers E)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (first stage) equipped with a disc having a 2.5 mm blade width, a 7.0 mm groove width and a blade/groove ratio of 0.36, connected to the tank. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 90 times. The slurry was then micronized while circulating with a single disc refiner (second stage) equipped with a disc having a 0.8 mm blade width, a 1.5 mm groove width and a blade/groove ratio of 0.53. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 90 times. The obtained cellulose fine fibers were used as cellulose fine fibers E (MFC-E). Table 6 shows the analysis results for the fiber shape parameters and rheological properties.

(Cellulose Fine Fibers F)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (one unit) equipped with a disc having a 2.5 mm blade width, a 7.0 mm groove width and a blade/groove ratio of 0.36, connected to the tank. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 150 times. The obtained cellulose fine fibers were used as microfibrillated cellulose F (MFC-F). Table 6 shows the analysis results for the fiber shape parameters and rheological properties.

(Cellulose Fine Fibers G)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (first stage) equipped with a disc having a 2.5 mm blade width, a 7.0 mm groove width and a blade/groove ratio of 0.36, connected to the tank. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 10 times. The slurry was then micronized while circulating with a single disc refiner (second stage) equipped with a disc having a 0.6 mm blade width, a 1.0 mm groove width and a blade/groove ratio of 0.6. Operation was initiated with an interblade distance of 1.0 mm, gradually narrowing the interblade distance to a final interblade distance of 0.05 mm. Operation was stopped immediately after reaching an interblade distance of 0.05 mm (representing the number of passes through the disc section as 0 for convenience), and the obtained cellulose fine fibers were used as cellulose fine fibers G (MFC-G). Table 6 shows the analysis results for the fiber shape parameters and rheological properties.

(Cellulose Fine Fibers H)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (one unit) equipped with a disc having a 0.8 mm blade width, a 1.5 mm groove width and a blade/groove ratio of 0.53, connected to the tank. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 90 times. The obtained cellulose fine fibers were used as cellulose fine fibers H (MFC-H). Table 6 shows the analysis results for the fiber shape parameters and rheological properties.

(Cellulose Fine Fibers I)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (first stage) equipped with a disc having a 4.0 mm blade width, a 4.5 mm groove width and a blade/groove ratio of 0.89, connected to the tank. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 30 times. The slurry was then micronized while circulating with a single disc refiner (second stage) equipped with a disc having a 0.8 mm blade width, a 1.5 mm groove width and a blade/groove ratio of 0.53. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 30 times. The obtained cellulose fine fibers were used as cellulose fine fibers I (MFC-I). Table 6 shows the analysis results for the fiber shape parameters and rheological properties.

(Cellulose Fine Fibers J)

Cellulose fine fibers J (MFC-J) were obtained by the same method as cellulose fine fibers A (MFC-A), except that the number of passes with the single disc refiner (second stage) was 180. Table 6 shows the analysis results for the fiber shape parameters and rheological properties.

(Cellulose Fine Fibers K)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (one unit) equipped with a disc having a 4 mm blade width, a 4.5 mm groove width and a blade/groove ratio of 0.89, connected to the tank. Operation was initiated with an interblade distance of 1.0 mm, gradually narrowing the interblade distance to a final interblade distance of 0.05 mm. After the interblade distance reached 0.05 mm, operation was continued while confirming the flow rate, and operation was stopped when the total amount of slurry had passed through the disc section 250 times. Micronization treatment was then carried out for 10 passes at an operating pressure of 100 MPa using a high-pressure homogenizer (NS015H by Niro Soavi), and the obtained cellulose fine fibers were used as cellulose fine fibers K (MFC-K). Table 6 shows the analysis results for the fiber shape parameters and rheological properties.

(Cellulose Fine Fibers L)

Linter pulp, as natural cellulose acquired from Japan Pulp and Paper Co., was immersed in water to 1.5 mass %, and a Labo Pulper (Aikawa Iron Works Co.) was used for simple dispersion, followed by delivery to a tank. The slurry was micronized while circulating with a single disc refiner (one unit) equipped with a disc having a 2.5 mm blade width, a 7.0 mm groove width and a blade/groove ratio of 0.36, connected to the tank. Operation was initiated with an interblade distance of 1.0 mm, gradually narrowing the interblade distance to a final interblade distance of 0.3 mm. After the interblade distance reached 0.3 mm, operation was continued while confirming the flow rate, and operation was stopped when the total amount of slurry had passed through the disc section 90 times. The obtained cellulose fine fibers were used as microfibrillated cellulose L (MFC-L). Table 6 shows the analysis results for the fiber shape parameters and rheological properties.

<Production of Fiber-Reinforced Resins>

Example II-1-1

A composite was fabricated by injection molding using MFC-A as the cellulose fine fibers, according to the following procedure.
1. The cellulose fine fibers were concentrated by suction filtration (filter medium: TT35 by Shikishima Canvas Co., Ltd.) to prepare a wet cake with a solid content of about 20 mass %.
2. The wet cake was dispersed in hexafluoroisopropanol (hereunder, "HFIP) for 3 minutes at 12,000 rpm using a homogenizer ("ULTRA-TURRAX T18", trade name of IKA) to a final concentration of 1 vol %.
3. A solution of polyamide 6 (1013B by Ube Industries, Ltd., melting point: 225° C.) in HFIP at 1 mass % was prepared.
4. The products of 2. and 3. were placed in the same container with the MFC-A and polyamide 6 at a solid mass ratio of 1:9, and were mixed using a rotating/revolving mixer (Awatori Rentaro ARE-310 by Thinky, Inc.) at 2,000 rpm for 5 minutes.
5. The mixture obtained in 4. was cast as a film onto a releasable film (X88B by Mitsui Chemicals Tohcello, Inc.) and dried for 1 hour in an oven at 80° C.
6. The cast film of 5. was crushed with a tabletop crusher (Mini Speed Mill MS-05 by LaboNext).
7. The powder of 6. was dried for 24 hours or longer in a vacuum dryer.
8. The dried powder of 7. was kneaded for 2 minutes with a mini kneader (Xplore MC 15HT by DSM) at a temperature of 250° C. and a rotational speed of 200 rpm.
9. After completion of kneading, the kneaded product was poured into an injection molding machine (Xplore IM12) and a multipurpose test piece conforming to ISO-37 was fabricated as composite 1-A.

The composite 1-A was measured by the tensile test and dynamic viscoelasticity described above, with the evaluation results shown in Table 6.

Example II-1-2

Composite 1-B was obtained by fabricating a composite by the same method as Example II-1-1, except that MFC-B was used as the cellulose fine fibers. The obtained composite 1-B was measured by the tensile test and dynamic viscoelasticity described above, with the evaluation results shown in Table 6.

Example II-1-3

Composite 1-C was obtained by fabricating a composite by the same method as Example II-1-1, except that MFC-C was used as the cellulose fine fibers. The obtained composite 1-C was measured by the tensile test and dynamic viscoelasticity described above, with the evaluation results shown in Table 6.

Example II-1-4

Composite 1-D was obtained by fabricating a composite by the same method as Example II-1-1, except that MFC-D was used as the cellulose fine fibers. The obtained composite 1-D was measured by the tensile test and dynamic viscoelasticity described above, with the evaluation results shown in Table 6.

Example II-1-5

Composite 1-E was obtained by fabricating a composite by the same method as Example II-1-1, except that MFC-E was used as the cellulose fine fibers. The obtained composite 1-E was measured by the tensile test and dynamic viscoelasticity described above, with the evaluation results shown in Table 6.

Example II-1-6

Composite 1-F was obtained by fabricating a composite by the same method as Example II-1-1, except that MFC-F was used as the cellulose fine fibers. The obtained composite 1-F was measured by the tensile test and dynamic viscoelasticity described above, with the evaluation results shown in Table 6.

Example II-1-7

Composite 1-G was obtained by fabricating a composite by the same method as Example II-1-1, except that MFC-G was used as the cellulose fine fibers. The obtained composite 1-G was measured by the tensile test and dynamic viscoelasticity described above, with the evaluation results shown in Table 6.

Example II-1-8

Composite 1-H was obtained by fabricating a composite by the same method as Example II-1-1, except that MFC-H was used as the cellulose fine fibers. The obtained composite 1-H was measured by the tensile test and dynamic viscoelasticity described above, with the evaluation results shown in Table 6.

Example II-1-9

Composite 1-I was obtained by fabricating a composite by the same method as Example II-1-1, except that MFC-I was used as the cellulose fine fibers. The obtained composite 1-I was measured by the tensile test and dynamic viscoelasticity described above, with the evaluation results shown in Table 6.

Comparative Example II-1-1

Composite 1-J was obtained by fabricating a composite by the same method as Example II-1-1, except that MFC-J was used as the cellulose fine fibers. The obtained composite 1-J was measured by the tensile test and dynamic viscoelasticity described above, with the evaluation results shown in Table 6.

Comparative Example II-1-2

Composite 1-K was obtained by fabricating a composite by the same method as Example II-1-1, except that MFC-K was used as the cellulose fine fibers. The obtained composite 1-K was measured by the tensile test and dynamic viscoelasticity described above, with the evaluation results shown in Table 6.

Comparative Example II-1-3

Composite 1-L was obtained by fabricating a composite by the same method as Example II-1-1, except that MFC-L was used as the cellulose fine fibers. The obtained composite 1-L was measured by the tensile test and dynamic viscoelasticity described above, with the evaluation results shown in Table 6.

Example II-2-1

Polypropylene staple fibers (cut length: 2.0 mm, fineness: 0.2 T, melting point: 160° C.) and MFC-A were added to purified water in a solid mass ratio of 80:20, to obtain a mixture with a final solid concentration of 0.5 mass %. The slurry was stirred for 4 minutes with a household mixer to prepare a papermaking slurry.

The prepared papermaking slurry was loaded into a batch paper machine (automatic square sheet machine by Kumagai Riki Kogyo Co., Ltd., 25 cm×25 cm, 80 mesh) in which a filter cloth (TT35 by Shikishima Canvas Co., Ltd.) was set, to a basis weight of 300 g/m², after which papermaking (dewatering) was carried out with pressure reduction of 50 KPa relative to atmospheric pressure.

The wet web comprising the wet concentrated composition set on the obtained filter cloth was detached from the wire and pressed for 1 minute at a pressure of 1 kg/cm². It was then dried for about 120 seconds in a drum dryer set to a surface temperature of 130° C., to obtain nonwoven fabric S1 as a wetlaid nonwoven fabric. Four 10 cm-square nonwoven fabrics were cut out from the obtained nonwoven fabric S1, layered together and sandwiched by PET films with a thickness of 0.1 μm. A hot press machine was then used for pressure molding for 5 minutes at a temperature of 200° C. and a molding pressure of 10 kg/cm². The thickness of the molded article was controlled by providing a 1.5 mm stainless steel spacer between the PET films. After heating with the hot press machine was complete, the entire pressing machine was cooled with a blower for about 30 minutes while maintaining pressure. When the temperature of the pressing machine fellow below 90° C., the pressure was released to obtain composite 2-A molded into a laminar form. The obtained composite 2-A was evaluated by the bending test described above, with the results shown in Table 7.

Example II-2-2

Composite 2-B was obtained by fabricating a composite by the same method as Example II-2-1, except that MFC-B was used as the cellulose fine fibers. The obtained composite 2-B was evaluated by the bending test described above, with the results shown in Table 7.

Example II-2-3

Composite 2-C was obtained by fabricating a composite by the same method as Example II-2-1, except that MFC-C was used as the cellulose fine fibers. The obtained composite 2-C was evaluated by the bending test described above, with the results shown in Table 7.

Example II-2-4

Composite 2-D was obtained by fabricating a composite by the same method as Example II-2-1, except that MFC-D was used as the cellulose fine fibers. The obtained composite 2-D was evaluated by the bending test described above, with the results shown in Table 7.

Example II-2-5

Composite 2-E was obtained by fabricating a composite by the same method as Example II-2-1, except that MFC-E was used as the cellulose fine fibers. The obtained composite 2-E was evaluated by the bending test described above, with the results shown in Table 7.

Example II-2-6

Composite 2-F was obtained by fabricating a composite by the same method as Example II-2-1, except that MFC-F was used as the cellulose fine fibers. The obtained composite 2-F was evaluated by the bending test described above, with the results shown in Table 7.

Example II-2-7

Composite 2-G was obtained by fabricating a composite by the same method as Example II-2-1, except that MFC-G was used as the cellulose fine fibers. The obtained composite 2-G was evaluated by the bending test described above, with the results shown in Table 7.

Example II-2-8

Composite 2-H was obtained by fabricating a composite by the same method as Example II-2-1, except that MFC-H was used as the cellulose fine fibers. The obtained composite 2-H was evaluated by the bending test described above, with the results shown in Table 7.

Example II-2-9

Composite 2-I was obtained by fabricating a composite by the same method as Example II-2-1, except that MFC-I was used as the cellulose fine fibers. The obtained composite 2-I was evaluated by the bending test described above, with the results shown in Table 7.

Example II-2-10

A composite was fabricated by injection molding using MFC-A as the cellulose fine fibers, according to the following procedure.

1. Polypropylene staple fibers (cut length: 2.0 mm, fineness: 0.2 T, melting point: 160° C.) were placed on a releasable film (X88B by Mitsui Chemicals Tohcello, Inc.), and heated to melting in an oven at 200° C.

2. After cooling the melt in 1. to solidification, it was crushed with a tabletop crusher (Mini speed mill MS-05 by LaboNext).

3. After loading cellulose fine fibers and a rosin-ethylene oxide addition product (rosin-polyethylene glycol ester by Harima Chemicals, Inc.) into a closed planetary mixer ("ACM-5LVT", trade name of Kodaira Seisakusho Co., Ltd., hook-type stirring blade) to a cellulose fine fiber/rosin-ethylene oxide addition product mass ratio of 80/20, the mixture was stirred for 60 minutes at 70 rpm, ordinary temperature and pressure and reduced in pressure (−0.1 MPa), set in a warm bath at 40° C. and then coated at 307 rpm for 2 hours and dried under reduced pressure to obtain powdered cellulose fine fiber formulation A.

4. The powder obtained from 2. and 3. was added for a cellulose fine fiber/polypropylene mass ratio of 20:80, and the mixture was kneaded for 5 minutes with a mini kneader (Xplore MC 15HT by DSM) at a temperature of 200° C. and a rotational speed of 200 rpm.

5. After completion of kneading, the kneaded product was poured into an injection molding machine (Xplore IM12) and a test strip (10 mm×75 mm×4 mm) was fabricated as composite 2-A2.

The obtained composite 2-A2 was evaluated by the bending test described above, with the results shown in Table 7.

Comparative Example II-2-1

Composite 2-J was obtained by fabricating a composite by the same method as Example II-2-1, except that MFC-J was used as the cellulose fine fibers. The obtained composite 2-J was evaluated by the bending test described above, with the results shown in Table 7.

Comparative Example II-2-2

Composite 2-K was obtained by fabricating a composite by the same method as Example II-2-1, except that MFC-K was used as the cellulose fine fibers. The obtained composite 2-K was evaluated by the bending test described above, with the results shown in Table 7.

Comparative Example II-2-3

Composite 2-L was obtained by fabricating a composite by the same method as Example II-2-1, except that MFC-L was used as the cellulose fine fibers. The obtained composite 2-L was evaluated by the bending test described above, with the results shown in Table 7.

Comparative Example II-2-4

A composite was obtained by fabricating a composite by the same method as Example II-2-10, except that MFC-J was used as the cellulose fine fibers. The obtained composite was used as composite 2-J2 and was evaluated by the bending test described above, with the results shown in Table 7.

[Table 6]

TABLE 6

| | | | Units | Example II-1-1 | Example II-1-2 | Example II-1-3 | Example II-1-4 | Example II-1-5 | Example II-1-6 |
|---|---|---|---|---|---|---|---|---|---|
| | | Cellulose fibers | — | MFC-A | MFC-B | MFC-C | MFC-D | MFC-E | MFC-F |
| Process | Disc refiner (first stage, or single unit) | Disc blade width | mm | 2.5 | 2.5 | 2.5 | 2.5 | 2.5 | 2.5 |
| | | Disc blade/groove ratio | — | 0.36 | 0.36 | 0.36 | 0.36 | 0.36 | 0.36 |
| | | Final interblade distance | mm | 0.05 | 0.05 | 0.3 | 0.3 | 0.05 | 0.05 |
| | | Number of passes for final interblade distance | times | 10 | 10 | 90 | 90 | 90 | 150 |
| | Disc refiner (latter stage) | Disc blade width | mm | 0.6 | 0.6 | 0.8 | 0.8 | 0.8 | — |
| | | Disc blade/groove ratio | — | 0.6 | 0.6 | 0.53 | 0.53 | 0.53 | — |
| | | Final interblade distance | mm | 0.05 | 0.05 | 0.15 | 0.15 | 0.05 | — |
| | | Number of passes for final interblade distance | times | 10 | 30 | 40 | 40 | 90 | — |
| | High-pressure homogenizer | Number of passes | | — | — | — | 10 | — | — |
| Analysis results by fiber shape autoanalyzer (Morfineo) | | Length-weighted average fiber length for normal fibers | μm | 317 | 202 | 387 | 242 | 171 | 375 |
| | | Mean fiber length | μm | 197 | 163 | 256 | 169 | 143 | 212 |
| | | Mean fiber size | μm | 21 | 21 | 25.4 | 22.4 | 23 | 32.1 |
| | | Mean fiber size in terms of specific surface area | nm | 64 | 61 | 62 | 39 | 52 | 78 |
| | | Fine fiber area ratio | % | 29 | 46 | 13 | 47 | 71 | 12.5 |
| | | Frequency (number frequency) of fibers with fiber lengths of 20 to 56 μm | % | 58.7 | 61.1 | 59.6 | 60.5 | 69.0 | 62.9 |
| | | Frequency (number frequency) of fibers with fiber lengths of 411 μm or greater | % | 2.76 | 0.33 | 14.28 | 1.26 | 0.03 | 5.48 |
| | | Fibrillation rate | % | 1.36 | 1.768 | 1.725 | 1.8 | 2.249 | 2.639 |
| Rheology analysis results | | $1/\gamma$ (reciprocal of yield strain) | — | 230 | 210 | 191 | 312 | 165 | 182 |
| MFC/PA6 composite | | Composite No. | — | 1-A | 1-B | 1-C | 1-D | 1-E | 1-F |
| | | MFC content(*) | mass % | 10 | 10 | 10 | 10 | 10 | 10 |
| | | Tensile strength | GPa | 112 | 115 | 112 | 120 | 113 | 112 |
| | | Tensile modulus | MPa | 5.8 | 6.5 | 5.6 | 6.8 | 5.8 | 5.7 |
| | | Fracture strain | % | 7.0 | 7.2 | 6.7 | 7.5 | 6.9 | 6.5 |

TABLE 6-continued

|  |  | Units | Example II-1-7 | Example II-1-8 | Example II-1-9 | Comp. Ex. II-1-1 | Comp. Ex. II-1-2 | Comp. Ex. II-1-3 |
|---|---|---|---|---|---|---|---|---|
|  | Storage modulus (150° C.) | Pa | 1150 | 1160 | 1100 | 1280 | 1090 | 1120 |
|  | Halogen content of cellulose starting material | ppm | 225 | 117 | 207 | 267 | 99 | 93 |
|  | Whiteness of cellulose starting material | % | 86 | 82 | 81 | 96 | 87 | 85 |
|  | Halogen content of cellulose fine fibers | ppm | 185 | 109 | 188 | 256 | 82 | 92 |

| | | | Example II | | | | | |
|---|---|---|---|---|---|---|---|---|
| | | Units | Example II-1-7 | Example II-1-8 | Example II-1-9 | Comp. Ex. II-1-1 | Comp. Ex. II-1-2 | Comp. Ex. II-1-3 |
| | Cellulose fibers | — | MFC-G | MFC-H | MFC-I | MFC-J | MFC-K | MFC-L |
| Process Disc refiner (first stage, or single unit) | Disc blade width | mm | 2.5 | 0.8 | 4 | 2.5 | 4 | 2.5 |
| | Disc blade/groove ratio | — | 0.36 | 0.53 | 0.89 | 0.36 | 0.89 | 0.36 |
| | Final interblade distance | mm | 0.05 | 0.05 | 0.05 | 0.05 | 0.05 | 0.3 |
| | Number of passes for final interblade distance | times | 10 | 90 | 30 | 10 | 250 | 90 |
| Disc refiner (latter stage) | Disc blade width | mm | 0.6 | — | 0.8 | 0.6 | — | — |
| | Disc blade/groove ratio | — | 0.6 | — | 0.53 | 0.6 | — | — |
| | Final interblade distance | mm | 0.05 | — | 0.05 | 0.05 | — | — |
| | Number of passes for final interblade distance | times | 0 | — | 30 | 180 | — | — |
| High-pressure homogenizer | Number of passes | | — | — | — | — | 10 | — |
| Analysis results by fiber shape autoanalyzer (Morfineo) | Length-weighted average fiber length for normal fibers | μm | 422 | 205 | 356 | 153 | 189 | 743 |
| | Mean fiber length | μm | 267 | 149 | 209 | 133 | 169 | 361 |
| | Mean fiber size | μm | 30.8 | 23.4 | 19.5 | 26.1 | 22 | 27.5 |
| | Mean fiber size in terms of specific surface area | nm | 63 | 56 | 57 | 44 | 158 | 187 |
| | Fine fiber area ratio | % | 9.2 | 56.0 | 29.2 | 91 | 65 | 6.1 |
| | Frequency (number frequency) of fibers with fiber lengths of 20 to 56 μm | % | 61.4 | 62.0 | 60.1 | 78.8 | 72.6 | 62.3 |
| | Frequency (number frequency) of fibers with fiber lengths of 411 μm or greater | % | 17.10 | 0.07 | 4.32 | 0.00 | 3.10 | 30.10 |
| | Fibrillation rate | % | 2.5 | 2.2 | 1.1 | 2.428 | 9.8 | 2.2 |
| Rheology analysis results | 1/γ (reciprocal of yield strain) | — | 245 | 192 | 189 | 190 | 280 | 368 |
| MFC/PA6 composite | Composite No. | — | 1-G | 1-H | 1-I | 1-J | 1-K | 1-L |
| | MFC content(*) | mass % | 10 | 10 | 10 | 10 | 10 | 10 |
| | Tensile strength | GPa | 112 | 112 | 114 | 101 | 96 | 103 |
| | Tensile modulus | MPa | 5.7 | 5.9 | 5.9 | 5.3 | 5.6 | 4.5 |
| | Fracture strain | % | 6.6 | 6.6 | 6.8 | 5.9 | 5.0 | 9.5 |
| | Storage modulus (150° C.) | Pa | 1110 | 1110 | 1137 | 913 | 1200 | 1010 |
| | Halogen content of cellulose starting material | ppm | 156 | 94 | 191 | 187 | 310 | 350 |
| | Whiteness of cellulose starting material | % | 82 | 96 | 87 | 81 | 87 | 94 |
| | Halogen content of cellulose fine fibers | ppm | 150 | 80 | 187 | 168 | 272 | 312 |

(*)Proportion with respect to total mass of resin + cellulose fibers

[Table 7]

TABLE 7

| | | | Example II | | | | | | |
|---|---|---|---|---|---|---|---|---|---|
| | | Units | Example II-2-1 | Example II-2-2 | Example II-2-3 | Example II-2-4 | Example II-2-5 | Example II-2-6 | Example II-2-7 |
| MFC/PP composite | Cellulose fibers | — | MFC-A | MFC-B | MFC-C | MFC-D | MFC-E | MFC-F | MFC-G |
| | Composite No. | — | 2-A | 2-B | 2-C | 2-D | 2-E | 2-F | 2-G |
| | Compositing method | | Nonwoven fabric method | Nonwoven fabric method | Nonwoven fabric method | Nonwoven fabric method | Nonwoven fabric method | Nonwoven fabric method | Nonwoven fabric method |
| | MFC content(*) | mass % | 20 | 20 | 20 | 20 | 20 | 20 | 20 |
| | Flexural strength | MPa | 62 | 61 | 60 | 63 | 59 | 58 | 56 |
| | Flexural modulus | GPa | 3.7 | 3.8 | 3.5 | 4 | 3.6 | 3.6 | 3.5 |

TABLE 7-continued

| | | | | | | | | |
|---|---|---|---|---|---|---|---|---|
| Bending strain | % | 3.9 | 3.3 | 5.1 | 3.2 | 3 | 4.5 | 4 |
| Resin thermal stability | — | Good | Good | Good | Good | Good | Good | Good |

| | | Example II | | | | | | |
|---|---|---|---|---|---|---|---|---|
| | Units | Example II-2-8 | Example II-2-9 | Example II-2-10 | Comp. Ex. II-2-1 | Comp. Ex. II-2-2 | Comp. Ex. II-2-3 | Comp. Ex. II-2-4 |
| MFC/PP composite | Cellulose fibers | — | MFC-H 2-H | MFC-I 2-I | MFC-A 2-A2 | MFC-J 2-J | MFC-K 2-K | MFC-L 2-L | MFC-J 2-J2 |
| | Composite No. Compositing method | — | Nonwoven fabric method | Nonwoven fabric method | Melt kneading-injection molding | Nonwoven fabric method | Nonwoven fabric method | Nonwoven fabric method | Melt kneading-injection molding |
| | MFC content(*) | mass % | 20 | 20 | 20 | 20 | 20 | 20 | 20 |
| | Flexural strength | MPa | 60 | 60 | 58 | 54 | 54 | 57 | 55 |
| | Flexural modulus | GPa | 3.7 | 3.6 | 3.5 | 3.4 | 3.7 | 3 | 3.2 |
| | Bending strain | % | 3.2 | 3.9 | 3.7 | 2.95 | 1.9 | 5.1 | 4 |
| | Resin thermal stability | — | Good | Good | Good | Good | Fair | Unacceptable | Good |

(*)Proportion with respect to total mass of resin + cellulose fibers

As clearly shown in Tables 6 and 7, the composites obtained in Examples II-1-1 to II-1-9 and Examples II-2-1 to II-2-10 all had excellent properties including strength, elastic modulus and fracture strain, regardless of the method of molding the composite. The composites obtained in Comparative Examples II-1-1 to II-1-3 and Comparative Examples II-2-1 to II-2-4, on the other hand, were inferior in at least one of the physical properties of strength, elastic modulus or fracture strain. This is thought to be because for cellulose fine fibers J, the number of passes through the disc refiner (second stage) was large resulting in excessive micronization, for cellulose fine fibers K the beating and high-pressure homogenizer treatment with high viscosity resulted in excessive micronization and excessive fibrillation, and for cellulose fine fibers L the wide interblade distance in the disc refiner and the small number of passes resulted in insufficient micronization.

INDUSTRIAL APPLICABILITY

The cellulose fine fibers of the invention, when blended with a resin, produce a fiber-reinforced resin with superior elastic modulus, strength and fracture strain, and they are suitable for use as a reinforcing material for resins to be used in automobiles, housing, household electrical appliances and construction.

REFERENCE SIGNS LIST

11 Blade
12 Groove
21 Rotary blade
22 Fixed blade
$W_B$ Blade width
$W_G$ Groove width
$W_L$ Interblade distance

The invention claimed is:

1. Cellulose fine fibers satisfying all of the following features in measurement with an automatic fiber shape analyzer,
   (i) the length-weighted mean fiber length of fibers with fiber lengths of 100 μm or greater is 110 μm to 500 μm,
   (ii) the mean fiber size is 42.5 μm or smaller,
   (iii) the fine fiber area ratio is 90% or lower,
   (iv) the number frequency of fibers with fiber lengths of 20 μm to 56 μm among the fibers with fiber lengths of less than 100 μm is 97% or lower,
   (v) the number frequency of fibers with fiber lengths of 411 μm or greater among the fibers with fiber lengths of 100 μm or greater is 54% or lower, and
   (vi) the mean fiber size is 20 to 150 nm in terms of specific surface area.

2. Cellulose fine fibers according to claim 1, wherein the mean fiber length is 110 μm to 500 μm.

3. Cellulose fine fibers according to claim 1, satisfying all of the following features in measurement with an automatic fiber shape analyzer:
   (i) the mean fiber length is 130 μm to 350 μm,
   (ii) the mean fiber size is 35 μm or smaller,
   (iii) the fine fiber area ratio is 75% or lower,
   (iv) the number frequency of fibers with fiber lengths of 20 μm to 56 μm among the fibers with fiber lengths of less than 100 μm is 75% or lower,
   (v) the number frequency of fibers with fiber lengths of 411 μm or greater among the fibers with fiber lengths of 100 μm or greater is 30% or lower, and
   (vi) the fibrillation rate is 5% or lower.

4. The cellulose fine fibers according to claim 1, wherein the glucose content in constituent sugar analysis is 90 mass % or greater.

5. The cellulose fine fibers according to claim 1, wherein in a scanning electron microscope (SEM) image of the surface of a sample obtained by casting and drying a DMSO dispersion of the cellulose fine fibers at 5 ppm by mass, the proportion of the total area occupied by ultrafine fibers with an occupied area of less than 15 μm$^2$ is 10% to 80% with respect to the total area occupied by the cellulose fine fibers.

6. The cellulose fine fibers according to claim 1, which have a type I cellulose crystal structure.

7. The cellulose fine fibers according to claim 1, wherein the degree of crystallinity is 60% or greater.

8. The cellulose fine fibers according to claim 1, wherein the halogen content is 250 ppm by mass or lower.

9. The cellulose fine fibers according to claim 1, wherein the whiteness is 50% or greater.

10. The cellulose fine fibers according to claim 1, wherein the length-weighted mean fiber length of fibers with fiber lengths of 100 μm or greater is 130 μm to 350 μm.

11. The cellulose fine fibers according to claim 1, wherein the number frequency of fibers with fiber lengths of 411 μm or greater among the fibers with fiber lengths of 100 μm or greater is 30% or lower.

12. The cellulose fine fibers according to claim 1, wherein the fine fiber area ratio is 75% or lower.

13. The cellulose fine fibers according to claim 1, wherein the number frequency of fibers with fiber lengths of 20 μm to 56 μm among the fibers with fiber lengths of less than 100 μm is 30% to 75%.

14. The cellulose fine fibers according to claim 1, wherein the fibrillation rate is 5% or lower.

15. Cellulose fine fibers according to claim 1, which further satisfy the following features in measurement with an automatic fiber shape analyzer:

(iv) the number frequency of fibers with fiber lengths of 20 μm to 56 μm among the fibers with fiber lengths of less than 100 μm is 30% to 97%, and (vi) the fibrillation rate is 5% or lower.

16. A method for producing cellulose fine fibers according to claim 1, wherein:

the halogen content of the cellulose fine fibers is 250 ppm by mass or lower, and the method includes a step of defibrating a cellulose starting material having a halogen content of 300 ppm by mass or lower.

17. A fiber-reinforced resin that includes cellulose fine fibers according to claim 1, and a resin.

18. The fiber-reinforced resin according to claim 17, wherein the resin has a melting point of 200° C. or higher.

19. A nonwoven fabric that includes cellulose fine fibers according to claim 1.

20. A wet compact comprising cellulose fine fibers according to claim 1.

* * * * *